(12) United States Patent
Huang et al.

(10) Patent No.: US 12,443,014 B2
(45) Date of Patent: Oct. 14, 2025

(54) IMAGING SYSTEM LENS ASSEMBLY, IMAGING APPARATUS AND ELECTRONIC DEVICE

(71) Applicant: LARGAN PRECISION CO., LTD., Taichung (TW)

(72) Inventors: Hsin-Hsuan Huang, Taichung (TW); Cheng-Yu Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 382 days.

(21) Appl. No.: 18/193,740

(22) Filed: Mar. 31, 2023

(65) Prior Publication Data
US 2023/0375808 A1    Nov. 23, 2023

(30) Foreign Application Priority Data
May 18, 2022    (TW) .................................. 111118513

(51) Int. Cl.
*G02B 13/00*    (2006.01)
*G02B 9/60*    (2006.01)
*G02B 13/02*    (2006.01)

(52) U.S. Cl.
CPC ........... *G02B 13/0045* (2013.01); *G02B 9/60* (2013.01); *G02B 13/02* (2013.01)

(58) Field of Classification Search
CPC ...... G02B 13/0045; G02B 9/60; G02B 13/02; G02B 13/0065; G02B 13/14; G02B 13/18; G03B 17/17; G03B 30/00
See application file for complete search history.

(56) References Cited

U.S. PATENT DOCUMENTS

| | | | |
|---|---|---|---|
| 2,587,347 A | 2/1952 | Lowenthal | |
| 2,645,156 A | 7/1953 | Tronnier | |
| 4,457,596 A | 7/1984 | Wakamiya | |
| 10,379,322 B2 | 8/2019 | Wu | |
| 2021/0063688 A1 | 3/2021 | Shin | |
| 2021/0318522 A1 | 10/2021 | Zhang et al. | |
| 2022/0187578 A1* | 6/2022 | Yeh ......................... | G02B 9/60 |

FOREIGN PATENT DOCUMENTS

| | | |
|---|---|---|
| CN | 106526798 A | 3/2017 |
| CN | 111505799 A | 8/2020 |
| CN | 112799211 A | 5/2021 |
| CN | 113467048 A | 10/2021 |
| CN | 216310394 U | 4/2022 |
| JP | S53107824 A | 9/1978 |
| JP | H112760 A | 1/1999 |
| TW | I748795 B | 12/2021 |

* cited by examiner

*Primary Examiner* — James C. Jones
(74) *Attorney, Agent, or Firm* — McClure, Qualey & Rodack, LLP

(57) ABSTRACT

An imaging system lens assembly includes five lens elements, the five lens elements are, in order from an object side to an image side along an optical path: a first lens element, a second lens element, a third lens element, a fourth lens element and a fifth lens element. Each of the five lens elements has an object-side surface towards the object side and an image-side surface towards the image side. The first lens element has positive refractive power, the object-side surface of the first lens element is convex in a paraxial region thereof.

32 Claims, 31 Drawing Sheets

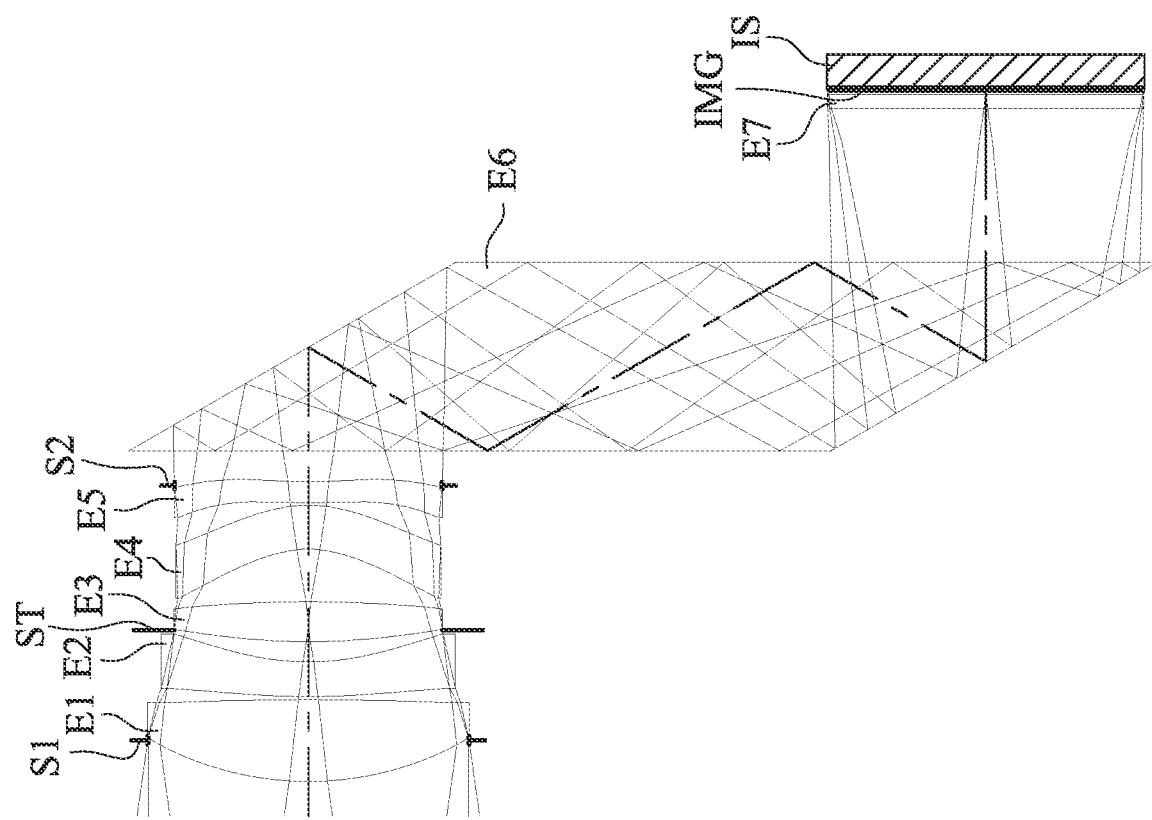

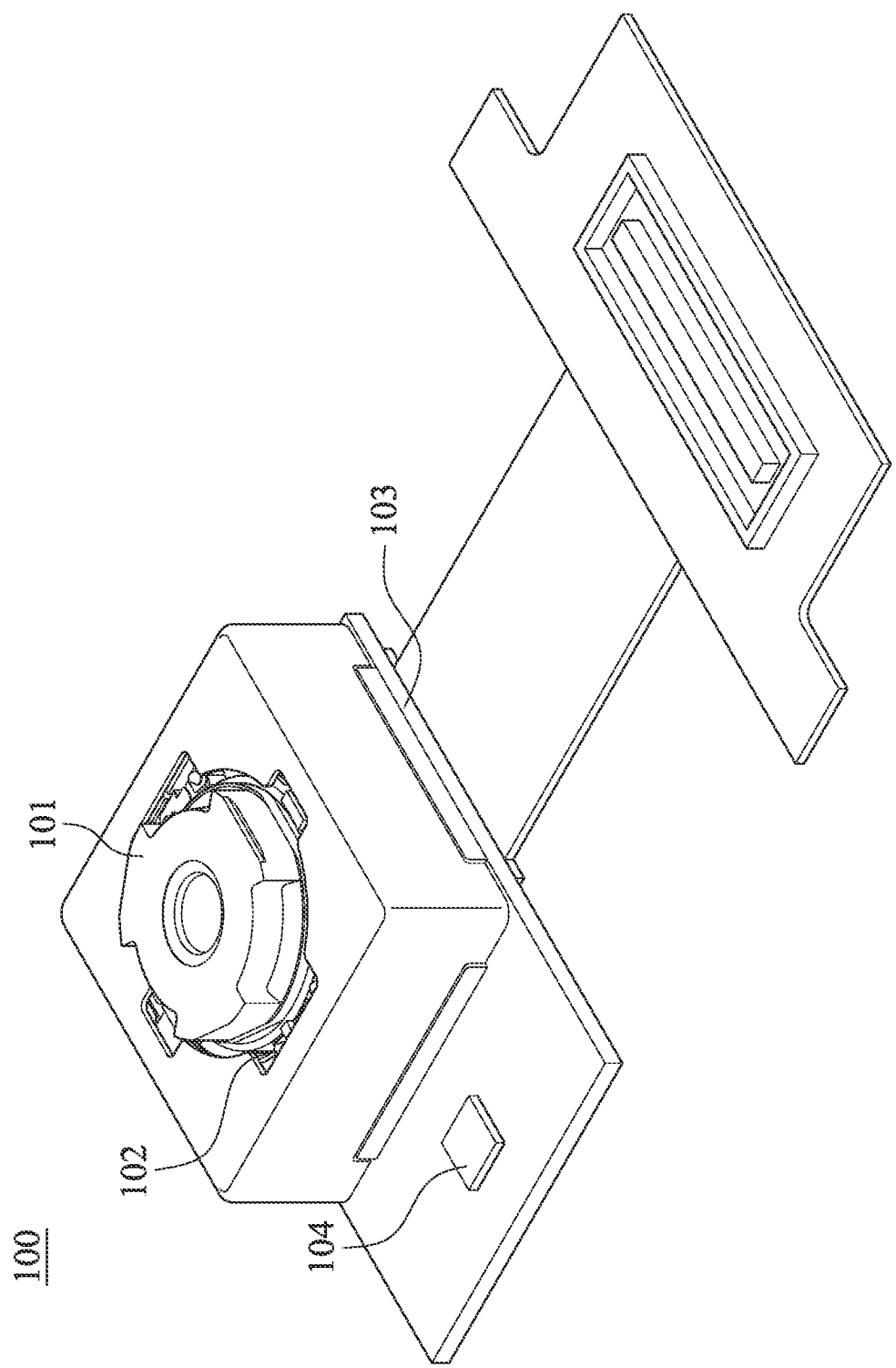

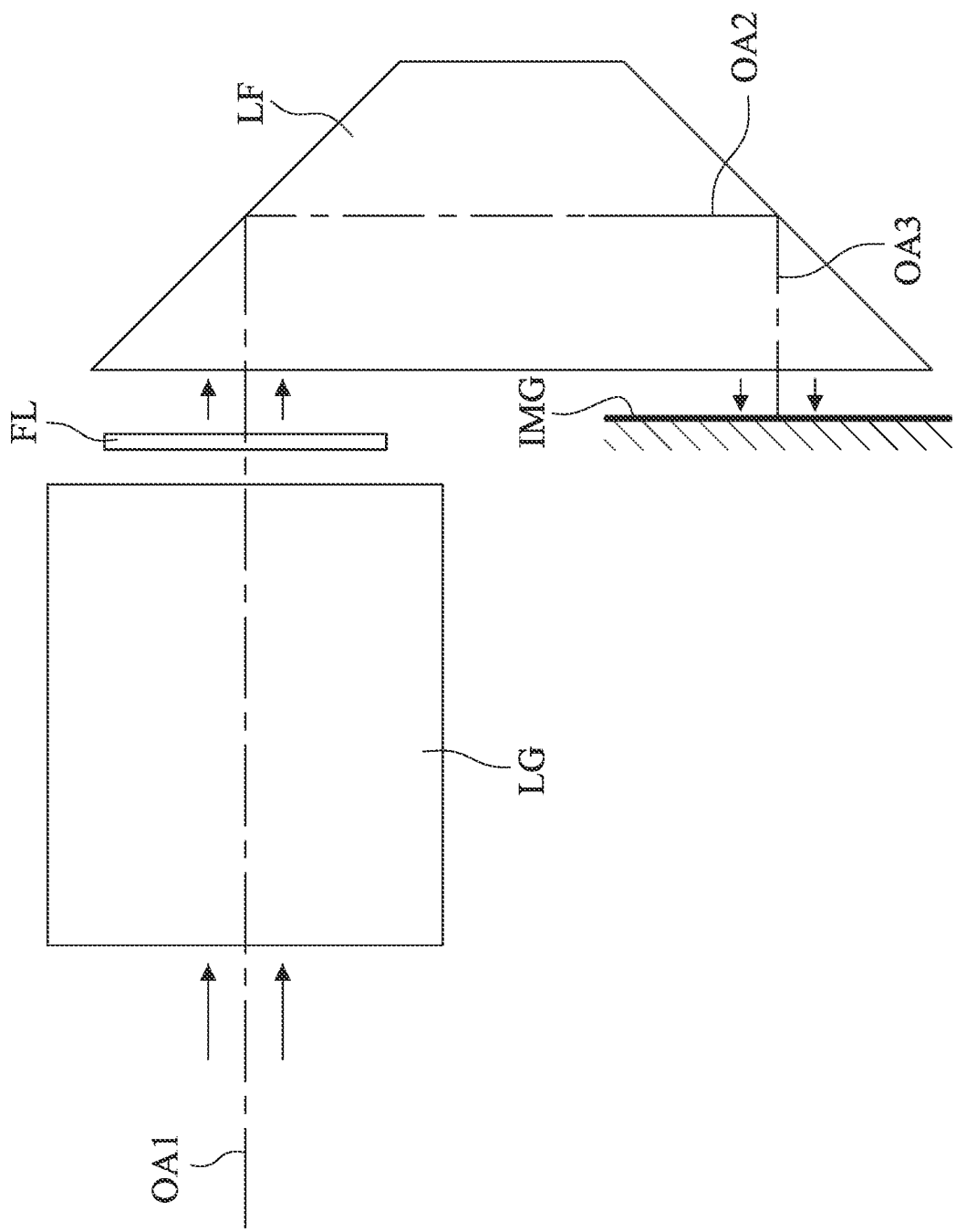

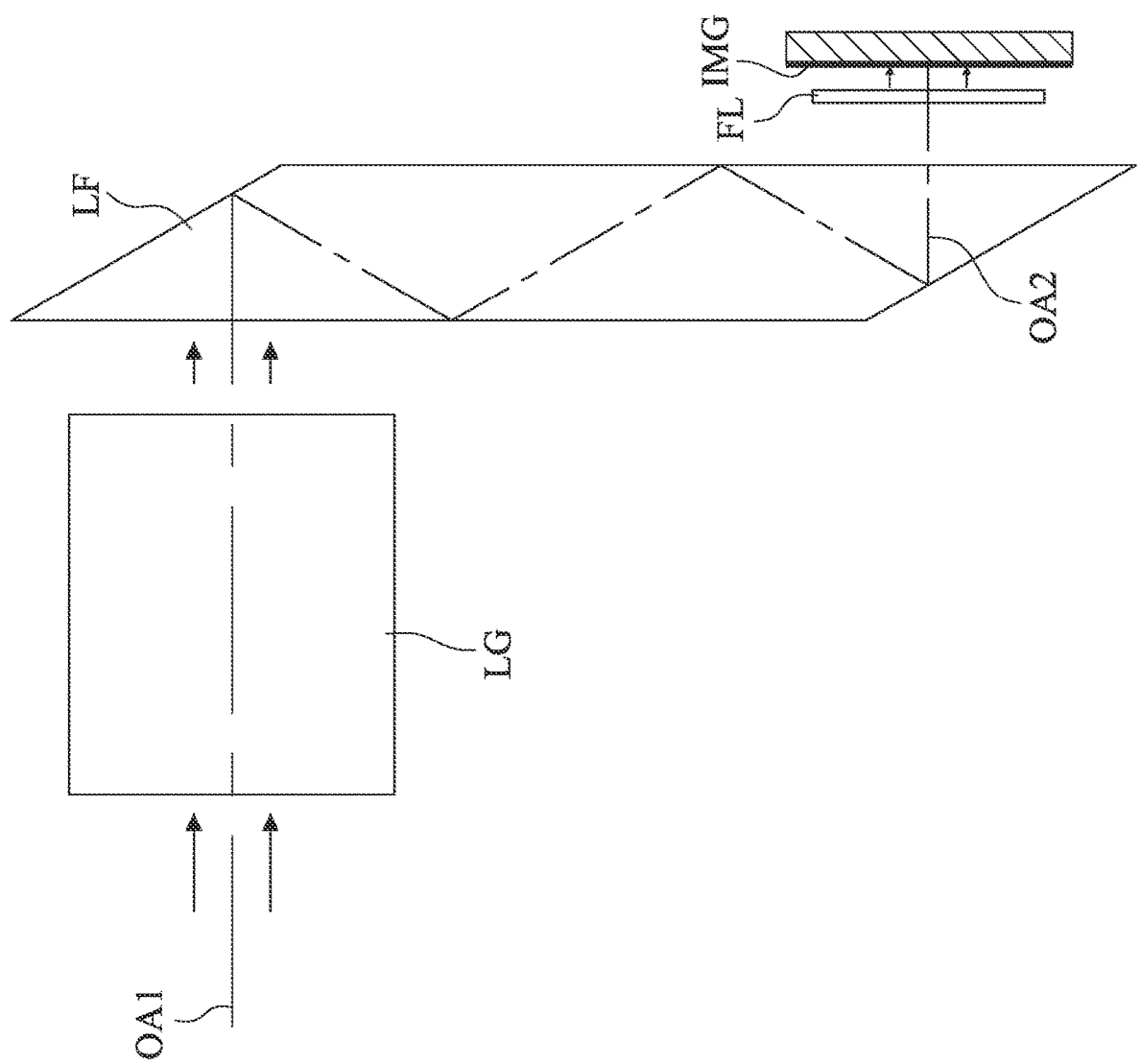

IMAGING SYSTEM LENS ASSEMBLY, IMAGING APPARATUS AND ELECTRONIC DEVICE

RELATED APPLICATIONS

This application claims priority to Taiwan Application Serial Number 111118513, filed May 18, 2022, which is herein incorporated by reference.

BACKGROUND

Technical Field

The present disclosure relates to an imaging system lens assembly and an imaging apparatus. More particularly, the present disclosure relates to an imaging system lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of the electronic devices equipped with optical lens assemblies become wider, and there is a bigger variety of requirements for the optical lens assemblies. However, in a conventional optical lens assembly, it is hard to balance among image quality, sensitivity, aperture size, volume or field of view.

In recent years, with the demands of compact electronic devices, conventional photographing lens assembly is unable to satisfy both requirements of high-end specification and compactness, especially the micro lens assembly with a large aperture stop or a telephoto feature. Because the requirements of the optical zoom becomes higher (such as increasing the optical zoom ratio), the conventional telephoto lens assemblies cannot satisfy the requirements (due to the excessive total track length, the small aperture stop, the poor image quality or lacking of compactness), so that the arrangements with different optical properties or the ability to fold the optical axis are needed. In order to solve the aforementioned technical problems and demands, an optical lens assembly with compactness and high imaging quality is provided in the present disclosure to meet the requirements.

SUMMARY

According to one aspect of the present disclosure, an imaging system lens assembly includes five lens elements, the five lens elements are, in order from an object side to an image side along an optical path, a first lens element, a second lens element, a third lens element, a fourth lens element and a fifth lens element. Each of the five lens elements has an object-side surface towards the object side and an image-side surface towards the image side. The first lens element preferably has positive refractive power, the object-side surface of the first lens element preferably is convex in a paraxial region thereof. When an axial distance between the image-side surface of the fifth lens element and an image surface is BL, an axial distance between the object-side surface of the first lens element and the image-side surface of the fifth lens element is TD, an f-number of the imaging system lens assembly is Fno, half of a maximum field of view of the imaging system lens assembly is HFOV, a focal length of the imaging system lens assembly is f, and a central thickness of the first lens element is CT1, the following conditions preferably are satisfied: $2.5<BL/TD<10.0$; $1.0<Fno<3.8$; $4.0$ degrees$<HFOV<18.0$ degrees; $0.01<f/BL<1.25$; and $0.01<CT1/BL<0.12$.

According to the present disclosure, an imaging apparatus includes the aforementioned imaging system lens assembly and an image sensor, and the image sensor is disposed on the image surface of the imaging system lens assembly.

According to the present disclosure, an electronic device includes the aforementioned imaging apparatus.

According to one aspect of the present disclosure, an imaging system lens assembly includes five lens elements, the five lens elements are, in order from an object side to an image side along an optical path, a first lens element, a second lens element, a third lens element, a fourth lens element and a fifth lens element. Each of the five lens elements has an object-side surface towards the object side and an image-side surface towards the image side. The object-side surface of the first lens element preferably is convex in a paraxial region thereof. When an axial distance between the image-side surface of the fifth lens element and an image surface is BL, an axial distance between the object-side surface of the first lens element and the image-side surface of the fifth lens element is TD, an f-number of the imaging system lens assembly is Fno, a maximum image height of the imaging system lens assembly is ImgH, an axial distance between the object-side surface of the first lens element and the image surface is TL, a curvature radius of the image-side surface of the third lens element is R6, and a curvature radius of the image-side surface of the fourth lens element is R8, the following conditions preferably are satisfied: $2.5<BL/TD<10.0$; $1.0<Fno<3.8$; $0.01<ImgH/TL<0.23$; and $0.01<|R8/R6|<0.42$.

According to one aspect of the present disclosure, an imaging system lens assembly includes five lens elements, the five lens elements are, in order from an object side to an image side along an optical path, a first lens element, a second lens element, a third lens element, a fourth lens element and a fifth lens element. Each of the five lens elements has an object-side surface towards the object side and an image-side surface towards the image side. The first lens element preferably has positive refractive power. The object-side surface of the second lens element preferably is convex in a paraxial region thereof. The image-side surface of the fifth lens element preferably is concave in a paraxial region thereof. At least one of the object-side surface and the image-side surface of each of at least two of the five lens elements preferably is aspheric. At least two of the five lens elements preferably are made of plastic material. The imaging system lens assembly preferably further includes an aperture stop. When an axial distance between the aperture stop and the image-side surface of the fifth lens element is SD, an axial distance between the image-side surface of the fifth lens element and an image surface is BL, an axial distance between the object-side surface of the first lens element and the image-side surface of the fifth lens element is TD, and a maximum among refractive indices of the five lens elements of the imaging system lens assembly is Nmax, the following conditions preferably are satisfied: $2.6<BL/TD<8.0$; $1.58<Nmax<1.75$; and $0.20<SD/TD<0.98$.

BRIEF DESCRIPTION OF THE DRAWINGS

The present disclosure can be more fully understood by reading the following detailed description of the embodiment, with reference made to the accompanying drawings as follows:

FIG. 17A is a schematic view of the imaging apparatus according to the 8th embodiment with another reflective element.

FIG. 18 is a three-dimensional schematic view of an imaging apparatus according to the 9th embodiment of the present disclosure.

FIG. 23E is a schematic view of one another arrangement of the light path folding element in the imaging system lens assembly of the present disclosure.

FIG. 23F is a schematic view of still another arrangement of the light path folding element in the imaging system lens assembly of the present disclosure.

DETAILED DESCRIPTION

Figure 1:
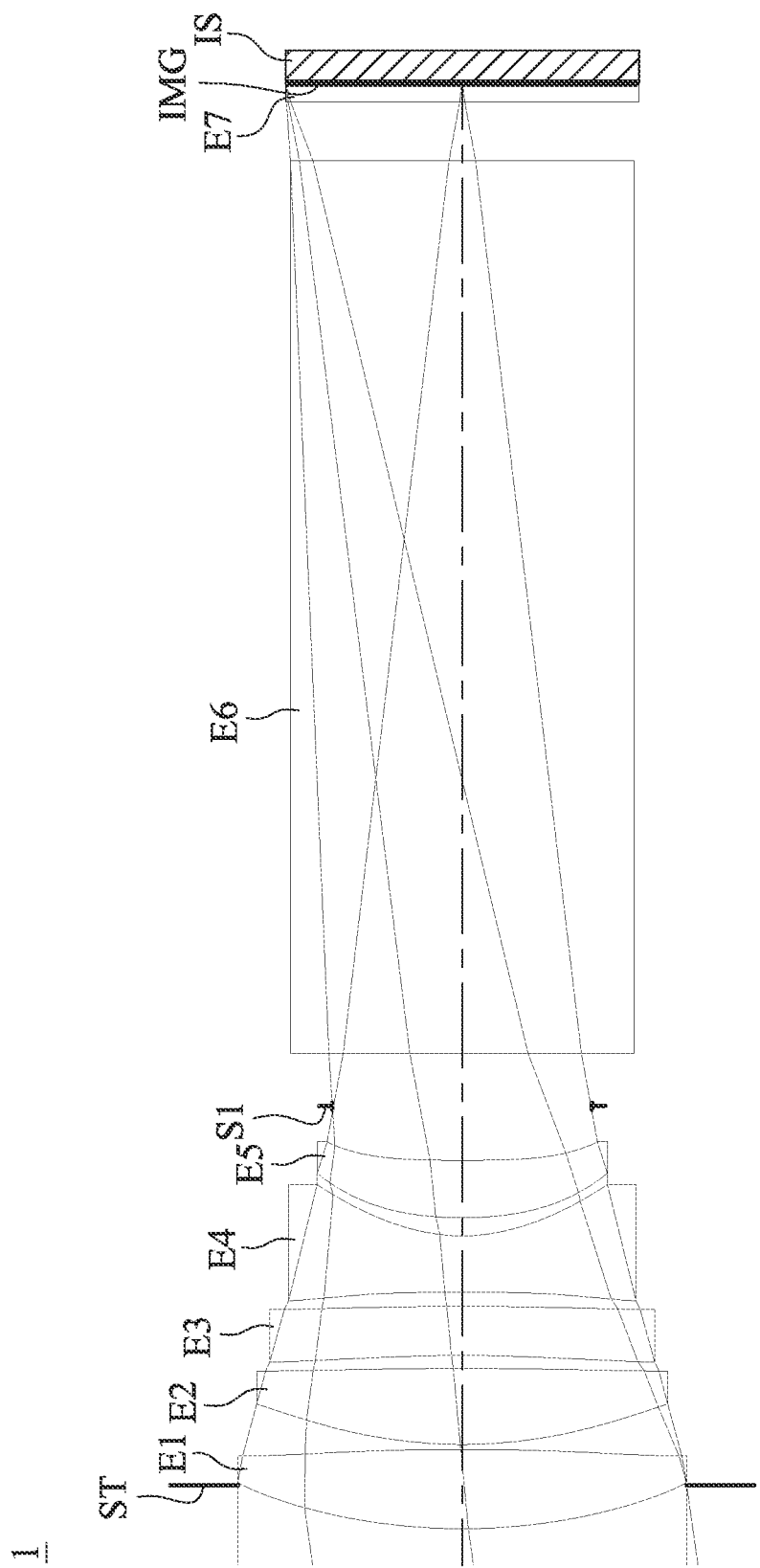
FIG. 1 is a schematic view of an imaging apparatus according to the 1st embodiment of the present disclosure.

According to the present disclosure, an imaging system lens assembly includes five lens elements, the five lens elements are, in order from an object side to an image side along an optical path: a first lens element, a second lens element, a third lens element, a fourth lens element and a fifth lens element. Each of the five lens elements has an object-side surface towards the object side and an image-side surface towards the image side.

The first lens element can have positive refractive power, which is favorable for reducing the volume of the imaging system lens assembly. The object-side surface of the first lens element can be convex in a paraxial region thereof, which is favorable for adjusting the refractive power of the first lens element.

The object-side surface of the second lens element can be convex in a paraxial region thereof, which can make the imaging system lens assembly more symmetric so as to improve the image quality.

The image-side surface of the fifth lens element can be concave in a paraxial region thereof so as to balance spherical aberration and coma aberration of the imaging system lens assembly.

At least one of the object-side surface and the image-side surface of each of at least two of the five lens elements can be aspheric. Therefore, aberrations in the off-axis region can be corrected.

At least one of the object-side surface and the image-side surface of at least one of the five lens elements can include at least one inflection point. Therefore, the distortion can be corrected, which prevents the image at the peripheral region from deformation.

At least two of the five lens elements can be made of plastic material. Therefore, the formability of lens elements can be improved and the manufacturing costs can be reduced.

There can be an air gap between each of adjacent lens elements of the five lens elements of the imaging system lens assembly. Therefore, the simplicity of assembling the imaging system lens assembly can be ensured so as to improve the yield of assembling.

The imaging system lens assembly can further include a reflective element, which can be disposed between an imaged object and the image surface. Therefore, it can provide a different light path for the imaging system lens assembly. The space arrangement of the imaging system lens assembly can be more flexible, which is favorable for reducing the structural limitations and for compactness of the imaging system lens assembly. Moreover, the reflective element can be disposed at an object side of the object-side surface of the first lens element or at an image side of the image-side surface of the fifth lens element. Moreover, the reflective element can be disposed between the fifth lens element and the image surface. Furthermore, the reflective element can include at least two reflective surfaces.

The imaging system lens assembly can further include an aperture stop, which can be disposed between the imaged object and the third lens element. Therefore, the imaging region and the incident angle of light incident on the image surface can be limited, and the function of photography from afar and the effect of high imaging brightness can be satisfied simultaneously.

When an axial distance between the image-side surface of the fifth lens element and the image surface is BL, and an axial distance between the object-side surface of the first lens element and the image-side surface of the fifth lens element is TD, the following condition is satisfied: $2.5<BL/TD<10.0$. Therefore, it makes sure that the imaging system lens assembly can perform better telephoto function. Moreover, the following condition can be satisfied: $2.6<BL/TD<8.0$. Moreover, the following condition can be satisfied: $3.0<BL/TD<8.0$. Moreover, the following condition can be satisfied: $3.5<BL/TD<8.0$. Furthermore, the following condition can be satisfied: $2.7<BL/TD<6.0$.

When an f-number of the imaging system lens assembly is Fno, the following condition can be satisfied: $1.0<Fno<3.8$. Therefore, a balance between the illuminance and the depth of field can be achieved, and the image quality can be enhanced by increasing the amount of incident light. Moreover, the following condition can be satisfied: $1.5<Fno<3.7$. Furthermore, the following condition can be satisfied: $2.2<Fno<3.6$.

When half of a maximum field of view of the imaging system lens assembly is HFOV, the following condition can be satisfied: $4.0$ degrees$<HFOV<18.0$ degrees. Therefore, a suitable field of view can be given to the imaging system lens assembly for the telephoto applications.

When a focal length of the imaging system lens assembly is f, and the axial distance between the image-side surface of the fifth lens element and the image surface is BL, the following condition can be satisfied: $0.01<f/BL<1.25$. Therefore, it is favorable for fulfilling the features of telephoto and small field of view of the imaging system lens assembly. Moreover, the following condition can be satisfied: $0.5<f/BL<1.20$.

When a central thickness of the first lens element is CT1, and the axial distance between the image-side surface of the fifth lens element and the image surface is BL, the following condition can be satisfied: $0.01<CT1/BL<0.12$. Therefore, the central thickness of the first lens element and the ratio can be controlled so as to prevent the excessive height of the imaging system lens assembly. Moreover, the following condition can be satisfied: $0.03<CT1/BL<0.1$.

When a maximum image height of the imaging system lens assembly is ImgH, and an axial distance between the object-side surface of the first lens element and the image surface is TL, the following condition can be satisfied: $0.01<ImgH/TL<0.23$. Therefore, it can balance the total track length and the image height of the imaging system lens assembly, and the requirement of compactness of the imaging system lens assembly can be satisfied. Moreover, the following condition can be satisfied: $0.01<ImgH/TL<0.2$. Furthermore, the following condition can be satisfied: $0.05<ImgH/TL<0.185$.

When a curvature radius of the image-side surface of the third lens element is R6, and a curvature radius of the image-side surface of the fourth lens element is R8, the following condition can be satisfied: $0.01<|R8/R6|<0.42$. Therefore, it makes sure that the refraction of the imaging system lens assembly is stronger, which is favorable for light convergence so as to reduce the volume of the lens element. Moreover, the following condition can be satisfied: $0.02<|R8/R6|<0.32$. Furthermore, the following condition can be satisfied: $0.03<|R8/R6|<0.26$.

When a maximum among refractive indices of the five lens elements of the imaging system lens assembly is Nmax, the following condition can be satisfied: $1.58<Nmax<1.75$. Therefore, it can effectively balance the refractive indices of the lens elements, which is favorable for fulfilling the feature of small field of view of the imaging system lens assembly. Moreover, the following condition can be satisfied: $1.58<Nmax<1.72$. Furthermore, the following condition can be satisfied: $1.65<Nmax<1.70$.

When an axial distance between the aperture stop and the image-side surface of the fifth lens element is SD, and the axial distance between the object-side surface of the first lens element and the image-side surface of the fifth lens element is TD, the following condition can be satisfied: $0.20<SD/TD<0.98$. Therefore, the position of the aperture stop can be controlled so as to maintain a smaller aperture at the object side of the imaging system lens assembly. Moreover, the following condition can be satisfied: $0.35<SD/TD<0.95$. Furthermore, the following condition can be satisfied: $0.45<SD/TD<0.90$.

When a sum of all central thicknesses of the five lens elements of the imaging system lens assembly is $\Sigma CT$, and the axial distance between the object-side surface of the first lens element and the image-side surface of the fifth lens element is TD, the following condition can be satisfied: $0.60<\Sigma CT/TD<1.0$. Therefore, the central thicknesses of the lens elements can be properly adjusted so as to reduce the volume of the imaging system lens assembly. Moreover, the following condition can be satisfied: $0.65<\Sigma CT/TD<0.95$.

When a curvature radius of the object-side surface of the first lens element is R1, and the curvature radius of the image-side surface of the fourth lens element is R8, the following condition can be satisfied: $0<(|R1|+|R8|)/(|R1|-|R8|)<6.4$. Therefore, the refraction of the first lens element and the fourth lens element can be stronger so as to control the light path. Moreover, the following condition can be satisfied: $0.5<(|R1|+|R8|)/(|R1|-|R8|)<5.5$. Furthermore, the following condition can be satisfied: $1.0<(|R1|+|R8|)/(|R1|-|R8|)<4.5$.

When a central thickness of the second lens element is CT2, and a central thickness of the third lens element is CT3, the following condition can be satisfied: $0.1<CT3/CT2<3.5$. Therefore, the ratio of the central thicknesses of the second lens element and the third lens element can be balanced so as to control the volume of the imaging system lens assembly. Moreover, the following condition can be satisfied: $0.2<CT3/CT2<3.0$.

When an axial distance between the first lens element and the second lens element is T12, and an axial distance between the fourth lens element and the fifth lens element is T45, the following condition can be satisfied: $0.05<T12/T45<2.0$. Therefore, the lens elements can cooperate with each other so as to reduce the volume of the lens elements. Moreover, the following condition can be satisfied: $0.06<T12/T45<1.8$.

When an Abbe number of the fourth lens element is V4, and an Abbe number of the fifth lens element is V5, the following condition can be satisfied: $20.0<V4+V5<55.0$. Therefore, it is favorable for enhancing the correction of chromatic aberration. Moreover, the following condition can be satisfied: $30.0<V4+V5<45.0$.

When a distance in parallel with an optical axis from an axial vertex on the image-side surface of the fourth lens element to a maximum effective radius position on the image-side surface of the fourth lens element is SAG4R2, and a central thickness of the fourth lens element is CT4, the following condition can be satisfied: $0.4<|SAG4R2|/CT4<5.0$. Therefore, the ability of controlling the beam direction at the peripheral region of the fourth lens element can be obtained, and the requirement of compactness of the imaging system lens assembly can be satisfied. Moreover, the following condition can be satisfied: $0.6<|SAG4R2|/CT4<4.0$.

When a height of a maximum effective radius of the object-side surface of the first lens element is Y1R1, and a height of a maximum effective radius of the image-side surface of the fifth lens element is Y5R2, the following condition can be satisfied: $0.8<Y1R1/Y5R2<2.0$. Therefore, it is favorable for controlling the beam size so as to avoid an overly large effective radius of the lens elements which will affect the compactness of the imaging system lens assembly. Moreover, the following condition can be satisfied: $1.0<Y1R1/Y5R2<2.0$. Furthermore, the following condition can be satisfied: $0.85<Y1R1/Y5R2<1.8$.

When the height of the maximum effective radius of the image-side surface of the fifth lens element is Y5R2, and the maximum image height of the imaging system lens assembly is ImgH, the following condition can be satisfied: $0.50<Y5R2/ImgH<1.2$. Therefore, the incident angle of light incident on the image surface can be lower so as to compress the outer diameter of the imaging system lens assembly. Moreover, the following condition can be satisfied: $0.52<Y5R2/ImgH<0.95$.

When the axial distance between the first lens element and the second lens element is T12, and the central thickness of the second lens element is CT2, the following condition can be satisfied: $0.01<T12/CT2<1.0$. Therefore, the central thicknesses of the lens elements and the axial distance between the lens elements can be balanced, which is favorable for maintaining the best space arrangement. Moreover, the following condition can be satisfied: $0.02<T12/CT2<0.75$.

When a focal length of the second lens element is f2, and a focal length of the fifth lens element is f5, the following condition can be satisfied: $0.1<|f2/f5|<1.5$. Therefore, the arrangement of refractive power can be properly set up so as to control the back focal length of the imaging system lens assembly, and further satisfy the various applications. Moreover, the following condition can be satisfied: $0.15<|f2/f5|<1.2$.

When the focal length of the imaging system lens assembly is f, a focal length of the first lens element is f1, the focal length of the second lens element is f2, a focal length of the third lens element is f3, a focal length of the fourth lens element is f4, and the focal length of the fifth lens element is f5, the following condition can be satisfied: $4.0<|f/f1|+|f/f2|+|f/f3|+|f/f4|+|f/f5|<12.0$. Therefore, it can make every lens element have enough refractive power to correct aberrations, and make the imaging system lens assembly maintain smaller outer diameter and suitable back focal length when the imaging system lens assembly is correcting aberrations in the off-axis region. Moreover, the following condition can be satisfied: $5.0<|f/f1|+|f/f2|+|f/f3|+|f/f4|+|f/f5|<10.0$.

When the axial distance between the object-side surface of the first lens element and the image-side surface of the fifth lens element is TD, the following condition can be satisfied: $1.0\ mm<TD<5.50\ mm$. Therefore, the volume of the imaging system lens assembly can be reduced. Moreover, the following condition can be satisfied: $2.0\ mm<TD<5.0\ mm$.

An Abbe number of at least one of the five lens elements which has positive refractive power can be smaller than 30.0. Therefore, chromatic aberration generated by the imaging system lens assembly can be corrected, which is favorable for performing the feature of small field of view of the imaging system lens assembly.

Each of the aforementioned features of the imaging system lens assembly can be utilized in various combinations for achieving the corresponding effects.

The imaging system lens assembly of the present disclosure can include at least one reflective element, such as a prism or a mirror, which makes the space arrangement more flexible. The reflective element can be disposed between the imaged object and the image surface, which is favorable for compressing the volume of the imaging system lens assembly. The light path can be reflected at least one time by the reflective element. The angle between the reflective surface, or the normal line thereof, and the optical axis is not limited to 45 degrees. Other angles can also be applied in order to meet the requirements of space arrangement. The angle between the vector of the optical axis at the object end and the vector of the optical axis at the image end can be any angle, which is not limited to 0 degree, 90 degrees or 180 degrees. Moreover, for the reason of reducing the occupied volume, the length and width of the mirror can be different, and the length, width and height of the prism can be different from each other. The reflective element can be obtained by combining one or more prisms according to the designing requirement. The material of the prism can be selected according to the designing requirement, and the material thereof can be glass or plastic.

The imaging system lens assembly of the present disclosure can include at least one optical lens element, optical element or carrier, and at least one surface thereof includes a low-reflective layer. The stray light caused by the light reflecting at the peripheral region can be effectively reduced. The aforementioned optical lens element can include the low-reflective layer toward the imaging system lens assembly at the non-effective area of the object side, at the non-effective area of the image side or at the surface connecting the object side and the image side. The aforementioned optical element can be a light blocking element, an annular spacing element, a barrel member, a cover glass, a blue glass, a filter, a color filter, a light path folding element, a prism or a mirror. The aforementioned carrier can be a lens carrier for the lens assembly, a micro lens disposed on the image sensor, other components of the image sensor substrate or a glass for protecting the image sensor.

According to the imaging system lens assembly of the present disclosure, the barrel member or the lens elements can be trimmed so as to improve the property of reducing the uniaxial size. It is favorable for reducing the volume of the lens elements and further facilitating the compactness of the imaging system lens assembly.

According to the imaging system lens assembly of the present disclosure, the lens elements thereof can be made of glass or plastic materials. When the lens elements are made of glass materials, the distribution of the refractive power of the imaging system lens assembly may be more flexible to design. The glass lens element can either be made by grinding or molding. When the lens elements are made of plastic materials, manufacturing costs can be effectively reduced. Furthermore, surfaces of each lens element can be arranged to be spherical or aspheric (ASP), wherein it is easier to fabricate the spherical surface. If the surfaces are arranged to be aspheric, more controllable variables can be obtained for eliminating aberrations thereof, and to further decrease the required amount of lens elements in the imaging system lens assembly. Therefore, the total track length of the imaging system lens assembly can also be reduced. The aspheric surfaces may be formed by plastic injection molding or glass molding.

According to the imaging system lens assembly of the present disclosure, one or more of the lens material may optionally include an additive which provides light absorption or light interference so as to alter the lens transmittance in a specific range of wavelength for reducing unwanted stray light or color deviation. For example, the additive may optionally filter out light in the wavelength range of 600 nm-800 nm for reducing excessive red light and/or near infra-red light, or may optionally filter out light in the wavelength range of 350 nm-450 nm to reduce excessive blue light and/or near ultra-violet light from interfering the final image. The additive may be homogenously mixed with plastic material to be used in manufacturing a mixed-material lens element by injection molding. Furthermore, the additive may be added in the coating on the lens element surface to achieve the aforementioned effects.

According to the imaging system lens assembly of the present disclosure, when a surface of a lens element is aspheric, it indicates that the surface has an aspheric shape throughout its optically effective area or a portion(s) thereof.

According to the imaging system lens assembly of the present disclosure, when the lens element has a convex surface, it indicates that the surface can be convex in the paraxial region thereof. When the lens element has a concave surface, it indicates that the surface can be concave in the paraxial region thereof. According to the imaging system lens assembly of the present disclosure, the refractive power or the focal length of a lens element being positive or negative may refer to the refractive power or the focal length in a paraxial region of the lens element.

According to the imaging system lens assembly of the present disclosure, an inflection point is a point on a lens surface with a curvature changing from positive to negative or from negative to positive.

According to the imaging system lens assembly of the present disclosure, the image surface of the imaging system lens assembly, based on the corresponding image sensor, can be planar or curved. In particular, the image surface can be a concave curved surface facing towards the object side. According to the imaging system lens assembly of the present disclosure, at least one image correcting element (such as a field flattener) can be selectively disposed between the lens element closest to the image side of the imaging system lens assembly and the image surface on an imaging optical path so as to correct the image (such as the field curvature). Properties of the image correcting element, such as curvature, thickness, refractive index, position, surface shape (convex/concave, spherical/aspheric, diffractive and Fresnel etc.) can be adjusted according to the requirements of the imaging apparatus. In general, the image correcting element is preferably a thin piano-concave element having a concave surface towards the object side and is disposed close to the image surface.

Figure 23A:
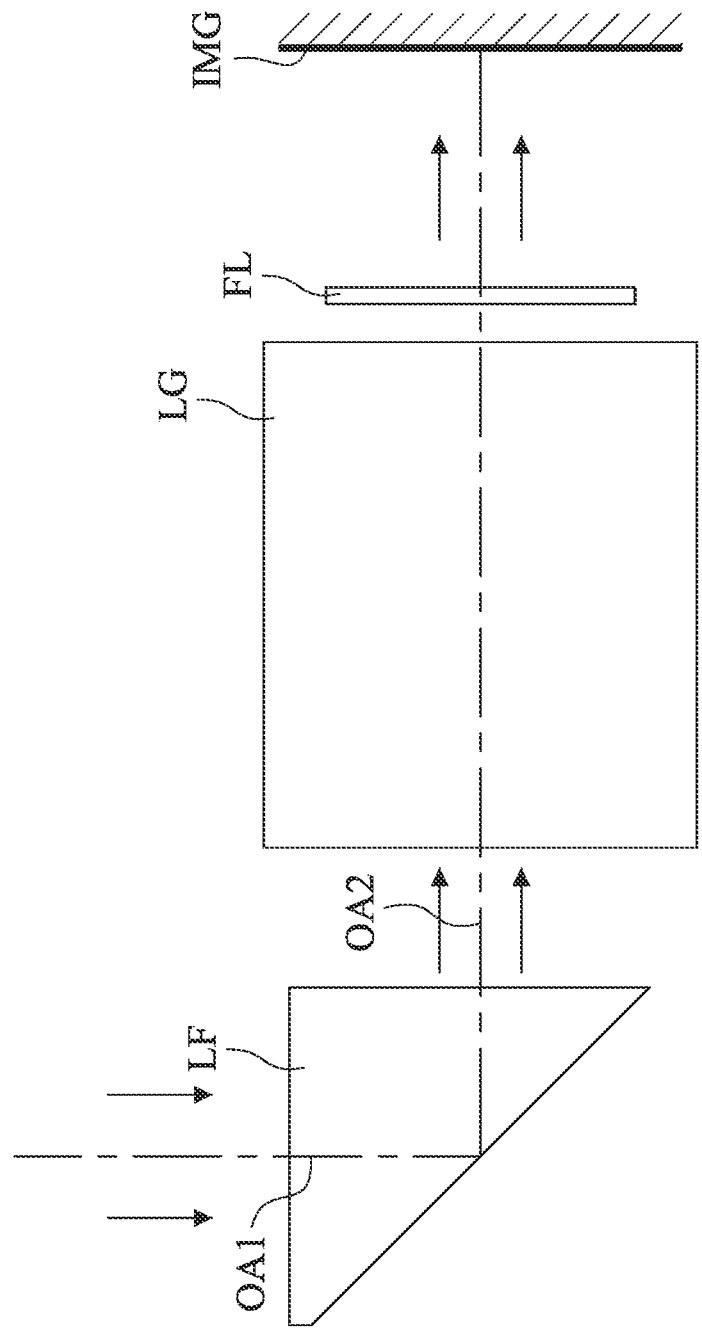
FIG. 23A is a schematic view of an arrangement of a light path folding element in the imaging system lens assembly of the present disclosure.
Figure 23B:
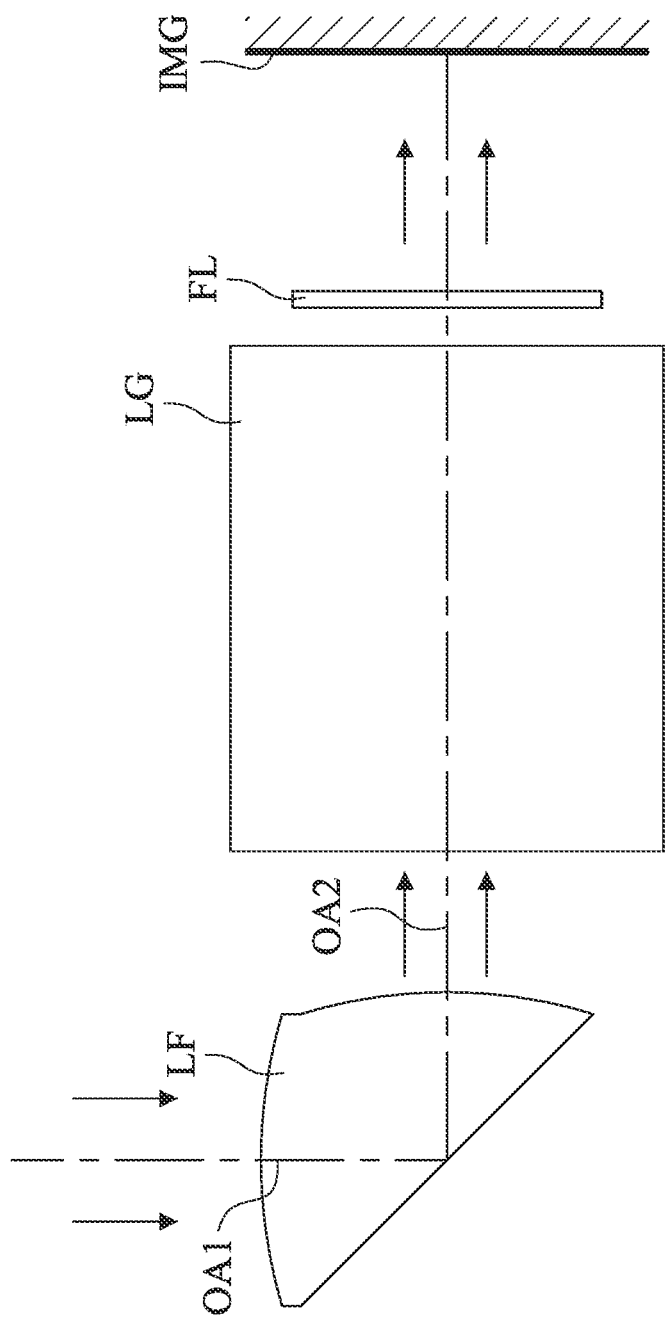
FIG. 23B is a schematic view of another arrangement of the light path folding element in the imaging system lens assembly of the present disclosure.
Figure 23C:
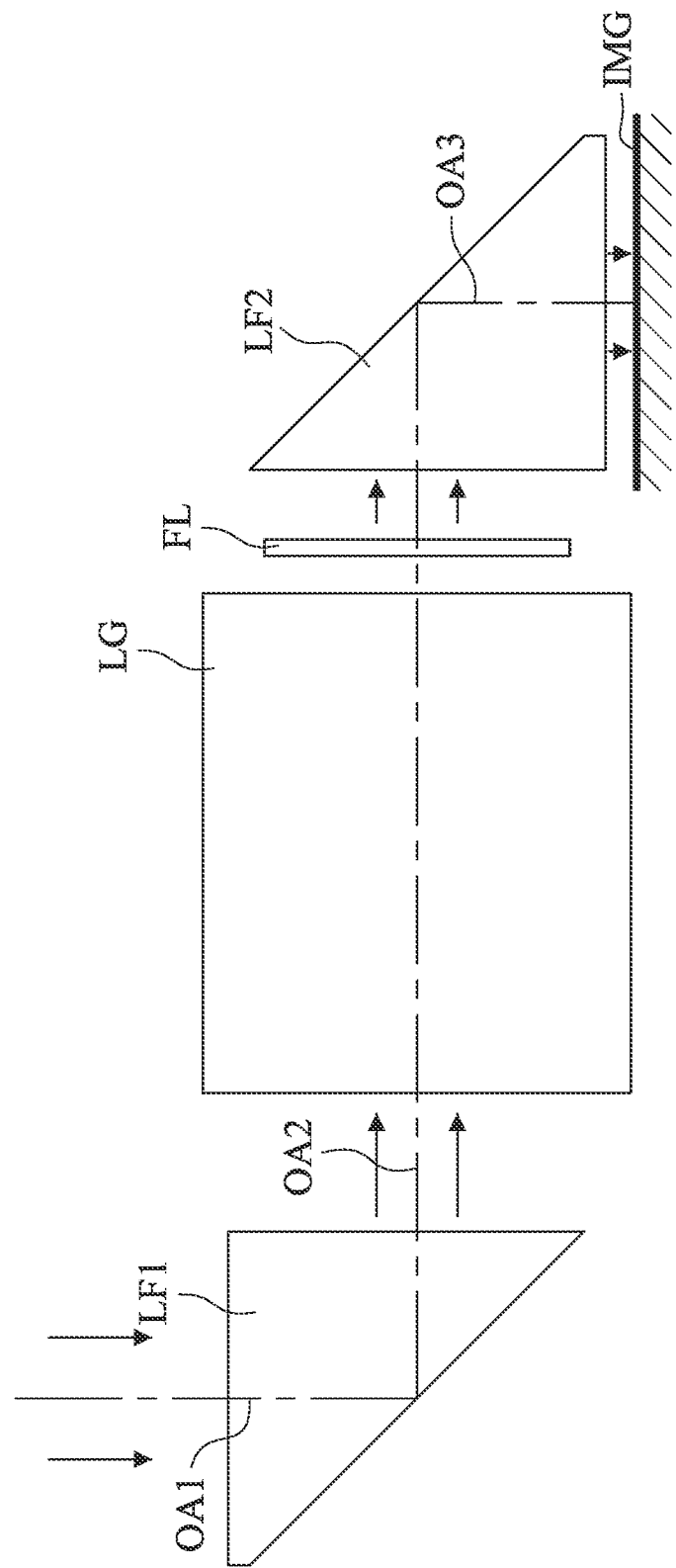
FIG. 23C is a schematic view of an arrangement of two light path folding elements in the imaging system lens assembly of the present disclosure.
Figure 23D:
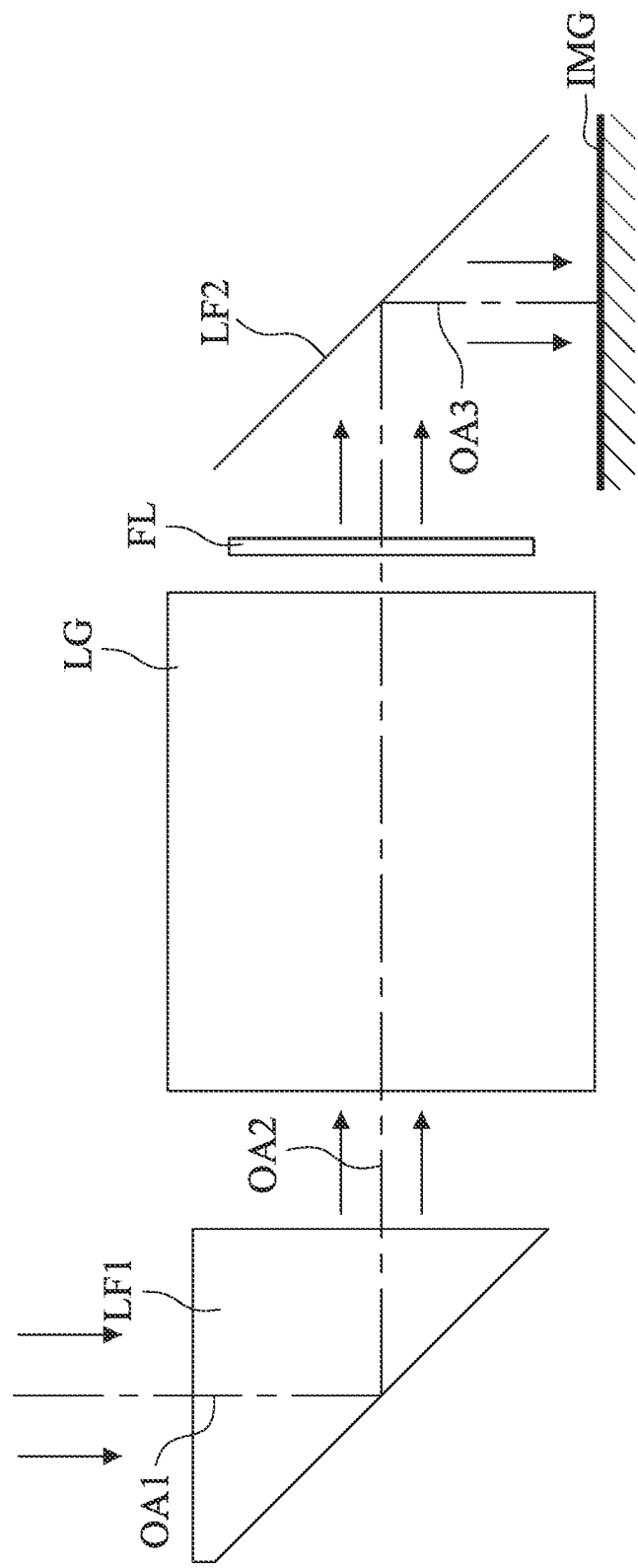
FIG. 23D is a schematic view of another arrangement of the two light path folding elements in the imaging system lens assembly of the present disclosure.

According to the imaging system lens assembly of the present disclosure, at least one element with light path folding function can be selectively disposed between the imaged object and the image surface, such as a prism or a mirror. Therefore, it is favorable for providing high flexible space arrangement of the imaging system lens assembly, so that the compactness of the electronic device would not be restricted by the optical total track length of the imaging system lens assembly. FIG. 23A is a schematic view of an arrangement of a light path folding element LF in the imaging system lens assembly of the present disclosure. FIG. 23B is a schematic view of another arrangement of the light path folding element LF in the imaging system lens assembly of the present disclosure. As shown in FIG. 23A and FIG. 23B, the imaging system lens assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the imaging system lens assembly. The imaging system lens assembly can include a light filter FL disposed between the lens group LG and the image surface IMG, and the plane of incidence and the exit plane of the light path folding element LF can be planar as shown in FIG. 23A or be curved as shown in FIG. 23B. Moreover, FIG. 23C is a schematic view of an arrangement of two light path folding elements LF1, LF2 in the imaging system lens assembly of the present disclosure. FIG. 23D is a schematic view of another arrangement of the two light path folding elements LF1, LF2 in the imaging system lens assembly of the present disclosure. As shown in FIG. 23C and FIG. 23D, the imaging system lens assembly includes, in order from an imaged object (not shown in drawings) to an image surface IMG, a first optical axis OA1, the light path folding element LF1, a second optical axis OA2, the light path folding element LF2 and a third optical axis OA3, wherein the light path folding element LF1 is disposed between the imaged object and a lens group LG of the imaging system lens assembly, and the light path folding element LF2 is disposed between the lens group LG of the imaging system lens assembly and the image surface IMG. The imaging system lens assembly can include a light filter FL disposed between the lens group LG and the light path folding element LF2, and the light path folding element LF2 can be a prism as shown in FIG. 23C or a mirror as shown in FIG. 23D. Furthermore, FIG. 23E is a schematic view of one another arrangement of the light path folding element LF in the imaging system lens assembly of the present disclosure. As shown in FIG. 23E, the imaging system lens assembly includes, in order from an imaged object (not shown in drawings) to an image surface IMG, a first optical axis OA1, the light path folding element LF, a second optical axis OA2 and a third optical axis OA3, wherein the light path folding element LF is disposed between a lens group LG of the imaging system lens assembly and the image surface IMG. The imaging system lens assembly can include a light filter FL disposed between the lens group LG and the light path folding element LF, and the light path can be folded twice in the light path folding element LF as shown in FIG. 23E. Furthermore, FIG. 23F is a schematic view of still another arrangement of the light path folding element LF in the imaging system lens assembly of the present disclosure. As shown in FIG. 23F, the imaging system lens assembly includes, in order from an imaged object (not shown in drawings) to an image surface IMG, a first optical axis OA1, the light path folding element LF and a second optical axis OA2, wherein the light path folding element LF is disposed between a lens group LG of the imaging system lens assembly and the image surface IMG. The imaging system lens assembly can include a light filter FL disposed between the light path folding element LF and the image surface IMG, and the light path can be folded four times in the light path folding element LF as shown in FIG. 23F. The imaging system lens assembly can also be selectively disposed with three or more light path folding elements, the type, amount and location of the light path folding elements will not be limited to the present disclosure.

According to the imaging system lens assembly of the present disclosure, the imaging system lens assembly can include at least one stop, such as an aperture stop, a glare stop or a field stop. Said glare stop or said field stop is for eliminating the stray light and thereby improving the image resolution thereof.

According to the imaging system lens assembly of the present disclosure, an aperture stop can be configured as a front stop or a middle stop. A front stop disposed between the imaged object and the first lens element can provide a longer distance between an exit pupil of the imaging system lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the imaging system lens assembly and thereby provides a wide field of view for the same.

According to the imaging system lens assembly of the present disclosure, an aperture adjusting unit can be properly configured. The aperture adjusting unit can be a mechanical part or a light control part, and the dimension and the shape of the aperture adjusting unit can be electrically controlled. The mechanical part can include a moveable component such as a blade group or a shielding plate. The light control part can include a screen component such as a light filter, electrochromic material, a liquid crystal layer or the like. The amount of incoming light or the exposure time of the image can be controlled by the aperture adjusting unit to enhance the image moderation ability. In addition, the aperture adjusting unit can be the aperture stop of the imaging system lens assembly according to the present disclosure so as to moderate the image properties such as depth of field or the exposure speed by changing f-number.

According to the imaging system lens assembly of the present disclosure, one or more optical element can be properly configured so as to limit the way of light passing through the imaging system lens assembly. The aforementioned optical element can be a filter, a polarizer, etc., and it is not limited thereto. Moreover, the aforementioned optical element can be a single piece of element, a complex assembly or presented in a form of membrane, which is not limited thereto. The aforementioned optical element can be disposed at the object side, at the image side or between the lens elements of the imaging system lens assembly so as to allow the specific light to pass through, which will meet the requirements of applications.

According to the imaging system lens assembly of the present disclosure, the imaging system lens assembly can be utilized in 3D (three-dimensional) image capturing applications, in products such as digital cameras, mobile devices, digital tablets, smart TVs, surveillance systems, motion sensing input devices, driving recording systems, rearview camera systems, wearable devices, and unmanned aerial vehicles.

According to the present disclosure, an imaging apparatus is provided. The imaging apparatus includes the aforementioned imaging system lens assembly and an image sensor, wherein the image sensor is disposed on the image surface of the aforementioned imaging system lens assembly. Through arranging the lens elements in the imaging system lens assembly, it can ensure that the imaging system lens assembly can perform better telephoto function. Moreover, the imaging apparatus can further include a barrel member, a holder member or a combination thereof.

According to the present disclosure, an electronic device is provided, wherein the electronic device includes the aforementioned imaging apparatus. Therefore, it is favorable for enhancing the image quality. Moreover, the electronic device can further include, but not limited to, a control unit, a display, a storage unit, a random access memory unit (RAM) or a combination thereof.

According to the above description of the present disclosure, the following specific embodiments are provided for further explanation.

1st Embodiment

Figure 2:
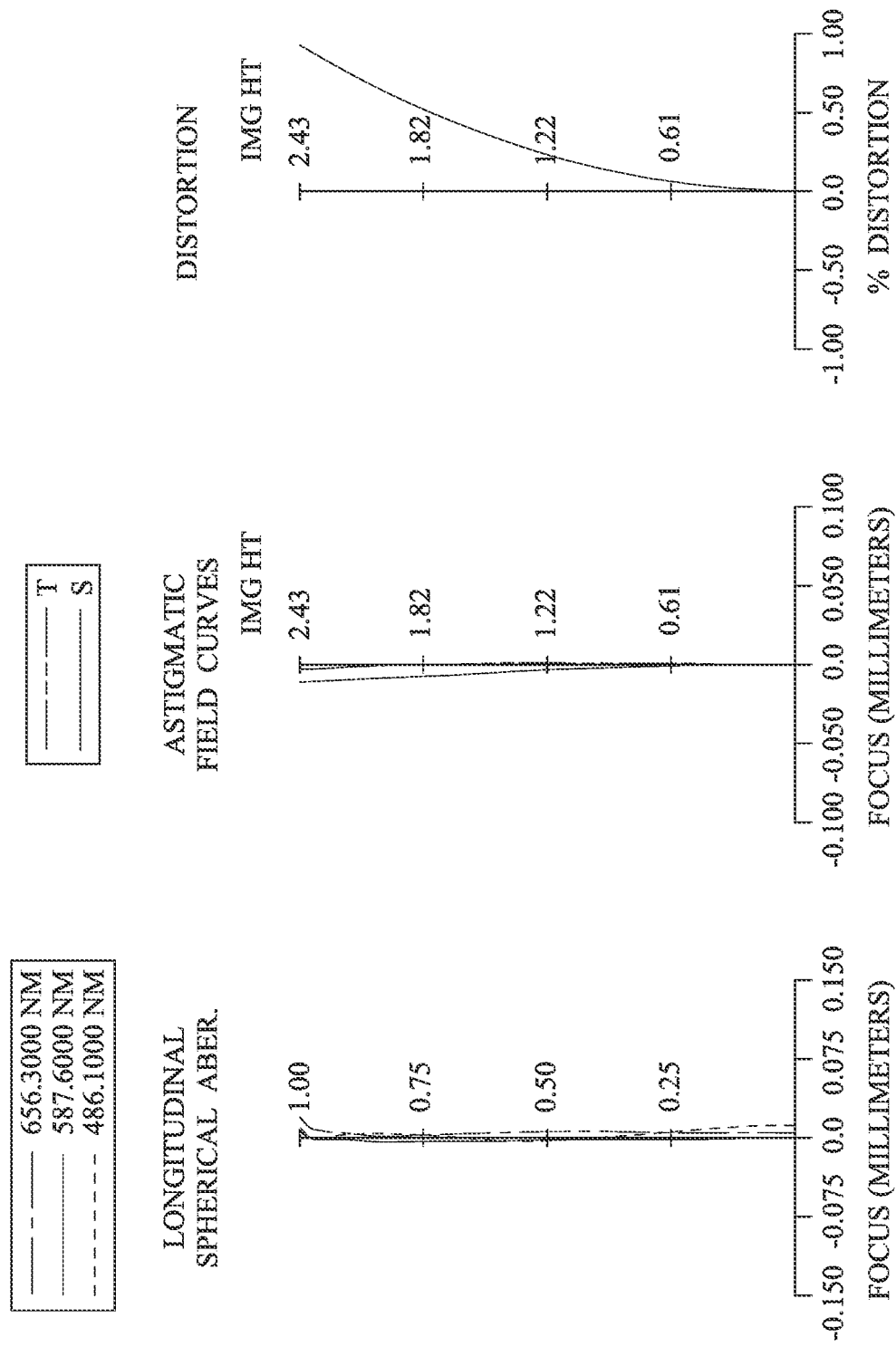
FIG. 2 shows, in order from left to right, spherical aberration curves, astigmatic field curves and a distortion curve of the imaging apparatus according to the 1st embodiment.

FIG. 1 is a schematic view of an imaging apparatus 1 according to the 1 st embodiment of the present disclosure. FIG. 2 shows, in order from left to right, spherical aberration curves, astigmatic field curves and a distortion curve of the imaging apparatus 1 according to the 1st embodiment. In FIG. 1, the imaging apparatus 1 according to the 1st embodiment includes an imaging system lens assembly (its reference number is omitted) and an image sensor IS. The imaging system lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being convex in a paraxial region thereof. The first lens element E1 is made of plastic material, and has the object-side surface and the image-side surface being both aspheric. Moreover, the image-side surface of the first lens element E1 includes one inflection point.

The second lens element E2 with positive refractive power has an object-side surface being convex in a paraxial region thereof and an image-side surface being convex in a paraxial region thereof. The second lens element E2 is made of plastic material, and has the object-side surface and the image-side surface being both aspheric. Moreover, the object-side surface of the second lens element E2 includes one inflection point, and the image-side surface of the second lens element E2 includes two inflection points.

The third lens element E3 with negative refractive power has an object-side surface being concave in a paraxial region thereof and an image-side surface being convex in a paraxial region thereof. The third lens element E3 is made of plastic material, and has the object-side surface and the image-side surface being both aspheric. Moreover, the object-side surface of the third lens element E3 includes three inflection points, and the image-side surface of the third lens element E3 includes three inflection points.

The fourth lens element E4 with negative refractive power has an object-side surface being concave in a paraxial region thereof and an image-side surface being concave in a paraxial region thereof. The fourth lens element E4 is made of plastic material, and has the object-side surface and the image-side surface being both aspheric. Moreover, the object-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of plastic material, and has the object-side surface and the image-side surface being both aspheric.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The equation of the aspheric surface profiles of the aforementioned lens elements is expressed as follows:

$$X(Y) = (Y^2/R)/(1 + \text{sqrt}(1 - (1+k) \times (Y/R)^2)) + \sum_i (Ai) \times (Y^i);$$

wherein,

X is a displacement in parallel with an optical axis from the intersection point of the aspheric surface and the optical axis to a point at a distance Y from the optical axis on the aspheric surface;

Y is the vertical distance from the point on the aspheric surface to the optical axis;

R is the curvature radius;

k is the conic coefficient; and

Ai is the i-th aspheric coefficient.

In the imaging system lens assembly according to the 1st embodiment, when the focal length of the imaging system lens assembly is f, an f-number of the imaging system lens assembly is Fno, and half of a maximum field of view of the imaging system lens assembly is HFOV, these parameters have the following values: f=17.30 mm; Fno=2.80; and HFOV=7.9 degrees.

In the imaging system lens assembly according to the 1st embodiment, when an axial distance between the image-side surface of the fifth lens element E5 and the image surface IMG is BL, an axial distance between the object-side surface of the first lens element E1 and the image-side surface of the fifth lens element E5 is TD, the focal length of the imaging system lens assembly is f, and a central thickness of the first lens element E1 is CT1, the following conditions are satisfied: BL/TD=2.92; f/BL=1.17; and CT1/BL=0.07.

In the imaging system lens assembly according to the 1st embodiment, when a maximum image height of the imaging system lens assembly is ImgH, and an axial distance between the object-side surface of the first lens element E1 and the image surface IMG is TL, the following condition is satisfied: ImgH/TL=0.12.

In the imaging system lens assembly according to the 1st embodiment, when the axial distance between the object-side surface of the first lens element E1 and the image-side surface of the fifth lens element E5 is TD, and an axial distance between the aperture stop ST and the image-side surface of the fifth lens element E5 is SD, the following conditions are satisfied: TD=5.07 mm; and SD/TD=0.88.

In the imaging system lens assembly according to the 1st embodiment, when the central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, a sum of all central thicknesses of the five lens elements of the imaging system lens assembly is ΣCT, and the axial distance between the object-side surface of the first lens element E1 and the image-side surface of the fifth lens element E5 is TD, the following conditions are satisfied: ΣCT/TD=0.86; and CT3/CT2=0.65. In the 1st embodiment, ΣCT=CT1+CT2+CT3+CT4+CT5.

In the imaging system lens assembly according to the 1st embodiment, when an axial distance between the first lens element E1 and the second lens element E2 is T12, an axial distance between the fourth lens element E4 and the fifth lens element E5 is T45, and the central thickness of the second lens element E2 is CT2, the following conditions are satisfied: T12/CT2=0.06; and T12/T45=0.27. In the 1st embodiment, the axial distance between two adjacent lens elements is the axial distance between two adjacent surfaces of the two adjacent lens elements.

In the imaging system lens assembly according to the 1st embodiment, when the focal length of the imaging system lens assembly is f, a focal length of the first lens element E1 is f1, a focal length of the second lens element E2 is f2, a focal length of the third lens element E3 is f3, a focal length of the fourth lens element E4 is f4, and a focal length of the fifth lens element E5 is f5, the following conditions are satisfied: |f2/f5|=1.09; and |f/f1|+|f/f2|+|f/f3|+|f/f4|+|f/f5|=9.24.

In the imaging system lens assembly according to the 1st embodiment, when a curvature radius of the object-side surface of the first lens element E1 is R1, a curvature radius of the image-side surface of the third lens element E3 is R6, and a curvature radius of the image-side surface of the fourth lens element E4 is R8, the following conditions are satisfied: |R8/R6|=0.08; and (|R1|+|R8|)/(|R1|−|R8|)=1.87.

In the imaging system lens assembly according to the 1st embodiment, when a distance in parallel with the optical axis from an axial vertex on the image-side surface of the fourth lens element E4 to a maximum effective radius position on the image-side surface of the fourth lens element E4 is SAG4R2, and the central thickness of the fourth lens element E4 is CT4, the following condition is satisfied: |SAG4R2|/CT4=0.91.

In the imaging system lens assembly according to the 1st embodiment, when a height of a maximum effective radius of the object-side surface of the first lens element E1 is Y1R1, a height of a maximum effective radius of the image-side surface of the fifth lens element E5 is Y5R2, and the maximum image height of the imaging system lens assembly is ImgH, the following conditions are satisfied: Y1R1/Y5R2=1.66; and Y5R2/ImgH=0.77.

In the imaging system lens assembly according to the 1st embodiment, when an Abbe number of the fourth lens element E4 is V4, and an Abbe number of the fifth lens element E5 is V5, the following condition is satisfied: V4+V5=41.7.

The detailed optical data of the 1 st embodiment are shown in Table 1A and the aspheric surface data are shown in Table 1B below.

the equation of the aspheric surface profiles, and A4-A16 represent the aspheric coefficients of each surface ranging from the 4th order to the 16th order. The tables presented below for each embodiment correspond to the schematic view and aberration curves of each embodiment, and term definitions of the tables are the same as those in Table 1A and Table 1B of the 1st embodiment. Therefore, an explanation in this regard will not be provided again.

TABLE 1A

1st Embodiment
f = 17.30 mm, Fno = 2.80, HFOV = 7.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.600 | | | | |
| 2 | Lens 1 | 8.4021 ASP | 1.093 | Plastic | 1.544 | 56.0 | 12.56 |
| 3 | | −34.8507 ASP | 0.067 | | | | |
| 4 | Lens 2 | 6.5893 ASP | 1.050 | Plastic | 1.544 | 56.0 | 10.94 |
| 5 | | −57.9615 ASP | 0.178 | | | | |
| 6 | Lens 3 | −19.3312 ASP | 0.679 | Plastic | 1.530 | 55.8 | −102.53 |
| 7 | | −30.3616 ASP | 0.189 | | | | |
| 8 | Lens 4 | −450.8252 ASP | 0.777 | Plastic | 1.639 | 23.5 | −3.95 |
| 9 | | 2.5371 ASP | 0.251 | | | | |
| 10 | Lens 5 | 5.4294 ASP | 0.789 | Plastic | 1.680 | 18.2 | 10.02 |
| 11 | | 25.1276 ASP | 0.748 | | | | |
| 12 | Stop | Plano | 0.727 | | | | |
| 13 | Prism | Plano | 12.299 | Glass | 1.517 | 64.2 | — |
| 14 | | Plano | 0.810 | | | | |
| 15 | Filter | Plano | 0.210 | Glass | 1.516 | 64.1 | — |
| 16 | | Plano | 0.043 | | | | |
| 17 | Image | Plano | — | | | | |

Reference wavelength is 587.6 nm (d-line).
Effective radius of Surface 12 (Stop S1) is 1.79 mm.

TABLE 1B

Aspheric Coefficients

| Surface # | 2 | 3 | 4 | 5 | 6 |
|---|---|---|---|---|---|
| k= | 6.030150E−01 | 5.119940E+01 | −4.919760E+00 | 8.885450E+01 | −5.205080E+01 |
| A4= | 1.995500E−04 | 2.213090E−04 | 9.616980E−04 | 9.749530E−05 | 1.750340E−03 |
| A6= | −7.161700E−05 | −2.486760E−05 | −4.842130E−05 | 1.007120E−04 | 1.163520E−05 |
| A8= | 4.815890E−06 | 5.403500E−06 | 1.479110E−05 | −2.941050E−06 | −2.179480E−05 |
| A10= | 4.386610E−07 | 4.946030E−07 | −3.442840E−06 | 1.795440E−07 | −2.162510E−07 |
| A12= | | 2.654300E−08 | 8.108090E−08 | −8.382430E−08 | −6.751350E−10 |
| A14= | | −4.574060E−09 | 6.654640E−08 | | 2.820290E−08 |
| A16= | | | −6.845920E−09 | | |

| Surface # | 7 | 8 | 9 | 10 | 11 |
|---|---|---|---|---|---|
| k= | 9.238910E+01 | 3.109210E+01 | −7.251640E−01 | 3.095380E+00 | −5.503420E+01 |
| A4= | 3.613540E−03 | −1.323560E−02 | −9.608890E−03 | 1.798760E−02 | 1.387810E−02 |
| A6= | −4.066150E−04 | 2.231600E−03 | 7.413370E−04 | −1.780740E−03 | 4.599800E−04 |
| A8= | 1.444530E−04 | 2.227210E−04 | −3.662900E−04 | −5.945650E−04 | 1.075930E−04 |
| A10= | −6.104250E−05 | −1.287440E−04 | 1.768170E−04 | 2.627000E−04 | −4.844040E−05 |
| A12= | 9.182010E−06 | 1.769650E−05 | −1.413360E−05 | −2.980900E−05 | −7.410580E−06 |
| A14= | −2.171130E−07 | −7.194540E−07 | −5.619180E−06 | 1.033930E−07 | 1.017630E−05 |
| A16= | −2.810230E−08 | −1.653760E−08 | 7.817690E−07 | 4.974720E−08 | −1.495220E−06 |

Figure 3:
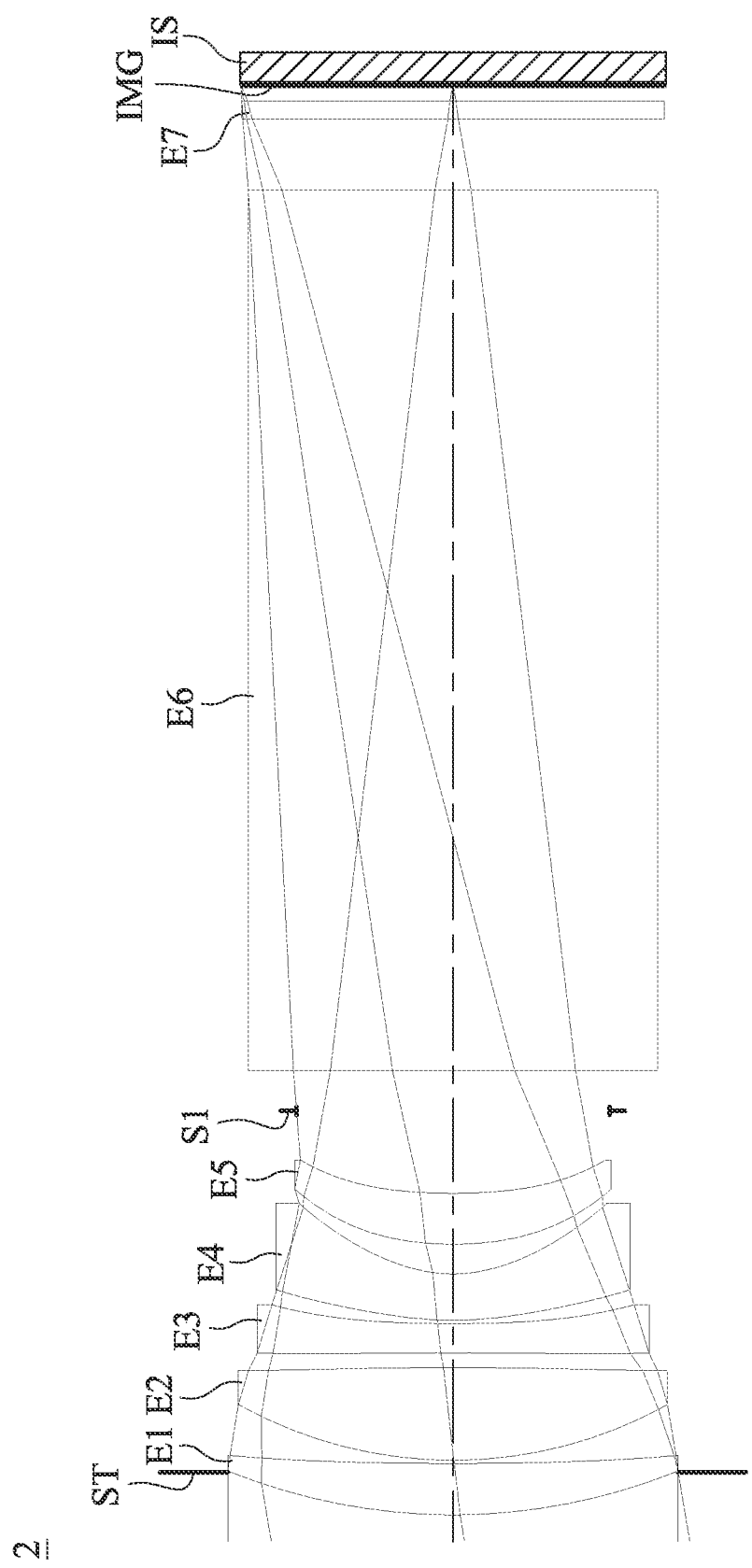
FIG. 3 is a schematic view of an imaging apparatus according to the 2nd embodiment of the present disclosure.
Figure 4:
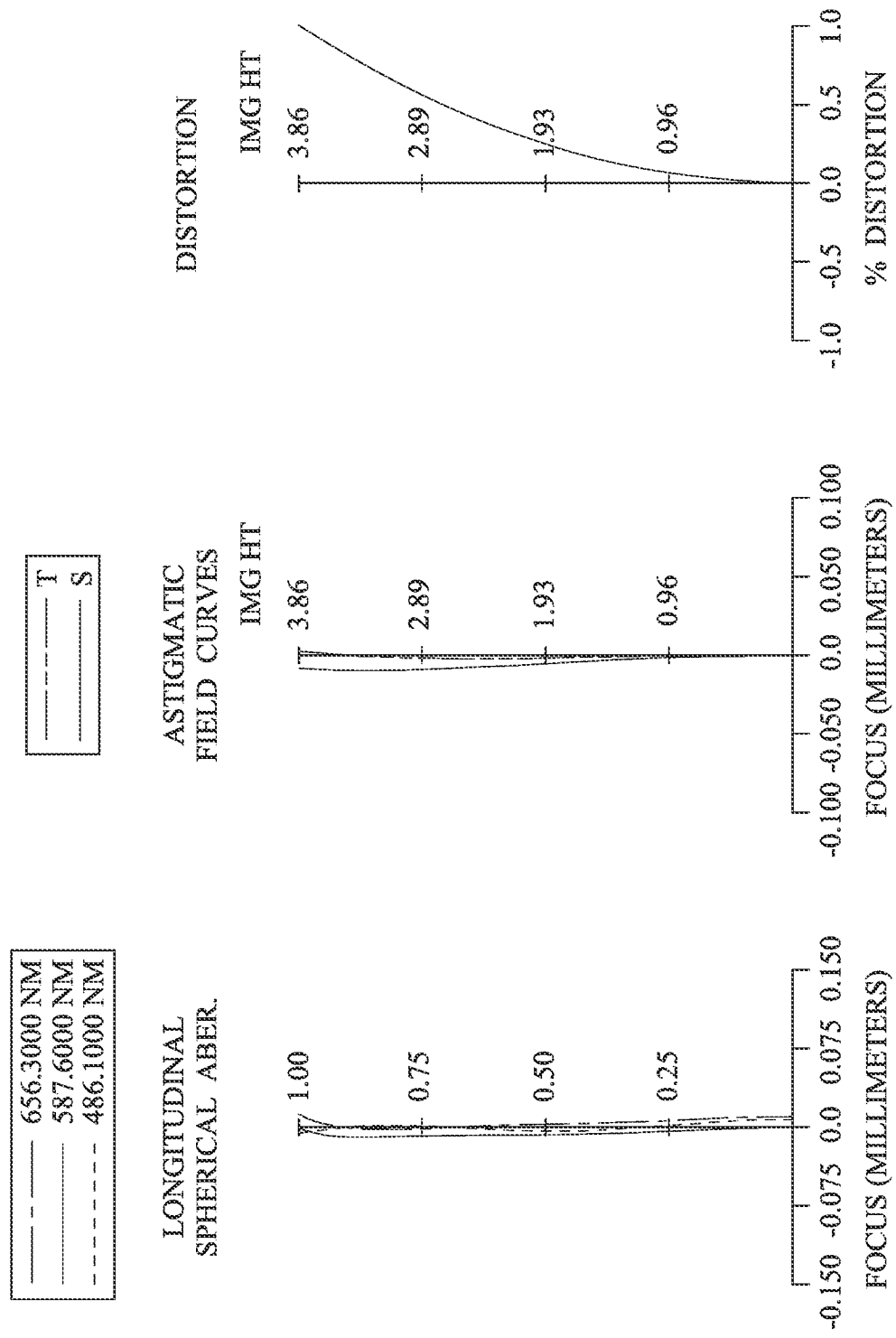
FIG. 4 shows, in order from left to right, spherical aberration curves, astigmatic field curves and a distortion curve of the imaging apparatus according to the 2nd embodiment.

Table A1 shows the detailed optical data of FIG. 1 of the 1st embodiment, wherein the curvature radius, thickness and the focal length are shown in millimeters (mm), Surface numbers 0-17 represent the surfaces sequentially arranged from the object side to the image side, and the refractive index is measured in accordance with the reference wavelength. Table 1B shows the aspheric surface data of the 1st embodiment, wherein k represents the conic coefficient of 2nd Embodiment FIG. 3 is a schematic view of an imaging apparatus 2 according to the 2nd embodiment of the present disclosure. FIG. 4 shows, in order from left to right, spherical aberration curves, astigmatic field curves and a distortion curve of the imaging apparatus 2 according to the 2nd embodiment. In FIG. 3, the imaging apparatus 2 according to the 2nd embodiment includes an imaging system lens assembly (its reference number is omitted) and an image sensor IS. The imaging system lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being concave in a paraxial region thereof. The first lens element E1 is made of plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of plastic material, and has the object-side surface and the image-side surface being both aspheric. Moreover, the image-side surface of the second lens element E2 includes one inflection point.

The third lens element E3 with negative refractive power has an object-side surface being concave in a paraxial region thereof and an image-side surface being concave in a paraxial region thereof. The third lens element E3 is made of plastic material, and has the object-side surface and the image-side surface being both aspheric. Moreover, the object-side surface of the third lens element E3 includes one inflection point.

The fourth lens element E4 with negative refractive power has an object-side surface being convex in a paraxial region thereof and an image-side surface being concave in a paraxial region thereof. The fourth lens element E4 is made of plastic material, and has the object-side surface and the image-side surface being both aspheric.

The fifth lens element E5 with positive refractive power has an object-side surface being convex in a paraxial region thereof and an image-side surface being concave in a paraxial region thereof. The fifth lens element E5 is made of plastic material, and has the object-side surface and the image-side surface being both aspheric.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 2nd embodiment are shown in Table 2A and the aspheric surface data are shown in Table 2B below.

TABLE 2A

2nd Embodiment
f = 22.88 mm, Fno = 2.80, HFOV = 9.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.772 | | | | |
| 2 | Lens 1 | 10.8291 ASP | 0.932 | Plastic | 1.544 | 56.0 | 23.29 |
| 3 | | 72.2629 ASP | 0.060 | | | | |
| 4 | Lens 2 | 7.9990 ASP | 1.682 | Plastic | 1.544 | 56.0 | 13.69 |
| 5 | | −99.9862 ASP | 0.268 | | | | |
| 6 | Lens 3 | −150.5424 ASP | 0.530 | Plastic | 1.614 | 26.0 | −38.60 |
| 7 | | 28.1562 ASP | 0.060 | | | | |
| 8 | Lens 4 | 6.3471 ASP | 0.844 | Plastic | 1.639 | 23.5 | −8.18 |
| 9 | | 2.7175 ASP | 0.540 | | | | |
| 10 | Lens 5 | 6.2510 ASP | 0.925 | Plastic | 1.680 | 18.2 | 20.05 |
| 11 | | 10.8505 ASP | 1.497 | | | | |
| 12 | Stop | Plano | 0.730 | | | | |
| 13 | Prism | Plano | 16.000 | Glass | 1.517 | 64.2 | — |
| 14 | | Plano | 1.286 | | | | |
| 15 | Filter | Plano | 0.333 | Glass | 1.516 | 64.1 | — |
| 16 | | Plano | 0.298 | | | | |
| 17 | Image | Plano | — | | | | |

Reference wavelength is 587.6 nm (d-line).
Effective radius of Surface 12 (Stop S1) is 2.84 mm.

TABLE 2B

Aspheric Coefficients

| Surface # | 2 | 3 | 4 | 5 | 6 |
|---|---|---|---|---|---|
| k= | 4.013860E−01 | −1.674690E+01 | −2.555370E+00 | −9.900000E+01 | −9.900000E+01 |
| A4= | 8.182430E−05 | 1.366750E−04 | 5.275020E−04 | −9.418960E−05 | −1.788380E−05 |
| A6= | −1.617130E−05 | −6.771770E−06 | 9.024920E−06 | 6.614560E−06 | 1.965180E−05 |
| A8= | 2.779230E−07 | 1.750060E−07 | 5.096540E−07 | 1.506230E−07 | −5.989390E−09 |

TABLE 2B-continued

| | | Aspheric Coefficients | | | |
|---|---|---|---|---|---|
| A10= | 1.141970E−08 | 1.536260E−08 | −7.927950E−08 | 2.437750E−08 | 2.165220E−09 |
| A12= | 1.340040E−10 | 2.592260E−10 | 7.904840E−10 | −7.728040E−10 | 5.024170E−10 |
| A14= | | −2.950200E−11 | 2.156570E−10 | −8.075560E−12 | 1.838980E−11 |
| A16= | | 4.652640E−13 | −8.685320E−12 | | |

| Surface # | 7 | 8 | 9 | 10 | 11 |
|---|---|---|---|---|---|
| k= | 4.516910E+01 | −5.062500E+00 | −1.127610E+00 | 1.727670E+00 | 4.309520E+00 |
| A4= | 1.534970E−03 | −3.368250E−03 | −3.731430E−03 | 5.528620E−03 | 3.906320E−03 |
| A6= | −7.000120E−05 | 2.344430E−04 | 2.530250E−04 | −2.719380E−04 | −1.395450E−05 |
| A8= | 4.939530E−06 | 1.066590E−05 | −1.592550E−05 | −2.286920E−05 | 4.675590E−06 |
| A10= | −8.599090E−07 | −1.992610E−06 | 3.078880E−06 | 3.707950E−06 | −6.783430E−07 |
| A12= | 6.037230E−08 | 1.099700E−07 | −7.349220E−08 | −1.776820E−07 | −1.384650E−07 |
| A14= | −6.039070E−10 | −1.997190E−09 | −9.807430E−09 | −6.400940E−10 | 1.891430E−08 |
| A16= | −5.933940E−11 | −3.463760E−11 | 3.285740E−10 | 1.466520E−10 | −4.878260E−10 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

2nd Embodiment

| f [mm] | 22.88 | T12/CT2 | 0.04 |
|---|---|---|---|
| Fno | 2.80 | T12/T45 | 0.11 |
| HFOV [deg.] | 9.5 | |f2/f5| | 0.68 |
| BL/TD | 3.45 | |f/f1| + |f/f2| + |f/f3| + |f/f4| + |f/f5| | 7.19 |
| f/BL | 1.14 | |R8/R6| | 0.10 |
| CT1/BL | 0.05 | (|R1| + |R8|)/(|R1| − |R8|) | 1.67 |
| ImgH/TL | 0.15 | |SAG4R2|/CT4 | 1.52 |
| TD [mm] | 5.84 | Y1R1/Y5R2 | 1.48 |
| SD/TD | 0.87 | Y5R2/ImgH | 0.72 |
| ΣCT/TD | 0.84 | V4 + V5 | 41.7 |
| CT3/CT2 | 0.32 | | |

3rd Embodiment

Figure 5:
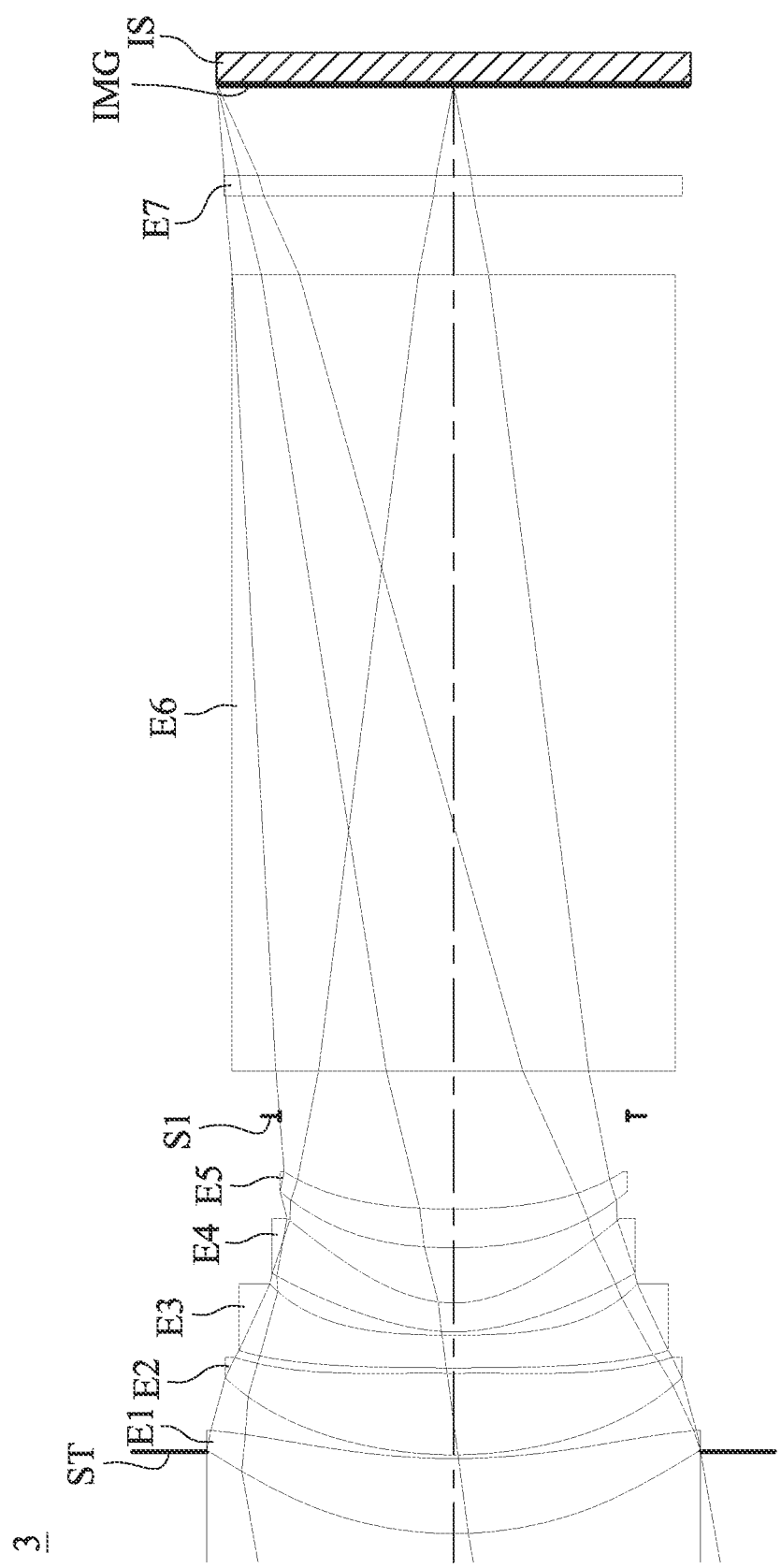
FIG. 5 is a schematic view of an imaging apparatus according to the 3rd embodiment of the present disclosure.
Figure 6:
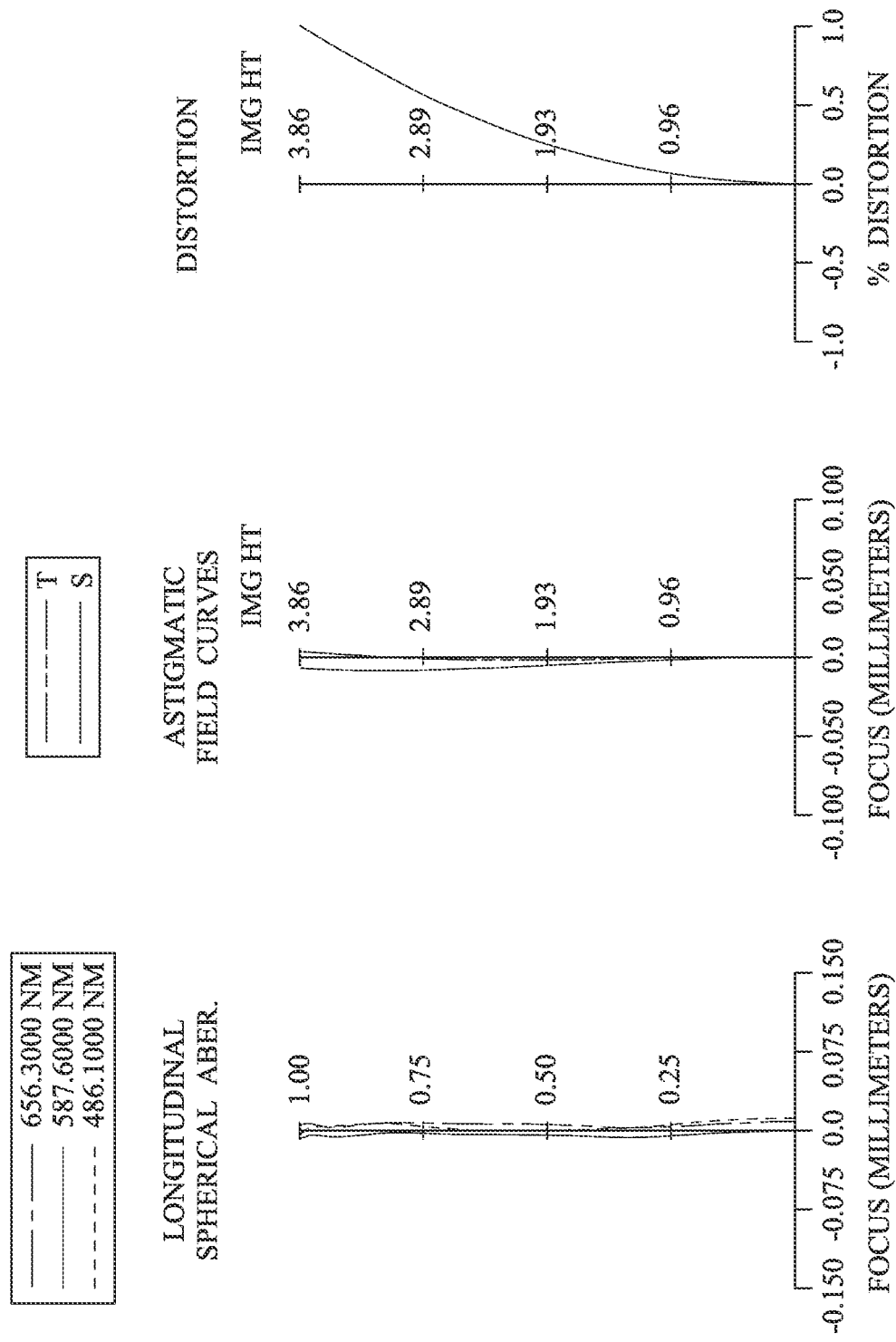
FIG. 6 shows, in order from left to right, spherical aberration curves, astigmatic field curves and a distortion curve of the imaging apparatus according to the 3rd embodiment.

FIG. 5 is a schematic view of an imaging apparatus 3 according to the 3rd embodiment of the present disclosure. FIG. 6 shows, in order from left to right, spherical aberration curves, astigmatic field curves and a distortion curve of the imaging apparatus 3 according to the 3rd embodiment. In FIG. 5, the imaging apparatus 3 according to the 3rd embodiment includes an imaging system lens assembly (its reference number is omitted) and an image sensor IS. The imaging system lens assembly includes, in order from an object side to an image side along an optical path, an aperture stop ST, a first lens element E1, a second lens element E2, a third lens element E3, a fourth lens element E4, a fifth lens element E5, a stop S1, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being concave in a paraxial region thereof. The first lens element E1 is made of plastic material, and has the object-side surface and the image-side surface being both aspheric. Moreover, the object-side surface of the first lens element E1 includes one inflection point, and the image-side surface of the first lens element E1 includes one inflection point.

The second lens element E2 with positive refractive power has an object-side surface being convex in a paraxial region thereof and an image-side surface being convex in a paraxial region thereof. The second lens element E2 is made of plastic material, and has the object-side surface and the image-side surface being both aspheric. Moreover, the image-side surface of the second lens element E2 includes one inflection point.

The third lens element E3 with negative refractive power has an object-side surface being convex in a paraxial region thereof and an image-side surface being concave in a paraxial region thereof. The third lens element E3 is made of plastic material, and has the object-side surface and the image-side surface being both aspheric.

The fourth lens element E4 with negative refractive power has an object-side surface being convex in a paraxial region thereof and an image-side surface being concave in a paraxial region thereof. The fourth lens element E4 is made of plastic material, and has the object-side surface and the image-side surface being both aspheric. Moreover, the object-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of plastic material, and has the object-side surface and the image-side surface being both aspheric.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 3rd embodiment are shown in Table 3A and the aspheric surface data are shown in Table 3B below.

TABLE 3A

3rd Embodiment
f = 21.34 mm, Fno = 2.65, HFOV = 10.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −1.337 | | | | |
| 2 | Lens 1 | 6.2865 ASP | 1.226 | Plastic | 1.544 | 56.0 | 23.62 |
| 3 | | 11.4635 ASP | 0.060 | | | | |
| 4 | Lens 2 | 6.7974 ASP | 1.330 | Plastic | 1.544 | 56.0 | 12.18 |
| 5 | | −244.7252 ASP | 0.089 | | | | |
| 6 | Lens 3 | 60.5218 ASP | 0.530 | Plastic | 1.614 | 26.0 | −32.97 |
| 7 | | 15.1142 ASP | 0.060 | | | | |
| 8 | Lens 4 | 3.3078 ASP | 0.469 | Plastic | 1.639 | 23.5 | −9.69 |
| 9 | | 2.0367 ASP | 0.901 | | | | |
| 10 | Lens 5 | 7.8633 ASP | 0.634 | Plastic | 1.680 | 18.2 | 30.89 |
| 11 | | 12.1579 ASP | 1.518 | | | | |
| 12 | Stop | Plano | 0.730 | | | | |
| 13 | Prism | Plano | 13.000 | Glass | 1.517 | 64.2 | — |
| 14 | | Plano | 1.286 | | | | |
| 15 | Filter | Plano | 0.333 | Glass | 1.516 | 64.1 | — |
| 16 | | Plano | 1.478 | | | | |
| 17 | Image | Plano | — | | | | |

Reference wavelength is 587.6 nm (d-line).
Effective radius of Surface 12 (Stop S1) is 2.84 mm.

TABLE 3B

Aspheric Coefficients

| Surface # | 2 | 3 | 4 | 5 | 6 |
|---|---|---|---|---|---|
| k= | 2.761610E−01 | −5.448590E+00 | −3.857500E+00 | −1.000000E+00 | −1.000000E+00 |
| A4= | 2.237350E−04 | −7.628150E−05 | 9.100250E−04 | 1.131080E−03 | 7.674250E−04 |
| A6= | −3.269460E−05 | −3.854040E−05 | 7.614650E−05 | 4.923130E−05 | 3.704120E−05 |
| A8= | −8.236940E−07 | −3.765200E−07 | 1.259840E−06 | 1.645600E−06 | −5.839610E−07 |
| A10= | −2.844460E−08 | 2.633520E−08 | −8.768380E−08 | 3.657480E−09 | 3.660290E−08 |
| A12= | 4.792300E−10 | 6.167680E−10 | 1.954570E−09 | −5.504060E−09 | 4.531410E−09 |
| A14= | | 3.477860E−11 | 3.847960E−10 | −3.439840E−10 | −2.645790E−10 |
| A16= | | −1.399600E−12 | −2.879120E−11 | | |

| Surface # | 7 | 8 | 9 | 10 | 11 |
|---|---|---|---|---|---|
| k= | 1.882160E+01 | −2.930990E+00 | −1.501550E+00 | 3.566630E+00 | 8.258380E+00 |
| A4= | 4.837740E−03 | −3.818040E−03 | −4.417820E−03 | 8.221290E−03 | 5.148680E−03 |
| A6= | 2.386040E−05 | 3.159720E−04 | 3.355050E−04 | −3.715510E−04 | −8.791430E−05 |
| A8= | 8.277770E−06 | 1.876760E−05 | −3.320280E−05 | −2.519270E−05 | −7.254640E−06 |
| A10= | −2.974370E−07 | −1.718580E−06 | 3.055750E−06 | 1.486880E−06 | 1.055640E−06 |
| A12= | 6.210390E−08 | 7.071460E−08 | 1.449020E−08 | −1.280670E−07 | −2.010900E−07 |
| A14= | −6.749300E−09 | −8.030430E−09 | 1.700450E−08 | 2.427480E−08 | −2.601080E−08 |
| A16= | −2.458440E−10 | −1.863670E−10 | −3.021880E−09 | 4.108470E−11 | 5.356050E−09 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

3rd Embodiment

| f [mm] | 21.34 | T12/CT2 | 0.05 |
|---|---|---|---|
| Fno | 2.65 | T12/T45 | 0.07 |
| HFOV [deg.] | 10.2 | |f2/f5| | 0.39 |
| BL/TD | 3.46 | |f/f1| + |f/f2| + |f/f3| + |f/f4| + |f/f5| | 6.20 |
| f/BL | 1.16 | |R8/R6| | 0.13 |
| CT1/BL | 0.07 | (|R1| + |R8|)/(|R1| − |R8|) | 1.96 |
| ImgH/TL | 0.16 | |SAG4R2|/CT4 | 2.95 |
| TD [mm] | 5.30 | Y1R1/Y5R2 | 1.46 |
| SD/TD | 0.75 | Y5R2/ImgH | 0.72 |
| ΣCT/TD | 0.79 | V4 + V5 | 41.7 |
| CT3/CT2 | 0.40 | | |

4th Embodiment

Figure 7:
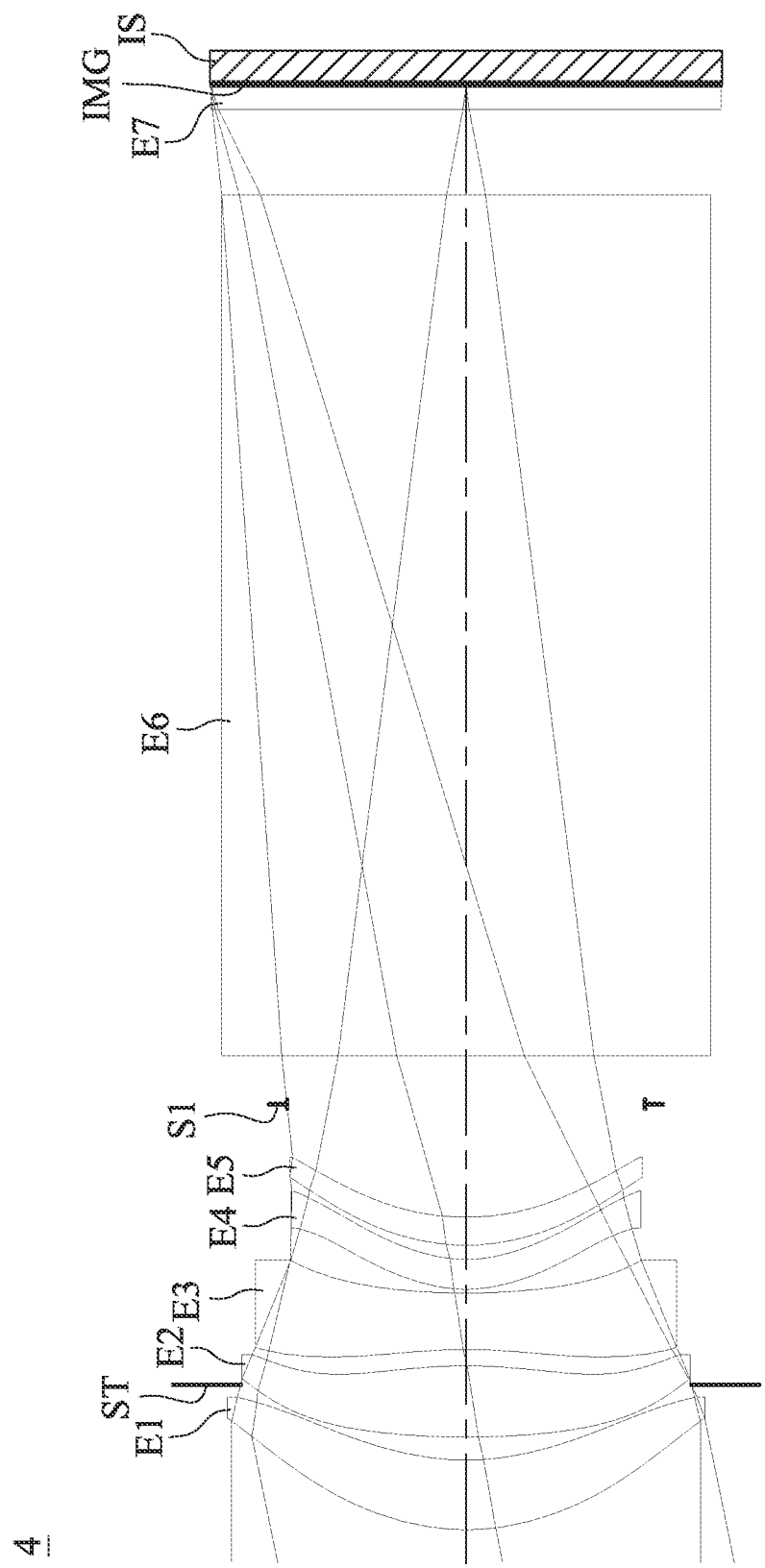
FIG. 7 is a schematic view of an imaging apparatus according to the 4th embodiment of the present disclosure.
Figure 8:
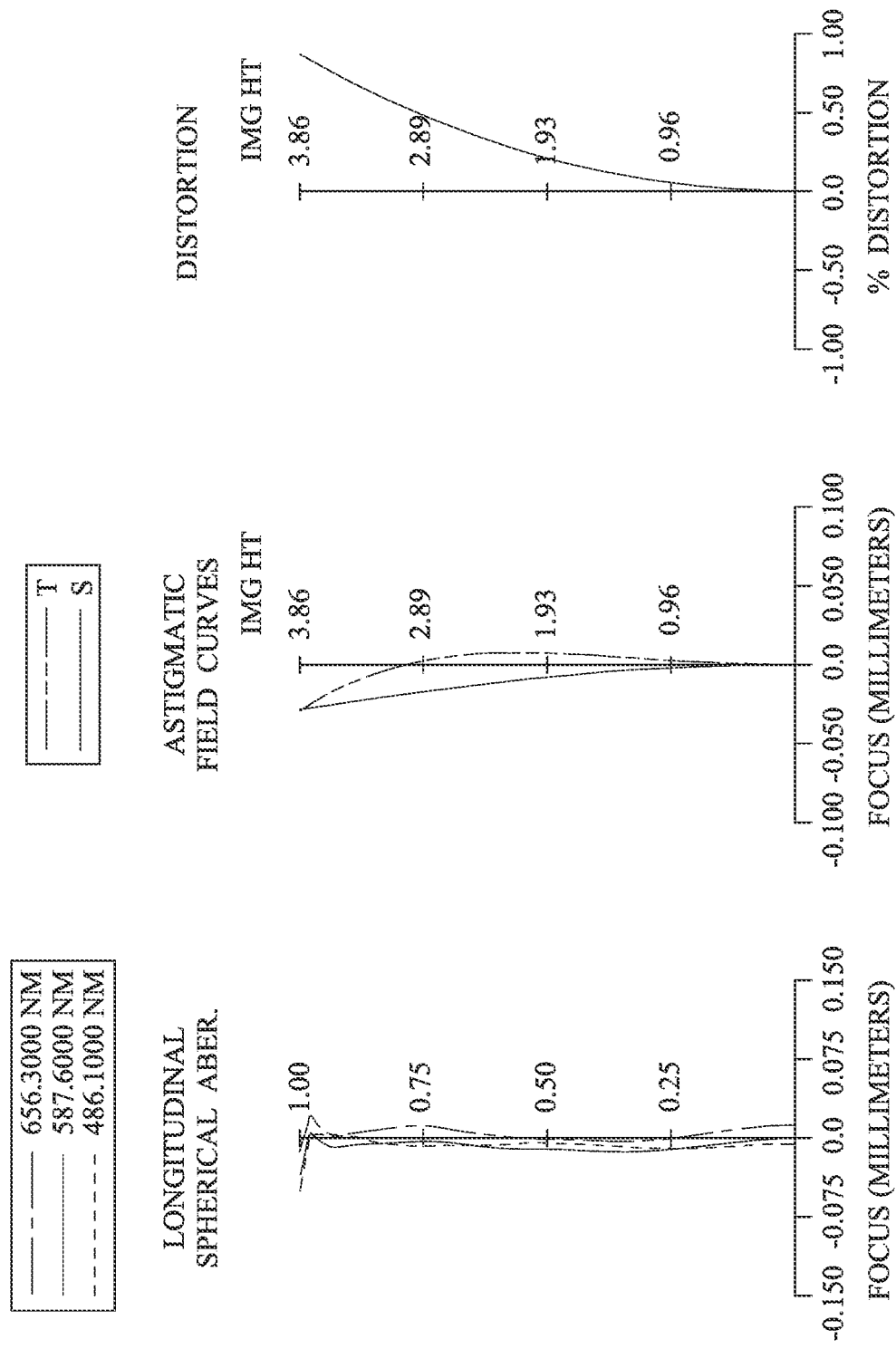
FIG. 8 shows, in order from left to right, spherical aberration curves, astigmatic field curves and a distortion curve of the imaging apparatus according to the 4th embodiment.

FIG. 7 is a schematic view of an imaging apparatus 4 according to the 4th embodiment of the present disclosure. FIG. 8 shows, in order from left to right, spherical aberration curves, astigmatic field curves and a distortion curve of the imaging apparatus 4 according to the 4th embodiment. In FIG. 7, the imaging apparatus 4 according to the 4th embodiment includes an imaging system lens assembly (its reference number is omitted) and an image sensor IS. The imaging system lens assembly includes, in order from an object side to an image side along an optical path, a first lens element E1, an aperture stop ST, a second lens element E2, a third lens element E3, a fourth lens element E4, a fifth lens element E5, a stop S1, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being concave in a paraxial region thereof. The first lens element E1 is made of plastic material, and has the object-side surface and the image-side surface being both aspheric. Moreover, the object-side surface of the first lens element E1 includes one inflection point, and the image-side surface of the first lens element E1 includes two inflection points.

The second lens element E2 with positive refractive power has an object-side surface being convex in a paraxial region thereof and an image-side surface being convex in a paraxial region thereof. The second lens element E2 is made of plastic material, and has the object-side surface and the image-side surface being both aspheric. Moreover, the object-side surface of the second lens element E2 includes one inflection point, and the image-side surface of the second lens element E2 includes two inflection points.

The third lens element E3 with negative refractive power has an object-side surface being concave in a paraxial region thereof and an image-side surface being concave in a paraxial region thereof. The third lens element E3 is made of plastic material, and has the object-side surface and the image-side surface being both aspheric. Moreover, the object-side surface of the third lens element E3 includes one inflection point.

The fourth lens element E4 with positive refractive power has an object-side surface being convex in a paraxial region thereof and an image-side surface being concave in a paraxial region thereof. The fourth lens element E4 is made of plastic material, and has the object-side surface and the image-side surface being both aspheric. Moreover, the object-side surface of the fourth lens element E4 includes one inflection point, and the image-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of plastic material, and has the object-side surface and the image-side surface being both aspheric. Moreover, the object-side surface of the fifth lens element E5 includes one inflection point, and the image-side surface of the fifth lens element E5 includes one inflection point.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 4th embodiment are shown in Table 4A and the aspheric surface data are shown in Table 4B below.

TABLE 4A

4th Embodiment
f = 18.73 mm, Fno = 2.65, HFOV = 11.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.6831 | ASP | 1.050 | Plastic | 1.544 | 56.0 | 40.38 |
| 2 | | 3.9804 | ASP | 1.136 | | | | |
| 3 | Ape. Stop | Plano | | −0.790 | | | | |
| 4 | Lens 2 | 12.6566 | ASP | 1.078 | Plastic | 1.544 | 56.0 | 8.65 |
| 5 | | −7.2697 | ASP | 0.246 | | | | |
| 6 | Lens 3 | −8.2351 | ASP | 0.850 | Plastic | 1.639 | 23.5 | −7.14 |
| 7 | | 10.6343 | ASP | 0.060 | | | | |
| 8 | Lens 4 | 2.3147 | ASP | 0.450 | Plastic | 1.639 | 23.5 | 159.72 |
| 9 | | 2.1890 | ASP | 0.214 | | | | |
| 10 | Lens 5 | 3.3434 | ASP | 0.426 | Plastic | 1.680 | 18.2 | 23.71 |
| 11 | | 4.0003 | ASP | 1.702 | | | | |
| 12 | Stop | Plano | | 0.730 | | | | |
| 13 | Prism | Plano | | 13.000 | Glass | 1.517 | 64.2 | — |
| 14 | | Plano | | 1.286 | | | | |
| 15 | Filter | Plano | | 0.333 | Glass | 1.516 | 64.1 | — |
| 16 | | Plano | | 0.052 | | | | |
| 17 | Image | Plano | | — | | | | |

Reference wavelength is 587.6 nm (d-line).

Effective radius of Surface 12 (Stop S1) is 2.70 mm.

TABLE 4B

Aspheric Coefficients

| Surface # | 1 | 2 | 4 | 5 | 6 |
|---|---|---|---|---|---|
| k= | −1.707790E−01 | −3.197340E+00 | −1.364990E+00 | −1.000000E+00 | −1.000000E+00 |
| A4= | −1.876680E−03 | 3.352150E−04 | 1.076380E−03 | 9.032590E−03 | 8.669880E−03 |
| A6= | −3.999800E−05 | −1.041400E−04 | 2.290530E−04 | 5.916990E−05 | −6.590270E−05 |
| A8= | −3.697510E−06 | −5.301680E−06 | 4.847550E−06 | 2.729020E−06 | −2.893110E−05 |
| A10= | −2.334600E−07 | −4.553640E−08 | −3.428160E−07 | −6.360570E−07 | −6.449450E−07 |
| A12= | −2.943770E−08 | 5.577490E−09 | −2.776910E−08 | −1.280370E−07 | 1.366140E−07 |
| A14= |  | 1.188100E−10 | 3.408870E−09 | 3.518650E−09 | 1.837410E−08 |
| A16= |  | 8.573840E−11 | −2.948020E−10 |  | −1.321160E−09 |

| Surface # | 7 | 8 | 9 | 10 | 11 |
|---|---|---|---|---|---|
| k= | −3.051890E+01 | −1.652960E+00 | −1.693370E+00 | 2.062450E−01 | 8.957790E−01 |
| A4= | 4.863250E−03 | −3.444710E−03 | −5.638710E−03 | −1.290210E−03 | 5.159890E−03 |
| A6= | −1.161560E−04 | −1.832820E−05 | 3.315590E−04 | −9.082710E−04 | −1.412530E−03 |
| A8= | 4.098190E−05 | −4.040840E−05 | −2.903450E−05 | −1.437790E−05 | −1.108170E−04 |
| A10= | −6.081450E−06 | −9.445380E−06 | 1.411820E−06 | 5.922680E−06 | 3.122190E−06 |
| A12= | −7.169520E−08 | 1.002230E−06 | −2.338410E−07 | −1.459500E−07 | 2.619700E−06 |
| A14= | 1.649730E−07 | 1.640930E−07 | −1.874070E−07 | 1.100200E−07 | 1.008460E−07 |
| A16= | −1.187140E−08 | −1.189190E−08 | 1.919620E−08 | −2.533490E−08 | −4.695790E−08 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

4th Embodiment

| | | | |
|---|---|---|---|
| f [mm] | 18.73 | T12/CT2 | 0.32 |
| Fno | 2.65 | T12/T45 | 1.62 |
| HFOV [deg.] | 11.5 | |f2/f5| | 0.36 |
| BL/TD | 3.62 | |f/f1| + |f/f2| + |f/f3| + |f/f4| + |f/f5| | 6.16 |
| f/BL | 1.09 | |R8/R6| | 0.21 |
| CT1/BL | 0.06 | (|R1| + |R8|)/(|R1| − |R8|) | 3.93 |
| ImgH/TL | 0.18 | |SAG4R2|/CT4 | 2.30 |
| TD [mm] | 4.72 | Y1R1/Y5R2 | 1.38 |
| SD/TD | 0.54 | Y5R2/ImgH | 0.68 |
| ΣCT/TD | 0.82 | V4 + V5 | 41.7 |
| CT3/CT2 | 0.79 | | |

5th Embodiment

Figure 9:
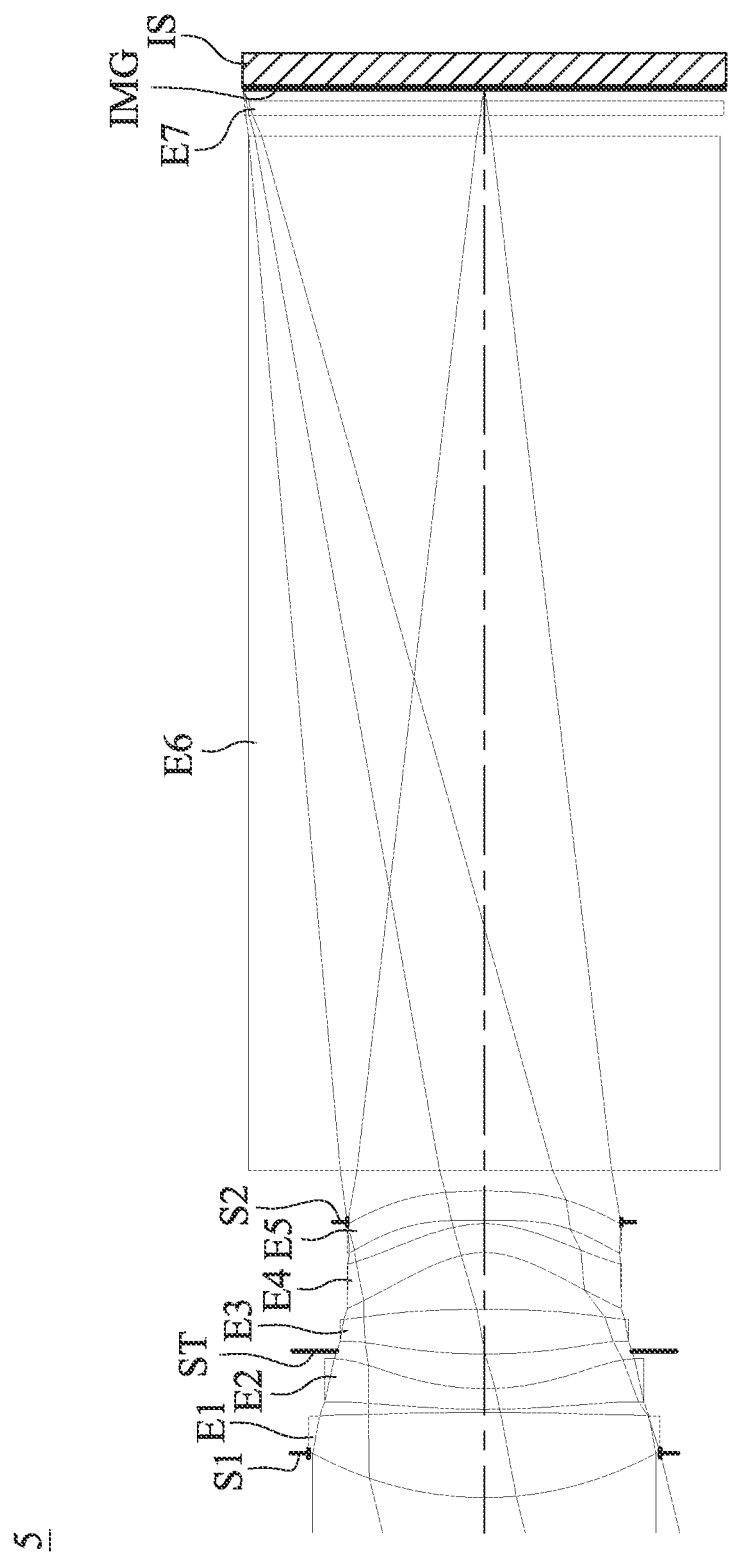
FIG. 9 is a schematic view of an imaging apparatus according to the 5th embodiment of the present disclosure.
Figure 10:
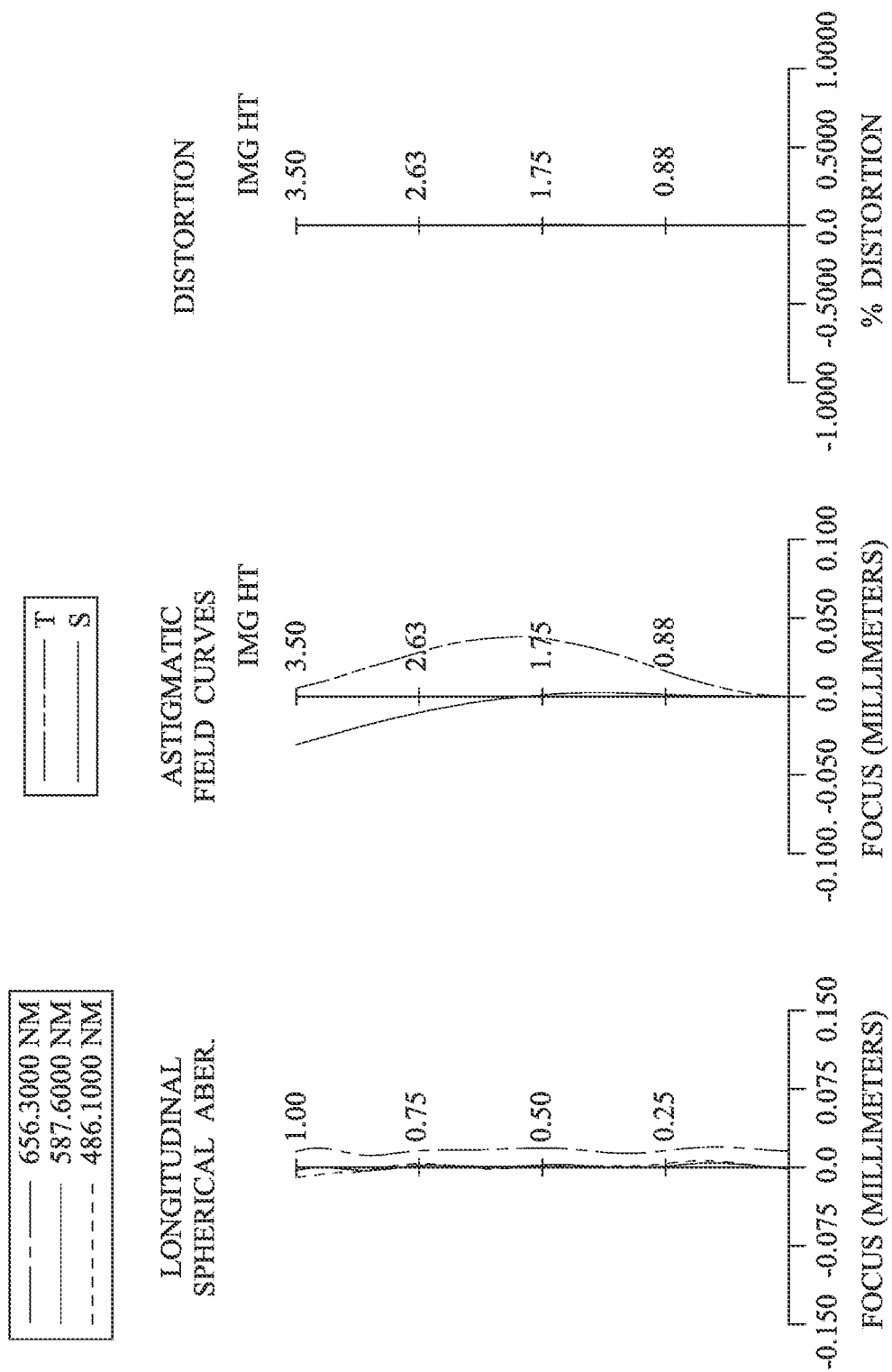
FIG. 10 shows, in order from left to right, spherical aberration curves, astigmatic field curves and a distortion curve of the imaging apparatus according to the 5th embodiment.

FIG. 9 is a schematic view of an imaging apparatus 5 according to the 5th embodiment of the present disclosure. FIG. 10 shows, in order from left to right, spherical aberration curves, astigmatic field curves and a distortion curve of the imaging apparatus 5 according to the 5th embodiment. In FIG. 9, the imaging apparatus 5 according to the 5th embodiment includes an imaging system lens assembly (its reference number is omitted) and an image sensor IS. The imaging system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being convex in a paraxial region thereof. The first lens element E1 is made of glass material, and has the object-side surface and the image-side surface being both aspheric. Moreover, the object-side surface of the first lens element E1 includes one inflection point, and the image-side surface of the first lens element E1 includes two inflection points.

The second lens element E2 with negative refractive power has an object-side surface being convex in a paraxial region thereof and an image-side surface being concave in a paraxial region thereof. The second lens element E2 is made of plastic material, and has the object-side surface and the image-side surface being both aspheric. Moreover, the object-side surface of the second lens element E2 includes four inflection points, and the image-side surface of the second lens element E2 includes one inflection point.

The third lens element E3 with positive refractive power has an object-side surface being convex in a paraxial region thereof and an image-side surface being convex in a paraxial region thereof. The third lens element E3 is made of plastic material, and has the object-side surface and the image-side surface being both aspheric. Moreover, the object-side surface of the third lens element E3 includes one inflection point, and the image-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of plastic material, and has the object-side surface and the image-side surface being both aspheric. Moreover, the object-side surface of the fourth lens element E4 includes one inflection point, and the image-side surface of the fourth lens element E4 includes one inflection point.

The fifth lens element E5 with positive refractive power has an object-side surface being concave in a paraxial region thereof and an image-side surface being convex in a paraxial region thereof. The fifth lens element E5 is made of plastic material, and has the object-side surface and the image-side surface being both aspheric. Moreover, the object-side surface of the fifth lens element E5 includes one inflection point, and the image-side surface of the fifth lens element E5 includes one inflection point.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 5th embodiment are shown in Table 5A and the aspheric surface data are shown in Table 5B below.

TABLE 5A

5th Embodiment
f = 14.25 mm, Fno = 2.87, HFOV = 13.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.645 | | | | |
| 2 | Lens 1 | 5.0411 ASP | 1.241 | Glass | 1.581 | 40.9 | 7.36 |
| 3 | | −25.6673 ASP | 0.040 | | | | |
| 4 | Lens 2 | 14.3060 ASP | 0.300 | Plastic | 1.562 | 44.6 | −9.63 |
| 5 | | 3.8959 ASP | 0.546 | | | | |
| 6 | Ape. Stop | Plano | −0.042 | | | | |
| 7 | Lens 3 | 9.8686 ASP | 0.650 | Plastic | 1.544 | 56.0 | 10.93 |
| 8 | | −14.5995 ASP | 0.822 | | | | |
| 9 | Lens 4 | −1.2913 ASP | 0.417 | Plastic | 1.669 | 19.5 | −9.02 |
| 10 | | −1.8557 ASP | 0.050 | | | | |
| 11 | Lens 5 | −178.3790 ASP | 0.423 | Plastic | 1.544 | 56.0 | 20.46 |
| 12 | | −10.4857 ASP | −0.450 | | | | |
| 13 | Stop | Plano | 0.750 | | | | |
| 14 | Prism | Plano | 15.000 | Glass | 1.517 | 64.2 | — |
| 15 | | Plano | 0.300 | | | | |
| 16 | Filter | Plano | 0.210 | Glass | 1.517 | 64.2 | — |
| 17 | | Plano | 0.196 | | | | |
| 18 | Image | Plano | — | | | | |

Reference wavelength is 587.6 nm (d-line).
Effective radius of Surface 1 (Stop S1) is 2.55 mm.
Effective radius of Surface 13 (Stop S2) is 1.99 mm.

TABLE 5B

Aspheric Coefficients

| Surface # | 2 | 3 | 4 | 5 | 7 |
|---|---|---|---|---|---|
| k= | 4.009050E−01 | 8.157230E+01 | 1.287990E+01 | −1.854220E−01 | 9.479120E+00 |
| A4= | −1.208170E−03 | 1.311480E−02 | 1.814730E−02 | 1.358390E−02 | 1.162870E−02 |
| A6= | 4.920760E−04 | −9.831530E−03 | −2.256970E−02 | −1.780700E−02 | −6.072650E−03 |
| A8= | −2.487680E−04 | 3.833620E−03 | 1.000150E−02 | 7.523830E−03 | 7.814120E−04 |
| A10= | 5.432180E−05 | −7.055480E−04 | −2.164090E−03 | −1.634990E−03 | 1.016080E−04 |
| A12= | −4.108750E−06 | 5.896030E−05 | 2.194780E−04 | 1.865460E−04 | −5.641110E−05 |
| A14= | | −1.746530E−06 | −8.134520E−06 | −3.900040E−05 | 5.186890E−06 |
| A16= | | | | 1.120260E−05 | |
| A18= | | | | −1.496460E−06 | |
| A20= | | | | 7.343000E−08 | |

| Surface # | 8 | 9 | 10 | 11 | 12 |
|---|---|---|---|---|---|
| k= | −1.391790E+01 | −3.129750E+00 | −4.932990E+00 | −9.000000E+01 | −1.865430E+01 |
| A4= | 2.258540E−03 | −3.560910E−03 | −2.086340E−02 | −8.158720E−02 | −4.677210E−02 |
| A6= | −7.981940E−04 | 9.671370E−03 | 2.370200E−02 | 2.920820E−02 | 1.261350E−02 |
| A8= | −1.284750E−03 | −6.775250E−03 | −1.345010E−02 | −9.298230E−03 | −2.700520E−03 |
| A10= | 6.174980E−04 | 2.916710E−03 | 5.002900E−03 | 1.889830E−03 | 2.202540E−04 |
| A12= | −9.741950E−05 | −7.302690E−04 | −1.160290E−03 | −1.258480E−04 | 8.741690E−05 |
| A14= | 5.826570E−06 | 9.732650E−05 | 1.518870E−04 | −1.182840E−05 | −2.286060E−05 |
| A16= | | −5.215210E−06 | −8.350500E−06 | 1.617840E−06 | 1.557970E−06 |

In the 5th embodiment, the equation of the aspheric surface profiles of the aforementioned lens elements is the same as the equation of the 1 st embodiment. Also, the definitions of these parameters shown in the following table are the same as those stated in the 1 st embodiment with corresponding values for the 5th embodiment, so an explanation in this regard will not be provided again.

Moreover, these parameters can be calculated from Table 5A and Table 5B as the following values and satisfy the following conditions:

TABLE 5C

5th Embodiment

| | | | |
|---|---|---|---|
| f [mm] | 14.25 | T12/CT2 | 0.13 |
| Fno | 2.87 | T12/T45 | 0.80 |
| HFOV [deg.] | 13.8 | |f2/f5| | 0.47 |
| BL/TD | 3.60 | |f/f1| + |f/f2| + |f/f3| + |f/f4| + |f/f5| | 7.00 |
| f/BL | 0.89 | |R8/R6| | 0.13 |
| CT1/BL | 0.08 | (|R1| + |R8|)/(|R1| − |R8|) | 2.17 |
| ImgH/TL | 0.17 | |SAG4R2|/CT4 | 1.40 |
| TD [mm] | 4.45 | Y1R1/Y5R2 | 1.28 |
| SD/TD | 0.52 | Y5R2/ImgH | 0.57 |
| ΣCT/TD | 0.68 | V4 + V5 | 75.4 |
| CT3/CT2 | 2.17 | | |

6th Embodiment

Figure 11:
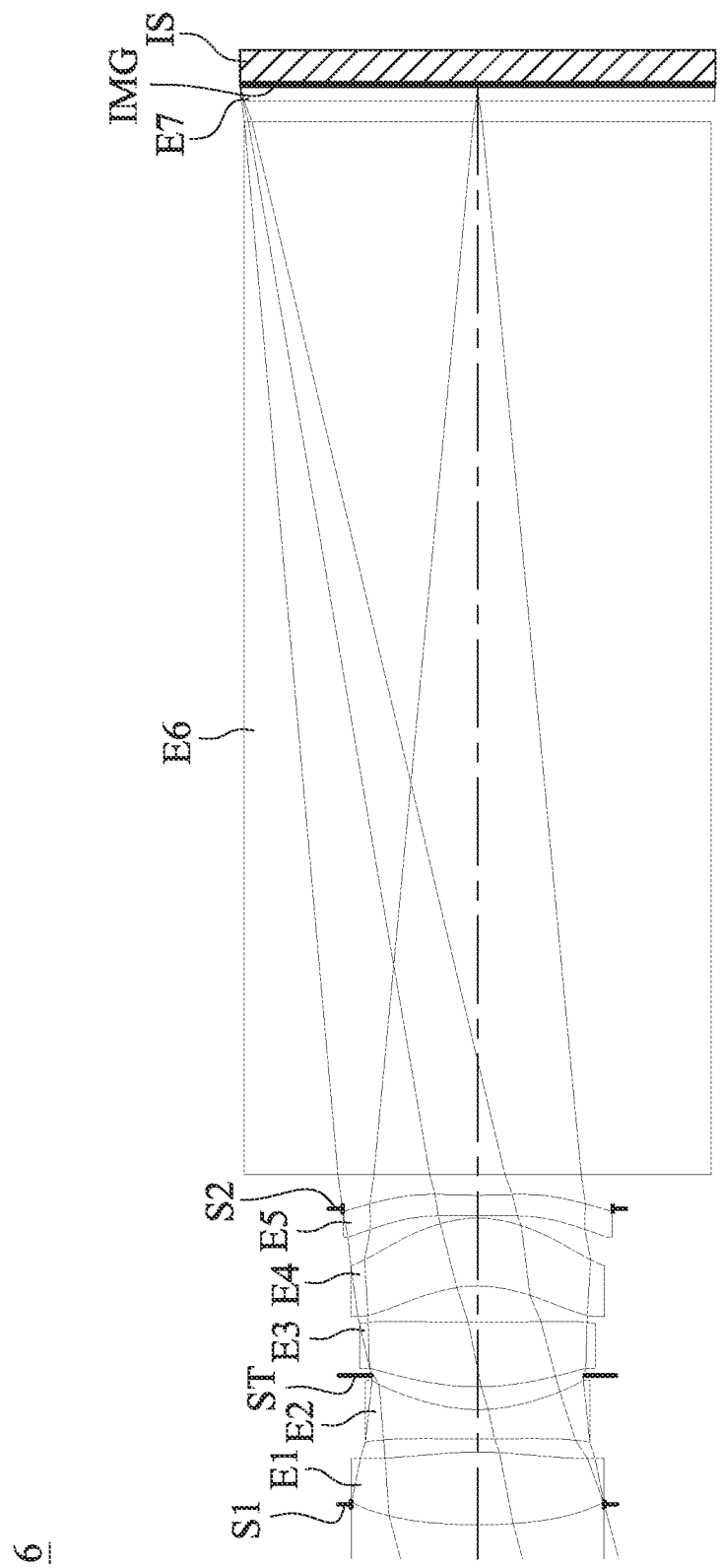
FIG. 11 is a schematic view of an imaging apparatus according to the 6th embodiment of the present disclosure.
Figure 12:
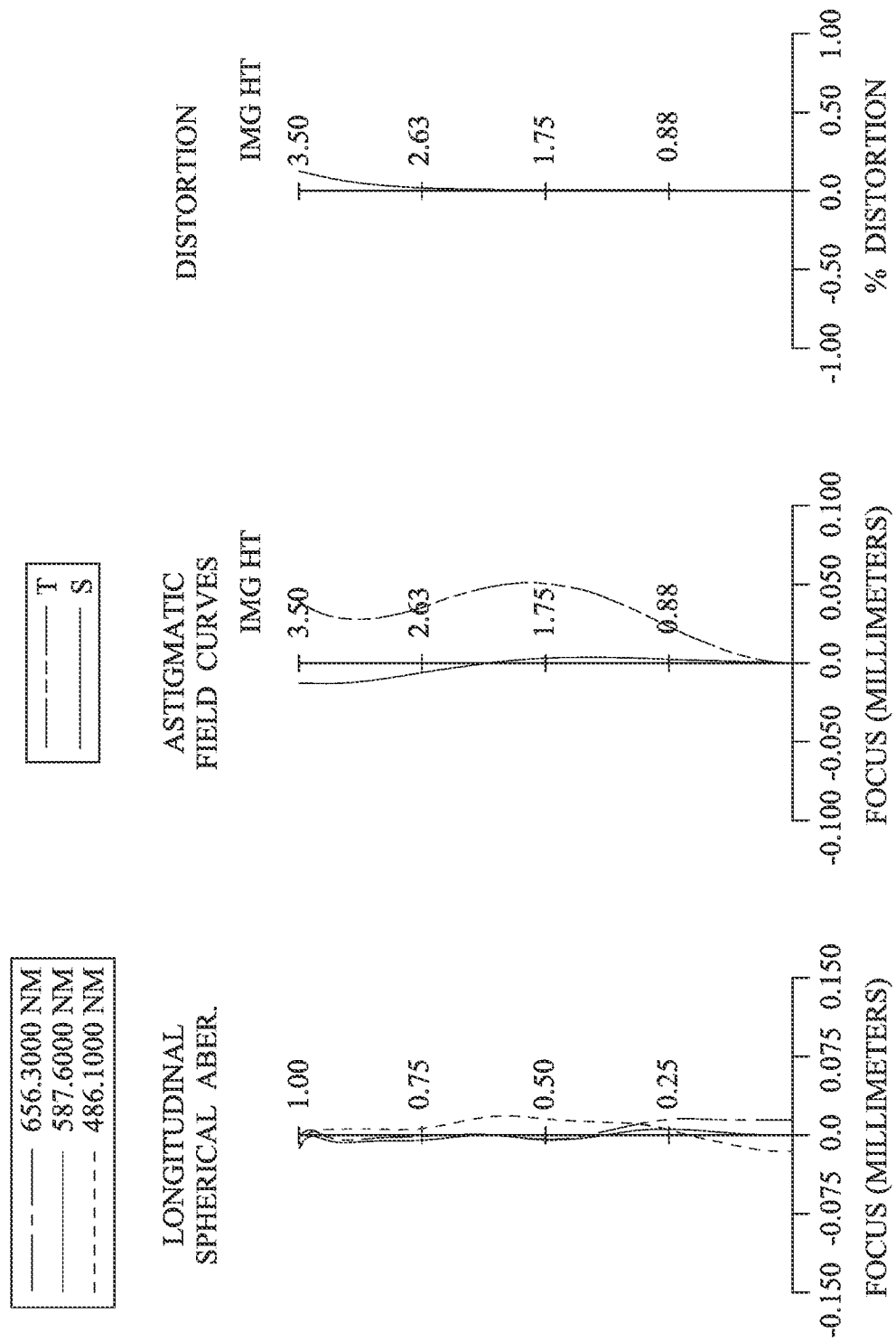
FIG. 12 shows, in order from left to right, spherical aberration curves, astigmatic field curves and a distortion curve of the imaging apparatus according to the 6th embodiment.

FIG. 11 is a schematic view of an imaging apparatus 6 according to the 6th embodiment of the present disclosure. FIG. 12 shows, in order from left to right, spherical aberration curves, astigmatic field curves and a distortion curve of the imaging apparatus 6 according to the 6th embodiment. In FIG. 11, the imaging apparatus 6 according to the 6th embodiment includes an imaging system lens assembly (its reference number is omitted) and an image sensor IS. The imaging system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being convex in a paraxial region thereof. The first lens element E1 is made of plastic material, and has the object-side surface and the image-side surface being both aspheric. Moreover, the image-side surface of the first lens element E1 includes one inflection point.

The second lens element E2 with negative refractive power has an object-side surface being concave in a paraxial region thereof and an image-side surface being concave in a paraxial region thereof. The second lens element E2 is made of plastic material, and has the object-side surface and the image-side surface being both aspheric. Moreover, the object-side surface of the second lens element E2 includes two inflection points.

The third lens element E3 with positive refractive power has an object-side surface being convex in a paraxial region thereof and an image-side surface being concave in a paraxial region thereof. The third lens element E3 is made of plastic material, and has the object-side surface and the image-side surface being both aspheric. Moreover, the object-side surface of the third lens element E3 includes one inflection point, and the image-side surface of the third lens element E3 includes one inflection point.

The fourth lens element E4 with positive refractive power has an object-side surface being concave in a paraxial region thereof and an image-side surface being convex in a paraxial region thereof. The fourth lens element E4 is made of plastic material, and has the object-side surface and the image-side surface being both aspheric. Moreover, the object-side surface of the fourth lens element E4 includes one inflection point, and the image-side surface of the fourth lens element E4 includes one inflection point.

The fifth lens element E5 with negative refractive power has an object-side surface being convex in a paraxial region thereof and an image-side surface being concave in a paraxial region thereof. The fifth lens element E5 is made of plastic material, and has the object-side surface and the image-side surface being both aspheric. Moreover, the object-side surface of the fifth lens element E5 includes two inflection points, and the image-side surface of the fifth lens element E5 includes two inflection points.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 6th embodiment are shown in Table 6A and the aspheric surface data are shown in Table 6B below.

TABLE 6A

6th Embodiment
f = 13.05 mm, Fno = 3.52, HFOV = 15.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.303 | | | | |
| 2 | Lens 1 | 7.5113 | ASP | 1.073 | Plastic | 1.587 | 28.3 | 5.63 |
| 3 | | −5.6018 | ASP | 0.197 | | | | |
| 4 | Lens 2 | −90.3042 | ASP | 0.426 | Plastic | 1.587 | 28.3 | −4.36 |
| 5 | | 2.6410 | ASP | 0.502 | | | | |
| 6 | Ape. Stop | Plano | | −0.165 | | | | |

TABLE 6A-continued

6th Embodiment
f = 13.05 mm, Fno = 3.52, HFOV = 15.0 deg.

| Surface # | | Curvature Radius | | Thickness | Material | Index | Abbe # | Focal Length |
|---|---|---|---|---|---|---|---|---|
| 7 | Lens 3 | 4.4395 | ASP | 0.947 | Plastic | 1.544 | 56.0 | 9.31 |
| 8 | | 33.3097 | ASP | 0.537 | | | | |
| 9 | Lens 4 | −1.9652 | ASP | 0.997 | Plastic | 1.544 | 56.0 | 13.53 |
| 10 | | −1.8284 | ASP | 0.035 | | | | |
| 11 | Lens 5 | 15.2807 | ASP | 0.304 | Plastic | 1.669 | 19.5 | −20.87 |
| 12 | | 7.2373 | ASP | −0.200 | | | | |
| 13 | Stop | | Plano | 0.500 | | | | |
| 14 | Prism | | Plano | 15.500 | Glass | 1.517 | 64.2 | — |
| 15 | | | Plano | 0.300 | | | | |
| 16 | Filter | | Plano | 0.210 | Glass | 1.517 | 64.2 | — |
| 17 | | | Plano | 0.039 | | | | |
| 18 | Image | | Plano | — | | | | |

Reference wavelength is 587.6 nm (d-line).
Effective radius of Surface 1 (Stop S1) is 1.86 mm.
Effective radius of Surface 13 (Stop S2) is 1.99 mm.

TABLE 6B

Aspheric Coefficients

| Surface # | 2 | 3 | 4 | 5 | 7 |
|---|---|---|---|---|---|
| k= | 7.481300E+00 | −4.122210E+01 | −6.862190E+01 | −8.076570E−01 | 2.257010E+00 |
| A4= | 1.004410E−03 | 6.494410E−03 | 3.274440E−02 | 3.031090E−02 | 2.011650E−02 |
| A6= | 1.769000E−03 | 7.323550E−04 | −4.838390E−02 | −4.787460E−02 | −1.437440E−02 |
| A8= | −2.527320E−04 | −3.099220E−04 | 2.749340E−02 | −4.473810E−03 | −1.202970E−02 |
| A10= | 2.867400E−05 | 3.202410E−04 | −7.633170E−03 | 4.124090E−02 | 1.227920E−02 |
| A12= | 1.426750E−06 | −1.126840E−04 | 8.721150E−04 | −3.660900E−02 | −3.638760E−03 |
| A14= | | 1.047340E−05 | −2.290450E−05 | 1.857420E−02 | 3.450650E−04 |
| A16= | | | | −5.911050E−03 | |
| A18= | | | | 1.070510E−03 | |
| A20= | | | | −8.275590E−05 | |

| Surface # | 8 | 9 | 10 | 11 | 12 |
|---|---|---|---|---|---|
| k= | −9.000000E+01 | −3.952510E+00 | −3.277960E+00 | −3.328080E+01 | −9.000000E+01 |
| A4= | −3.957890E−03 | −9.082080E−03 | −1.618030E−02 | −9.688140E−02 | −8.661050E−02 |
| A6= | 1.122690E−02 | 1.680840E−02 | −1.563820E−03 | 3.098430E−02 | 3.607670E−02 |
| A8= | −1.297290E−02 | −1.337630E−02 | 4.425960E−03 | −8.579140E−03 | −1.291670E−02 |
| A10= | 5.836980E−03 | 7.170630E−03 | −2.323810E−03 | 4.681170E−03 | 4.843980E−03 |
| A12= | −1.262390E−03 | −2.148460E−03 | 9.546020E−04 | −1.814640E−03 | −1.332440E−03 |
| A14= | 1.023500E−04 | 3.741640E−04 | −2.341170E−04 | 3.268250E−04 | 1.997660E−04 |
| A16= | | −2.883930E−05 | 2.443550E−05 | −2.151400E−05 | −1.195070E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6A and Table 6B as the following values and satisfy the following conditions:

TABLE 6C

6th Embodiment

| f [mm] | 13.05 | T12/CT2 | 0.46 |
|---|---|---|---|
| Fno | 3.52 | T12/T45 | 5.63 |
| HFOV [deg.] | 15.0 | |f2/f5| | 0.21 |
| BL/TD | 3.37 | |f/f1| + |f/f2| + |f/f3| + |f/f4| + |f/f5| | 8.30 |
| f/BL | 0.80 | |R8/R6| | 0.05 |
| CT1/BL | 0.07 | (|R1| + |R8|)/(|R1| − |R8|) | 1.64 |

TABLE 6C-continued

6th Embodiment

| ImgH/TL | 0.17 | |SAG4R2|/CT4 | 0.70 |
|---|---|---|---|
| TD [mm] | 4.85 | Y1R1/Y5R2 | 0.94 |
| SD/TD | 0.55 | Y5R2/ImgH | 0.57 |
| ΣECT/TD | 0.77 | V4 + V5 | 75.4 |
| CT3/CT2 | 2.22 | | |

7th Embodiment

Figure 13:
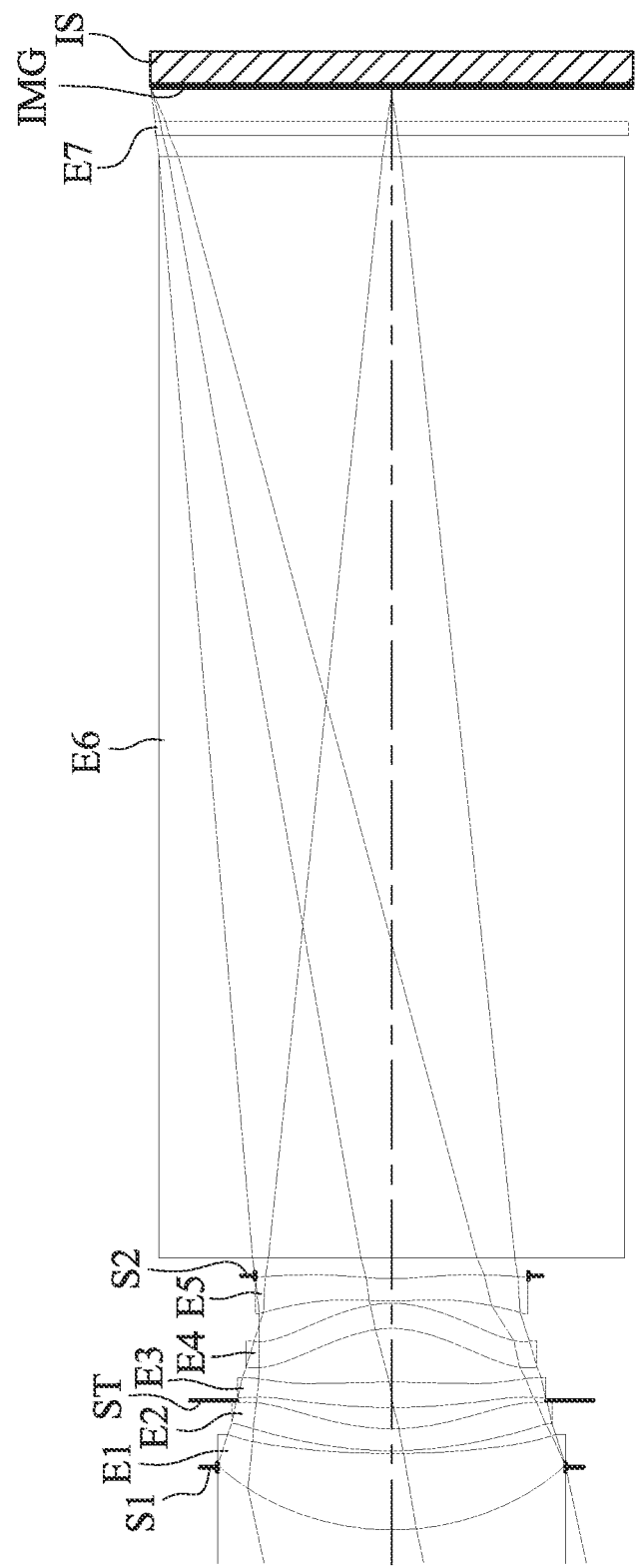
FIG. 13 is a schematic view of an imaging apparatus according to the 7th embodiment of the present disclosure.
Figure 14:
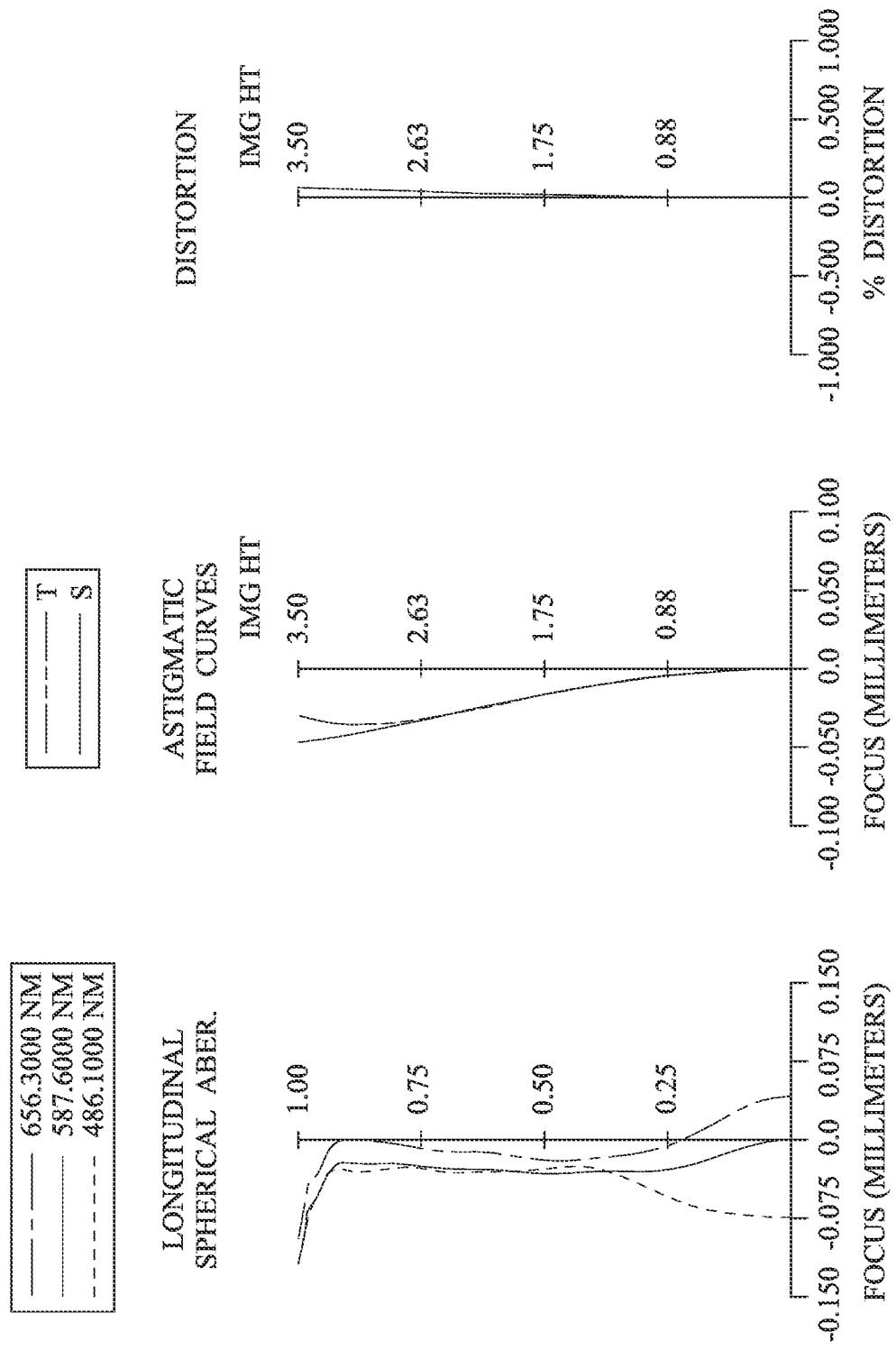
FIG. 14 shows, in order from left to right, spherical aberration curves, astigmatic field curves and a distortion curve of the imaging apparatus according to the 7th embodiment.

FIG. 13 is a schematic view of an imaging apparatus 7 according to the 7th embodiment of the present disclosure. FIG. 14 shows, in order from left to right, spherical aberration curves, astigmatic field curves and a distortion curve of the imaging apparatus 7 according to the 7th embodiment. In FIG. 13, the imaging apparatus 7 according to the 7th embodiment includes an imaging system lens assembly (its reference number is omitted) and an image sensor IS. The imaging system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being concave in a paraxial region thereof. The first lens element E1 is made of glass material, and has the object-side surface and the image-side surface being both aspheric. Moreover, the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of glass material, and has the object-side surface and the image-side surface being both aspheric. Moreover, the object-side surface of the second lens element E2 includes one inflection point, and the image-side surface of the second lens element E2 includes one inflection point.

The third lens element E3 with positive refractive power has an object-side surface being convex in a paraxial region thereof and an image-side surface being convex in a paraxial region thereof. The third lens element E3 is made of plastic material, and has the object-side surface and the image-side surface being both aspheric. Moreover, the object-side surface of the third lens element E3 includes two inflection points, and the image-side surface of the third lens element E3 includes two inflection points.

The fourth lens element E4 with negative refractive power has an object-side surface being concave in a paraxial region thereof and an image-side surface being convex in a paraxial region thereof. The fourth lens element E4 is made of plastic material, and has the object-side surface and the image-side surface being both aspheric. Moreover, the object-side surface of the fourth lens element E4 includes one inflection point, and the image-side surface of the fourth lens element E4 includes one inflection point.

The fifth lens element E5 with negative refractive power has an object-side surface being convex in a paraxial region thereof and an image-side surface being concave in a paraxial region thereof. The fifth lens element E5 is made of plastic material, and has the object-side surface and the image-side surface being both aspheric. Moreover, the object-side surface of the fifth lens element E5 includes two inflection points, and the image-side surface of the fifth lens element E5 includes one inflection point.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 7th embodiment are shown in Table 7A and the aspheric surface data are shown in Table 7B below.

TABLE 7A

7th Embodiment
f = 16.29 mm, Fno = 3.23, HFOV = 12.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Stop | Plano | | −0.910 | | | | |
| 2 | Lens 1 | 3.9528 | ASP | 1.110 | Glass | 1.548 | 45.8 | 8.67 |
| 3 | | 21.1728 | ASP | 0.040 | | | | |
| 4 | Lens 2 | 6.7881 | ASP | 0.320 | Glass | 1.548 | 45.8 | −13.24 |
| 5 | | 3.4488 | ASP | 0.407 | | | | |
| 6 | Ape. Stop | Plano | | −0.101 | | | | |
| 7 | Lens 3 | 9.0812 | ASP | 0.370 | Plastic | 1.544 | 56.0 | 12.46 |
| 8 | | −26.3444 | ASP | 0.780 | | | | |
| 9 | Lens 4 | −1.6237 | ASP | 0.366 | Plastic | 1.669 | 19.5 | −323.37 |
| 10 | | −1.7838 | ASP | 0.035 | | | | |
| 11 | Lens 5 | 6.8200 | ASP | 0.323 | Plastic | 1.660 | 20.4 | −15.58 |
| 12 | | 4.0233 | ASP | 0.040 | | | | |
| 13 | Stop | Plano | | 0.260 | | | | |
| 14 | Prism | Plano | | 16.000 | Glass | 1.517 | 64.2 | — |
| 15 | | Plano | | 0.300 | | | | |
| 16 | Filter | Plano | | 0.210 | Glass | 1.517 | 64.2 | — |
| 17 | | Plano | | 0.511 | | | | |
| 18 | Image | Plano | | — | | | | |

Reference wavelength is 587.6 nm (d-line).
Effective radius of Surface 1 (Stop S1) is 2.53 mm.
Effective radius of Surface 13 (Stop S2) is 1.98 mm.

TABLE 7B

Aspheric Coefficients

| Surface # | 2 | 3 | 4 | 5 | 7 |
|---|---|---|---|---|---|
| k= | 3.384040E−01 | 2.547540E+01 | 4.060070E+00 | −1.248650E+00 | 6.145220E+00 |
| A4= | −6.127570E−06 | 2.906190E−02 | 3.054890E−02 | 1.921320E−02 | 1.404060E−02 |
| A6= | −4.403840E−04 | −2.277140E−02 | −3.297150E−02 | −3.230030E−02 | −2.499040E−02 |
| A8= | 9.972410E−05 | 9.458110E−03 | 1.531150E−02 | 1.649740E−02 | 1.486190E−02 |
| A10= | −1.469860E−05 | −2.207580E−03 | −3.887280E−03 | −4.223690E−03 | −4.248840E−03 |
| A12= | 1.306240E−06 | 2.770450E−04 | 5.224700E−04 | 2.055030E−04 | 5.504200E−04 |
| A14= | | −1.432770E−05 | −2.922340E−05 | 1.779090E−04 | −2.577800E−05 |
| A16= | | | | −5.190280E−05 | |
| A18= | | | | 6.174820E−06 | |
| A20= | | | | −2.842220E−07 | |

| Surface # | 8 | 9 | 10 | 11 | 12 |
|---|---|---|---|---|---|
| k= | −9.000000E+01 | −3.995830E+00 | −4.339700E+00 | 5.229950E+00 | −2.278290E+01 |
| A4= | −5.249890E−03 | −3.186770E−02 | −3.561000E−02 | −1.115330E−01 | −6.889090E−02 |
| A6= | 2.908470E−03 | 4.896520E−02 | 3.928510E−02 | 4.253620E−02 | 3.104060E−02 |
| A8= | 3.659860E−03 | −3.429210E−02 | −2.350990E−02 | −7.928120E−03 | −6.284240E−03 |
| A10= | −1.735880E−03 | 1.465400E−02 | 8.961440E−03 | 4.207370E−04 | 3.295730E−05 |
| A12= | 2.758430E−04 | 3.606870E−03 | −1.859690E−03 | −2.133920E−05 | 2.065310E−04 |
| A14= | −1.610360E−05 | 4.739360E−04 | 1.783950E−04 | 2.103740E−05 | −3.144210E−05 |
| A16= | | −2.568440E−05 | −4.214110E−06 | −2.339560E−06 | 1.423910E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7A and Table 7B as the following values and satisfy the following conditions:

TABLE 7C

7th Embodiment

| | | | |
|---|---|---|---|
| f [mm] | 16.29 | T12/CT2 | 0.13 |
| Fno | 3.23 | T12/T45 | 1.14 |
| HFOV [deg.] | 12.1 | \|f2/f5\| | 0.85 |
| BL/TD | 4.75 | \|f/f1\| + \|f/f2\| + \|f/f3\| + \|f/f4\| + \|f/f5\| | 5.51 |
| f/BL | 0.94 | \|R8/R6\| | 0.07 |
| CT1/BL | 0.06 | (\|R1\| + \|R8\|)/(\|R1\| − \|R8\|) | 2.64 |
| ImgH/TL | 0.17 | \|SAG4R2\|/CT4 | 1.51 |
| TD [mm] | 3.65 | Y1R1/Y5R2 | 1.28 |
| SD/TD | 0.49 | Y5R2/ImgH | 0.57 |
| ΣCT/TD | 0.68 | V4 + V5 | 39.9 |
| CT3/CT2 | 1.16 | | |

8th Embodiment

Figure 15:
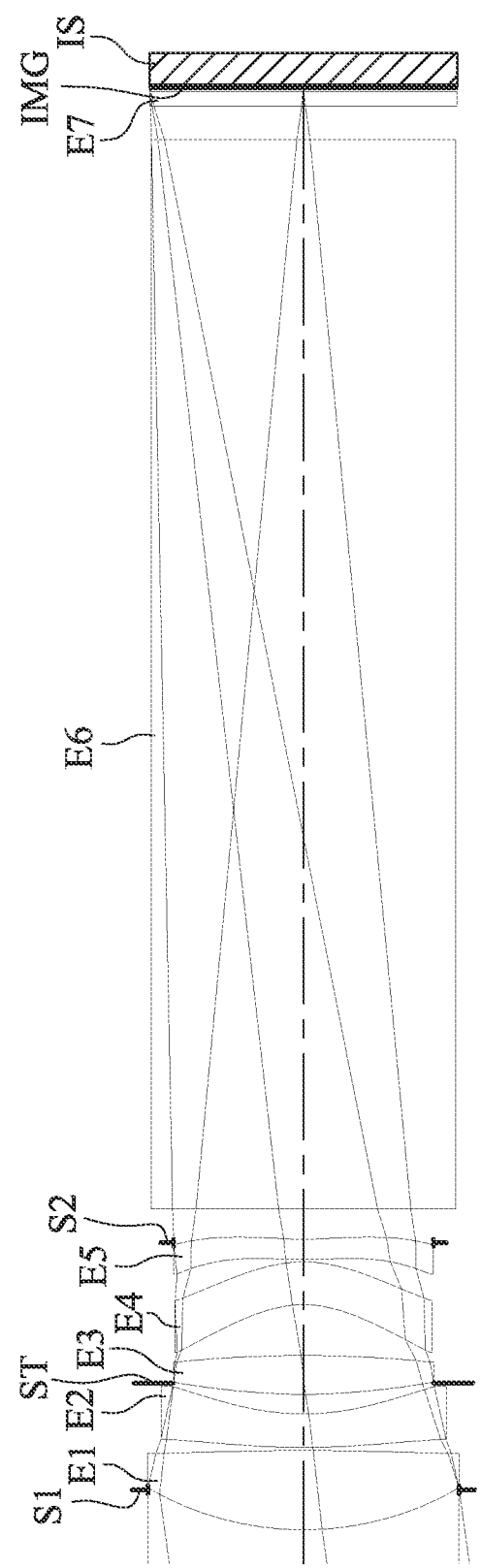
FIG. 15 is a schematic view of an imaging apparatus according to the 8th embodiment of the present disclosure.
Figure 16:
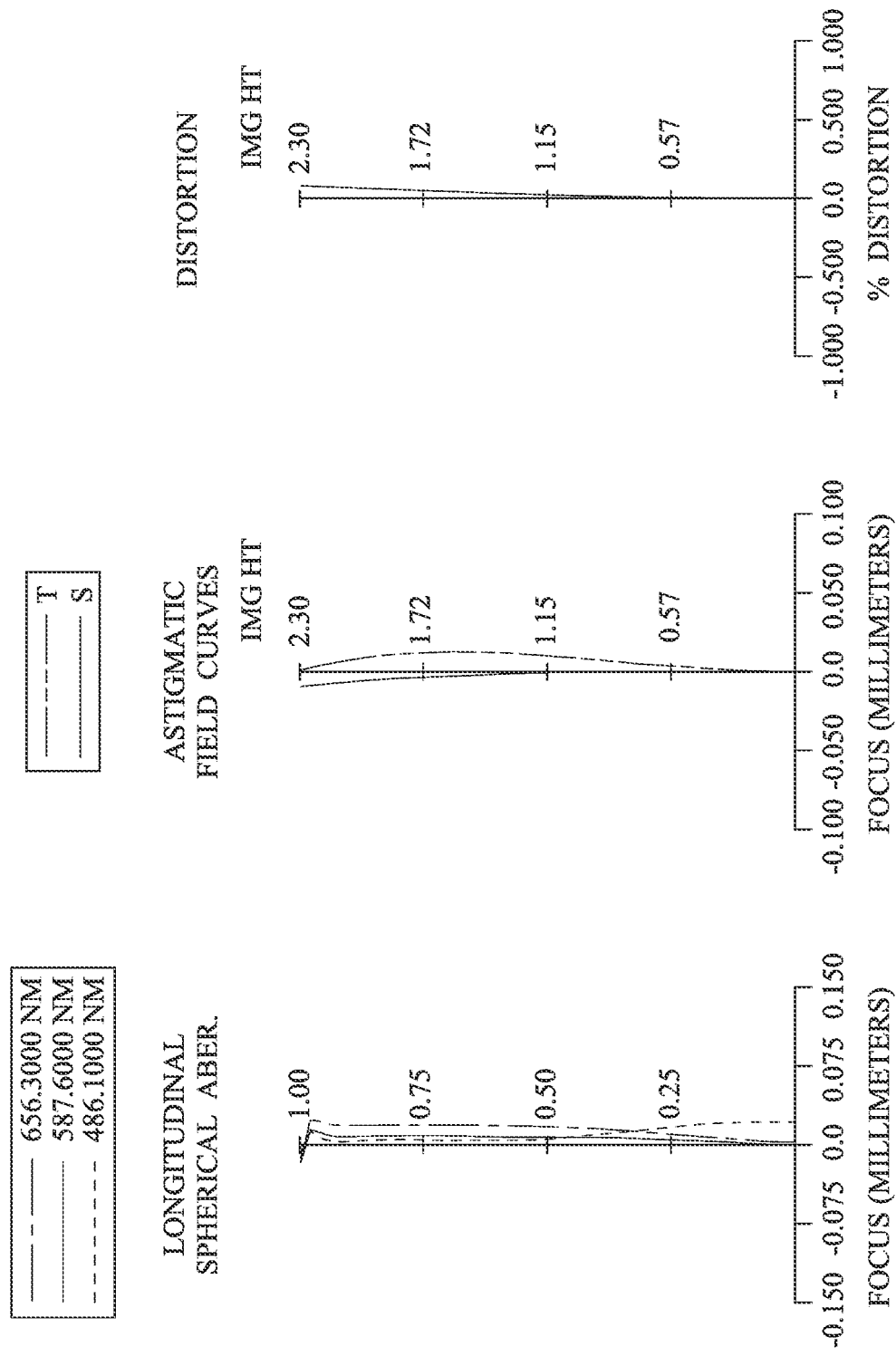
FIG. 16 shows, in order from left to right, spherical aberration curves, astigmatic field curves and a distortion curve of the imaging apparatus according to the 8th embodiment.

FIG. 15 is a schematic view of an imaging apparatus 8 according to the 8th embodiment of the present disclosure. FIG. 16 shows, in order from left to right, spherical aberration curves, astigmatic field curves and a distortion curve of the imaging apparatus 8 according to the 8th embodiment. In FIG. 15, the imaging apparatus 8 according to the 8th embodiment includes an imaging system lens assembly (its reference number is omitted) and an image sensor IS. The imaging system lens assembly includes, in order from an object side to an image side along an optical path, a stop S1, a first lens element E1, a second lens element E2, an aperture stop ST, a third lens element E3, a fourth lens element E4, a fifth lens element E5, a stop S2, a reflective element E6, a filter E7 and an image surface IMG, wherein the image sensor IS is disposed on the image surface IMG of the imaging system lens assembly. The imaging system lens assembly includes five lens elements (E1, E2, E3, E4, E5) without additional one or more lens elements inserted between the first lens element E1 and the fifth lens element E5, and there is an air gap between each of adjacent lens elements of the five lens elements of the imaging system lens assembly.

The first lens element E1 with positive refractive power has an object-side surface being convex in a paraxial region thereof and an image-side surface being convex in a paraxial region thereof. The first lens element E1 is made of plastic material, and has the object-side surface and the image-side surface being both aspheric. Moreover, the image-side surface of the first lens element E1 includes one inflection point.

The second lens element E2 with negative refractive power has an object-side surface being convex in a paraxial region thereof and an image-side surface being concave in a paraxial region thereof. The second lens element E2 is made of plastic material, and has the object-side surface and the image-side surface being both aspheric. Moreover, the object-side surface of the second lens element E2 includes one inflection point, and the image-side surface of the second lens element E2 includes two inflection points.

The third lens element E3 with positive refractive power has an object-side surface being convex in a paraxial region thereof and an image-side surface being convex in a paraxial region thereof. The third lens element E3 is made of plastic material, and has the object-side surface and the image-side surface being both aspheric. Moreover, the object-side surface of the third lens element E3 includes one inflection point.

The fourth lens element E4 with negative refractive power has an object-side surface being concave in a paraxial region thereof and an image-side surface being convex in a paraxial region thereof. The fourth lens element E4 is made of plastic material, and has the object-side surface and the image-side surface being both aspheric. Moreover, the object-side surface of the fourth lens element E4 includes one inflection point, and the image-side surface of the fourth lens element E4 includes one inflection point.

The fifth lens element E5 with negative refractive power has an object-side surface being convex in a paraxial region thereof and an image-side surface being concave in a paraxial region thereof. The fifth lens element E5 is made of plastic material, and has the object-side surface and the image-side surface being both aspheric. Moreover, the object-side surface of the fifth lens element E5 includes one inflection point, and the image-side surface of the fifth lens element E5 includes one inflection point.

The reflective element E6 is a prism and is made of glass material. The reflective element E6 is disposed between the fifth lens element E5 and the filter E7 and will not affect a focal length of the imaging system lens assembly.

The filter E7 is made of glass material and disposed between the reflective element E6 and the image surface IMG and will not affect the focal length of the imaging system lens assembly.

The detailed optical data of the 8th embodiment are shown in Table 8A and the aspheric surface data are shown in Table 8B below.

TABLE 8A

8th Embodiment
f = 16.35 mm, Fno = 3.52, HFOV = 8.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Stop | Plano | −0.600 | | | | |
| 2 | Lens 1 | 4.5641 ASP | 1.189 | Plastic | 1.562 | 44.6 | 7.06 |
| 3 | | −27.3147 ASP | 0.046 | | | | |
| 4 | Lens 2 | 14.0163 ASP | 0.501 | Plastic | 1.587 | 28.3 | −9.27 |
| 5 | | 3.8689 ASP | 0.462 | | | | |
| 6 | Ape. Stop | Plano | −0.169 | | | | |
| 7 | Lens 3 | 10.6582 ASP | 0.581 | Plastic | 1.544 | 56.0 | 11.79 |
| 8 | | −15.8067 ASP | 0.761 | | | | |
| 9 | Lens 4 | −1.6331 ASP | 0.639 | Plastic | 1.544 | 56.0 | −68.74 |
| 10 | | −1.9431 ASP | 0.035 | | | | |
| 11 | Lens 5 | 9.0375 ASP | 0.300 | Plastic | 1.614 | 26.0 | −19.68 |
| 12 | | 5.1041 ASP | −0.050 | | | | |
| 13 | Stop | Plano | 0.505 | | | | |
| 14 | Prism | Plano | 16.000 | Glass | 1.517 | 64.2 | — |
| 15 | | Plano | 0.500 | | | | |
| 16 | Filter | Plano | 0.210 | Glass | 1.517 | 64.2 | — |
| 17 | | Plano | 0.077 | | | | |
| 18 | Image | Plano | — | | | | |

Reference wavelength is 587.6 nm (d-line).
Effective radius of Surface 1 (Stop S1) is 2.33 mm.
Effective radius of Surface 13 (Stop S2) is 1.94 mm.

TABLE 8B

Aspheric Coefficients

| Surface # | 2 | 3 | 4 | 5 | 7 |
|---|---|---|---|---|---|
| k= | 4.180400E−01 | 7.872050E+01 | 2.858170E+01 | −1.950430E−01 | 1.323530E+01 |
| A4= | −7.201440E−04 | 8.173550E−03 | −1.681330E−03 | −7.453140E−03 | 7.446810E−03 |
| A6= | −7.491680E−04 | −3.069300E−03 | 5.474670E−03 | 6.584450E−03 | −9.446730E−03 |
| A8= | 3.576140E−04 | 5.432230E−04 | −4.890410E−03 | −4.833610E−03 | 5.334320E−03 |
| A10= | −7.441310E−05 | −5.046120E−05 | 1.532340E−03 | 8.640390E−04 | −1.886290E−03 |
| A12= | 6.223860E−06 | 5.779980E−06 | −2.165440E−04 | 1.887220E−04 | 3.642090E−04 |
| A14= | | −3.466190E−07 | 1.140170E−05 | −8.316550E−05 | −2.889720E−05 |
| A16= | | | | 8.944210E−06 | |
| A18= | | | | −6.409450E−07 | |
| A20= | | | | 9.045870E−08 | |

| Surface # | 8 | 9 | 10 | 11 | 12 |
|---|---|---|---|---|---|
| k= | −8.438340E+01 | −2.834700E+00 | −4.809270E+00 | 1.253470E+01 | −2.466660E+01 |
| A4= | 1.157130E−03 | −1.503910E−02 | −1.843700E−02 | −6.791280E−02 | −6.575690E−02 |
| A6= | −2.753450E−03 | 4.461620E−02 | 3.478660E−02 | 2.107420E−02 | 3.013570E−02 |
| A8= | 3.469970E−03 | −4.377740E−02 | −3.368940E−02 | −1.174940E−02 | −1.123240E−02 |
| A10= | −2.004660E−03 | 2.240960E−02 | 1.754010E−02 | 7.080650E−03 | 3.338320E−03 |
| A12= | 5.245270E−04 | −6.312510E−03 | −4.935000E−03 | −2.667150E−03 | −7.773770E−04 |
| A14= | −5.201840E−05 | 9.307200E−04 | 7.074820E−04 | 5.117130E−04 | 1.203730E−04 |
| A16= | | −5.624540E−05 | −3.976040E−05 | −3.829390E−05 | −8.435220E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 8A and Table 8B as the following values and satisfy the following conditions:

TABLE 8C

8th Embodiment

| | | | |
|---|---|---|---|
| f [mm] | 16.35 | T12/CT2 | 0.09 |
| Fno | 3.52 | T12/T45 | 1.31 |
| HFOV [deg.] | 8.0 | \|f2/f5\| | 0.47 |
| BL/TD | 3.97 | \|f/f1\| + \|f/f2\| + \|f/f3\| + \|f/f4\| + \|f/f5\| | 6.54 |
| f/BL | 0.95 | \|R8/R6\| | 0.12 |
| CT1/BL | 0.07 | (\|R1\| + \|R8\|)/(\|R1\| − \|R8\|) | 2.48 |
| ImgH/TL | 0.11 | \|SAG4R2\|/CT4 | 0.91 |
| TD [mm] | 4.35 | Y1R1/Y5R2 | 1.20 |
| SD/TD | 0.49 | Y5R2/ImgH | 0.84 |
| ΣCT/TD | 0.74 | V4 + V5 | 82.0 |
| CT3/CT2 | 1.16 | | |

Figure 17B:
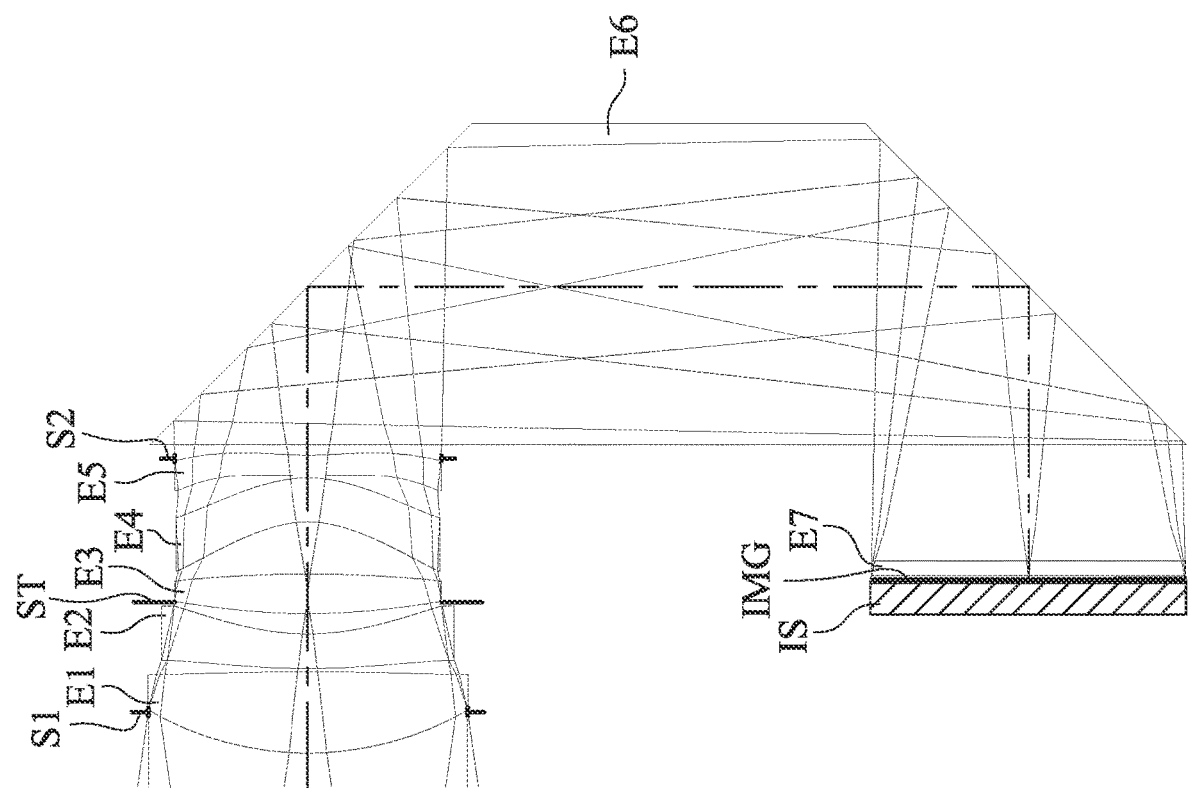
FIG. 17B is a schematic view of the imaging apparatus according to the 8th embodiment with one another reflective element.

FIG. 17A is a schematic view of the imaging apparatus 8 according to the 8th embodiment with another reflective element E6. FIG. 17B is a schematic view of the imaging apparatus 8 according to the 8th embodiment with one another reflective element E6. In FIG. 17A and FIG. 17B, the reflective element E6 of the 8th embodiment can be in a shape of parallelogram or trapezoid. In detail, in FIG. 17A, when the reflective element E6 is in a shape of parallelogram, the light path is folded four times in the reflective element E6. In FIG. 17B, when the reflective element E6 is in a shape of trapezoid, the light path is folded twice in the reflective element E6. It should be explained that, it is favorable for applying the imaging apparatus 8 to the electronic devices with different size requirements by arranging the reflective element E6 with different shapes, which will not affect the focal length and imaging results thereof.

9th Embodiment

FIG. 18 is a three-dimensional schematic view of an imaging apparatus 100 according to the 9th embodiment of the present disclosure. In FIG. 18, the imaging apparatus 100 of the 9th embodiment is a camera module, the imaging apparatus 100 includes an imaging lens assembly 101, a driving apparatus 102 and an image sensor 103, wherein the imaging lens assembly 101 includes the imaging system lens assembly of the present disclosure and a lens barrel (its reference number is omitted) for carrying the imaging system lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The imaging system lens assembly can obtain a favorable imaging position by the driving apparatus 102 so as to capture clear images when the imaged object is disposed at different object distances.

The imaging apparatus 100 can include the image sensor 103 located on the image surface of the imaging system lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 9th embodiment, the image stabilization module 104 is a gyro sensor, but is not limited thereto. Therefore, the variation of different axial directions of the imaging system lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 19A:
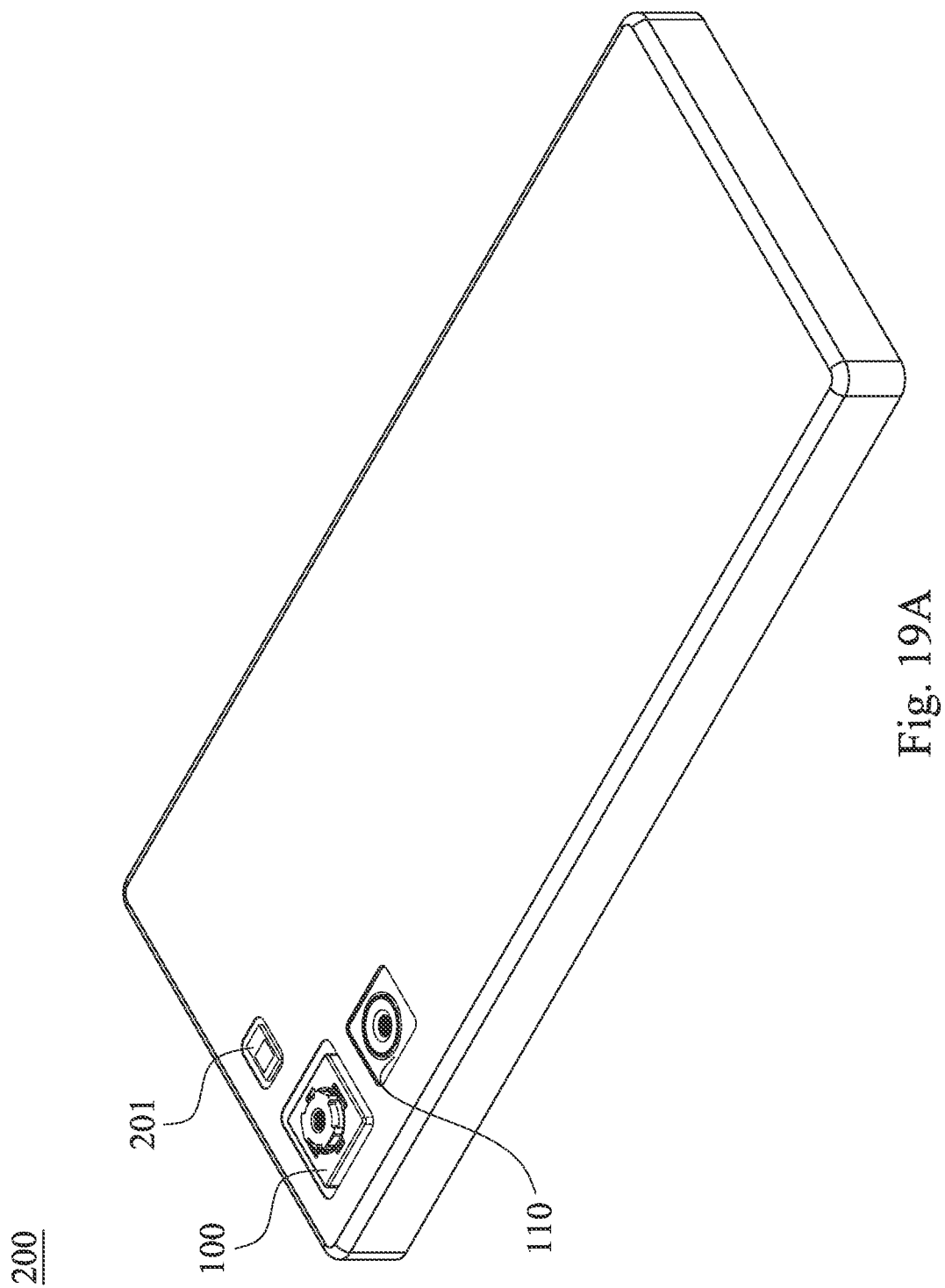
FIG. 19A is a schematic view of one side of an electronic device according to the 10th embodiment of the present disclosure.
Figure 19B:
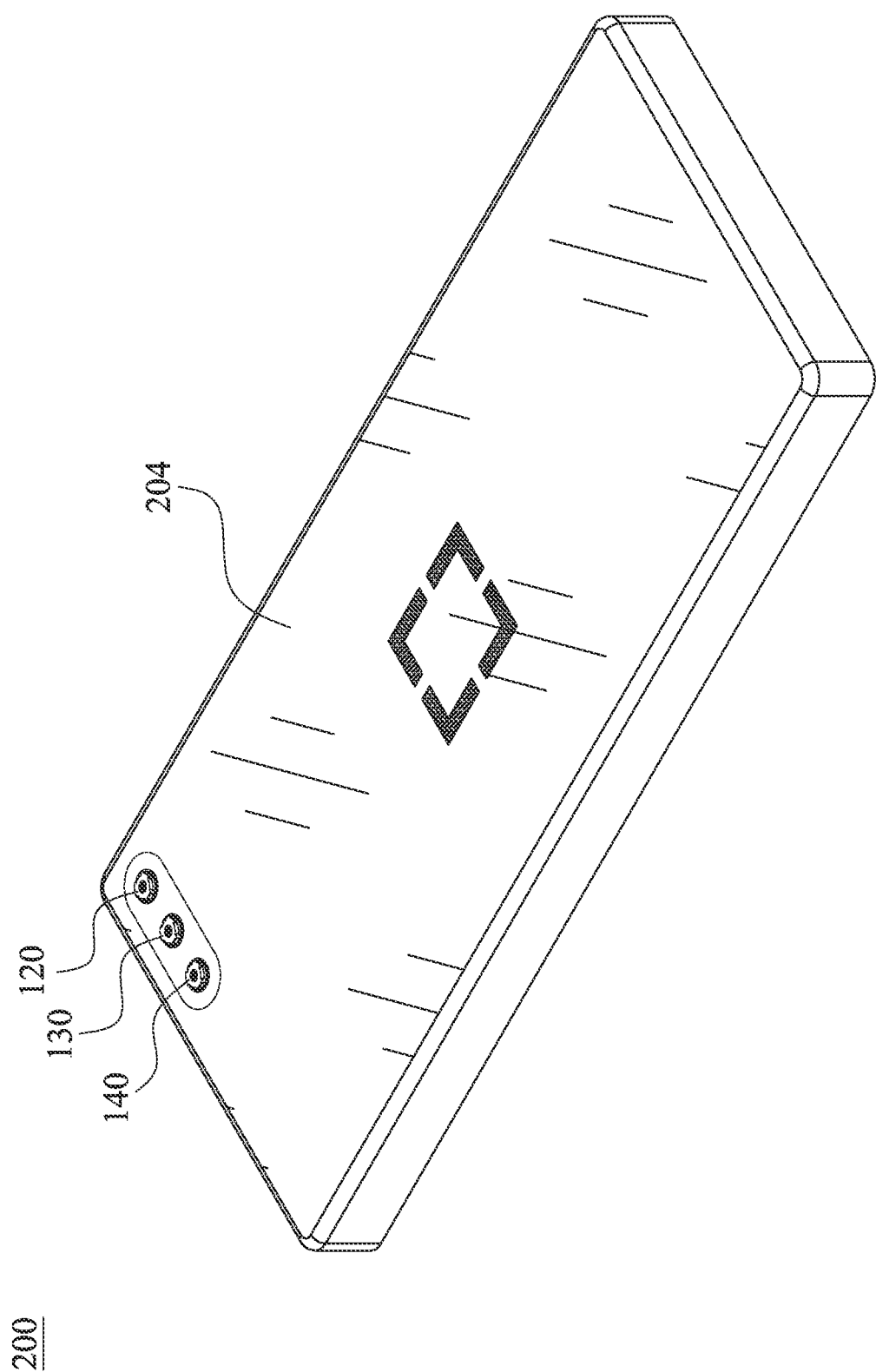
FIG. 19B is a schematic view of another side of the electronic device of FIG. 19A.
Figure 19C:
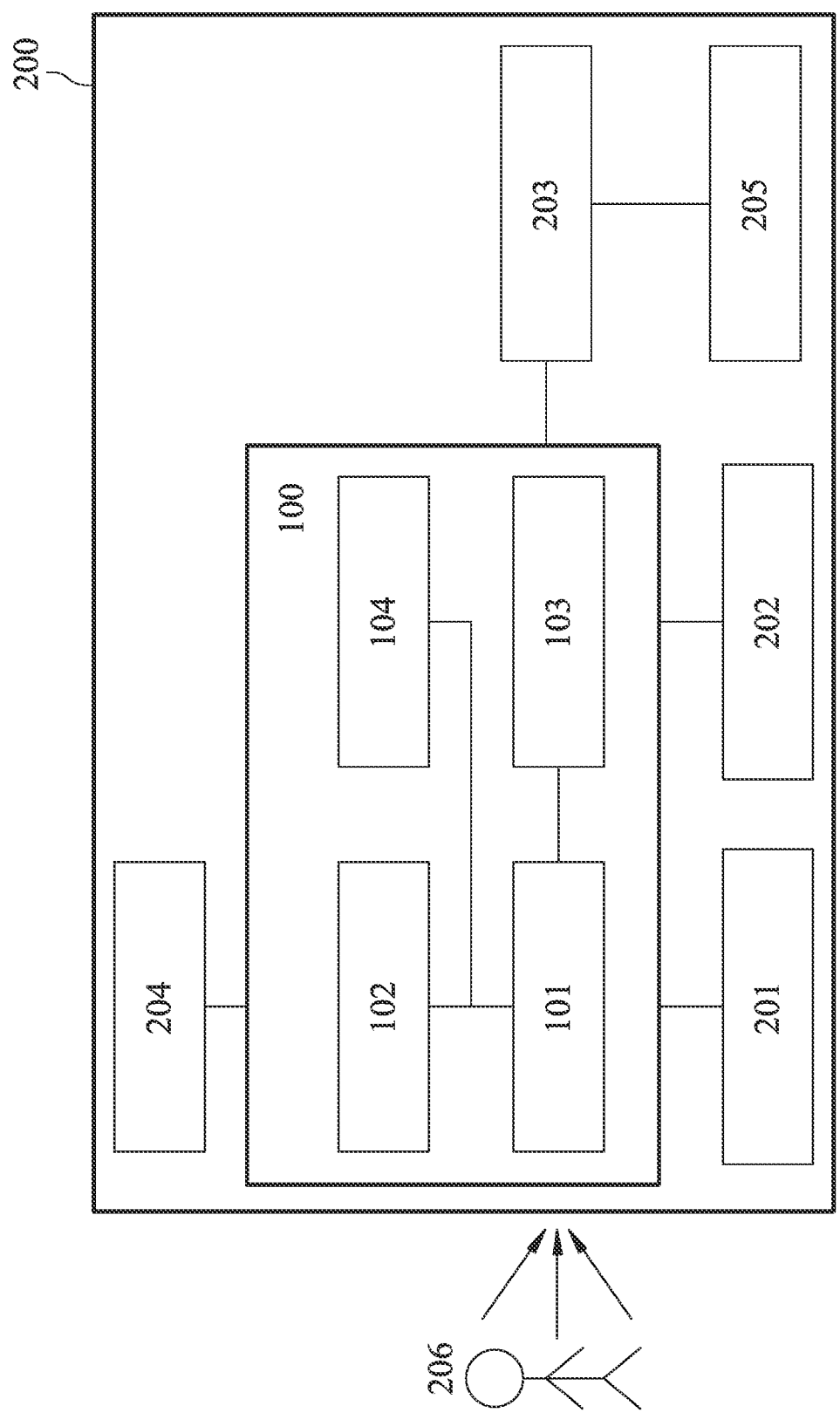
FIG. 19C is a system schematic view of the electronic device of FIG. 19A.

FIG. 19A is a schematic view of one side of an electronic device 200 according to the 10th embodiment of the present disclosure. FIG. 19B is a schematic view of another side of the electronic device 200 of FIG. 19A. FIG. 19C is a system schematic view of the electronic device 200 of FIG. 19A. In FIG. 19A, FIG. 19B and FIG. 19C, the electronic device 200 according to the 10th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 10th embodiment can include the imaging system lens assembly of the present disclosure, and can be the same or similar to the imaging apparatus 100 according to the aforementioned 9th embodiment, and will not describe again herein. In detail, according to the 10th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 19C, or can be adaptively adjusted according to the type of the imaging apparatuses, which will not be shown and detailed descripted again.

11th Embodiment

Figure 20:
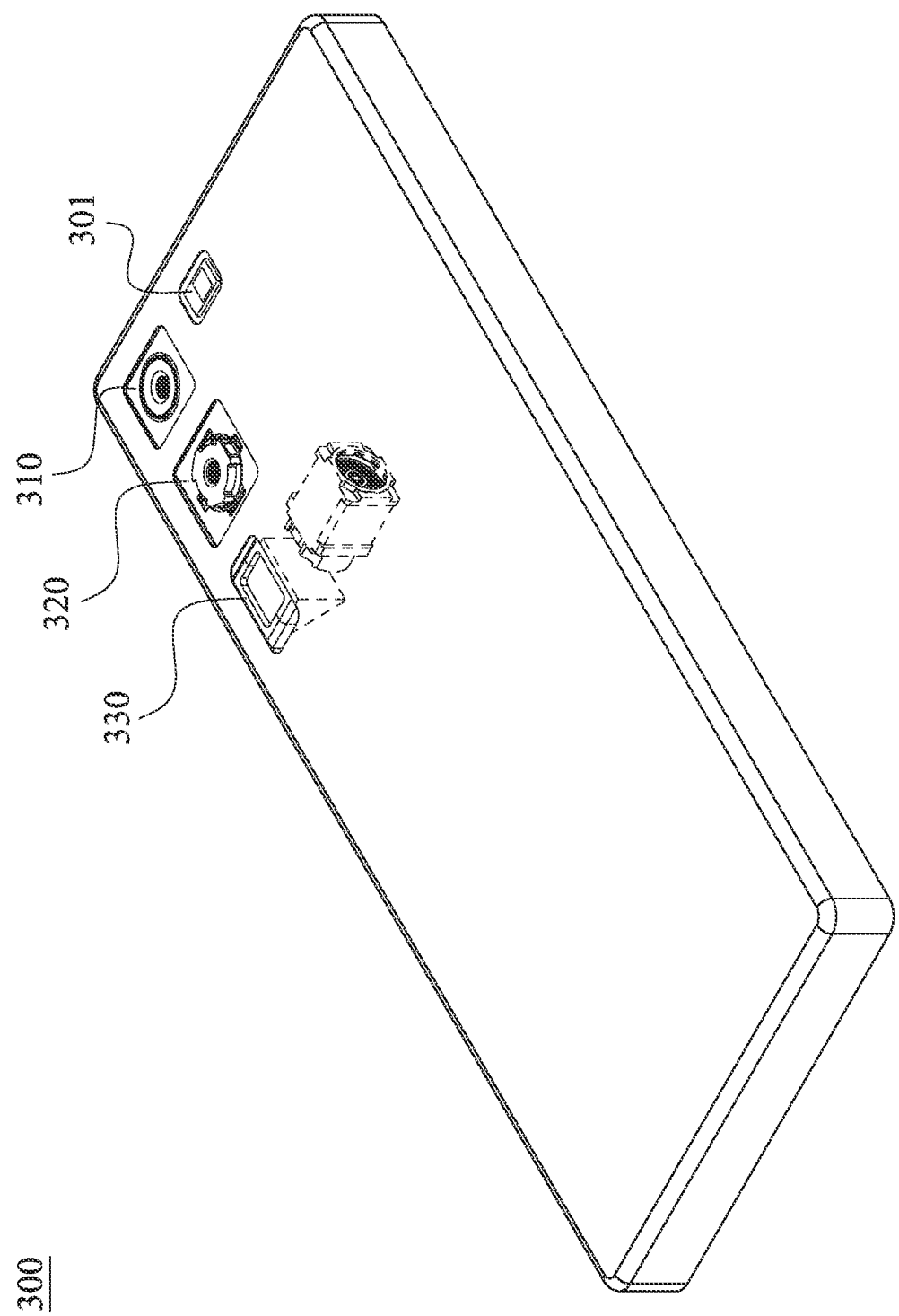
FIG. 20 is a schematic view of one side of an electronic device according to the 11th embodiment of the present disclosure.

FIG. 20 is a schematic view of one side of an electronic device 300 according to the 11th embodiment of the present disclosure. According to the 11th embodiment, the electronic device 300 is a smartphone, which include imaging apparatuses 310, 320, 330 and a flash module 301.

The electronic device 300 according to the 11th embodiment can include the same or similar elements to that according to the 10th embodiment, and each of the imaging apparatuses 310, 320, 330 according to the 11th embodiment can have a configuration which is the same or similar to that according to the 10th embodiment, and will not describe again herein. In detail, according to the 11th embodiment, each of the imaging apparatuses 310, 320, 330 can include the imaging system lens assembly of the present disclosure, and can be the same or similar to the imaging apparatus 100 according to the aforementioned 9th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

12th Embodiment

Figure 21:
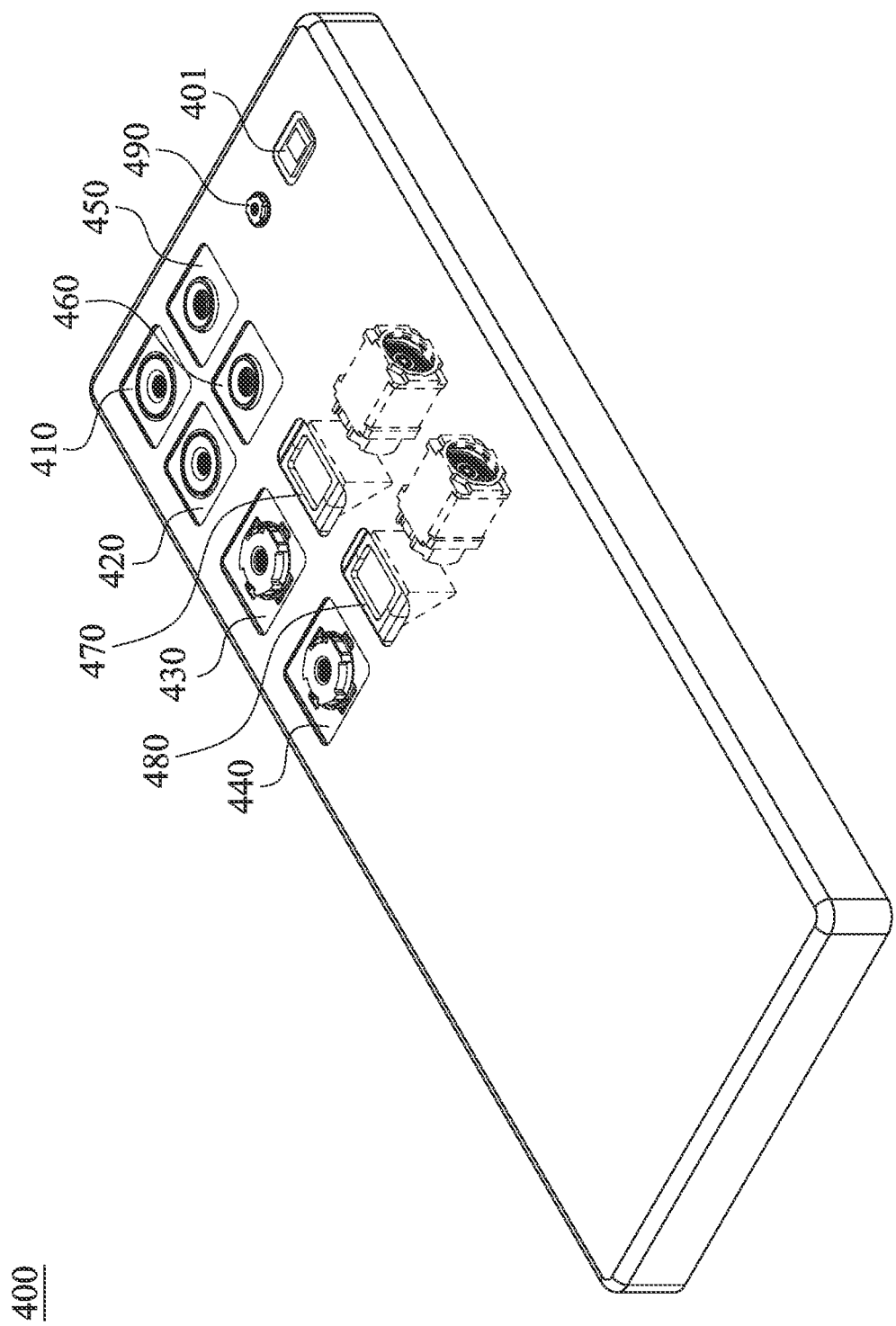
FIG. 21 is a schematic view of one side of an electronic device according to the 12th embodiment of the present disclosure.

FIG. 21 is a schematic view of one side of an electronic device 400 according to the 12th embodiment of the present disclosure. According to the 12th embodiment, the electronic device 400 is a smartphone, which include imaging apparatuses 410, 420, 430, 440, 450, 460, 470, 480, 490 and a flash module 401.

The electronic device 400 according to the 12th embodiment can include the same or similar elements to that according to the 10th embodiment, and each of the imaging apparatuses 410, 420, 430, 440, 450, 460, 470, 480, 490 and the flash module 401 can have a configuration which is the same or similar to that according to the 10th embodiment, and will not describe again herein. In detail, according to the 12th embodiment, each of the imaging apparatuses 410, 420, 430, 440, 450, 460, 470, 480, 490 can include the imaging system lens assembly of the present disclosure, and can be the same or similar to the imaging apparatus 100 according to the aforementioned 9th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

13th Embodiment

Figure 22B:
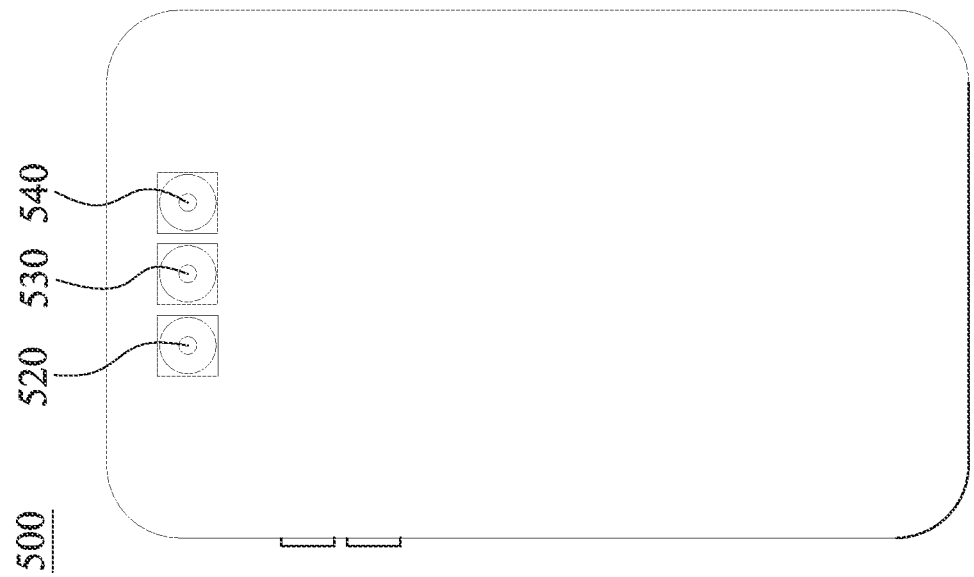
FIG. 22B is a schematic view of another side of the electronic device of FIG. 22A.
Figure 22A:
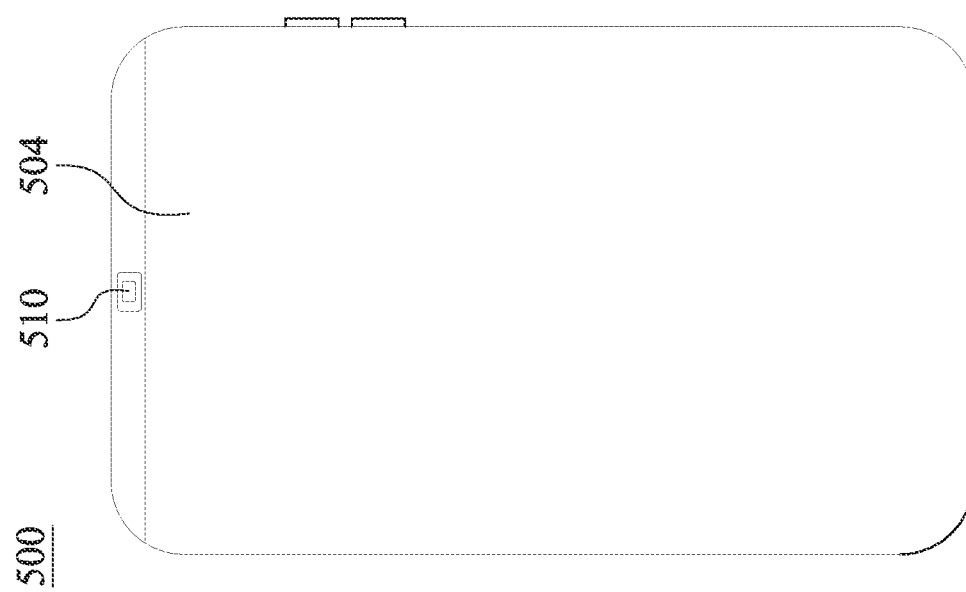
FIG. 22A is a schematic view of one side of an electronic device according to the 13th embodiment of the present disclosure.

FIG. 22A is a schematic view of one side of an electronic device 500 according to the 13th embodiment of the present disclosure. FIG. 22B is a schematic view of another side of the electronic device 500 of FIG. 22A. In FIG. 22A and FIG. 22B, according to the 13th embodiment, the electronic device 500 is a smartphone, which include imaging apparatuses 510, 520, 530, 540 and a user interface 504.

The electronic device 500 according to the 13th embodiment can include the same or similar elements to that according to the 10th embodiment, and each of the imaging apparatuses 510, 520, 530, 540 and the user interface 504 can have a configuration which is the same or similar to that according to the 10th embodiment, and will not describe again herein. In detail, according to the 13th embodiment, the imaging apparatus 510 corresponds to a non-circular opening located on an outer side of the electronic device 500 for capturing the image, and the imaging apparatuses 520, 530, 540 can be telephoto imaging apparatus, wide angle imaging apparatus and ultra-wide angle imaging apparatus, respectively, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging system lens assembly comprising five lens elements, the five lens elements being, in order from an object side to an image side along an optical path:
    a first lens element, a second lens element, a third lens element, a fourth lens element and a fifth lens element;
    each of the five lens elements has an object-side surface towards the object side and an image-side surface towards the image side;
    wherein the first lens element has positive refractive power, the object-side surface of the first lens element is convex in a paraxial region thereof;
    wherein an axial distance between the image-side surface of the fifth lens element and an image surface is BL, an axial distance between the object-side surface of the first lens element and the image-side surface of the fifth lens element is TD, an f-number of the imaging system lens assembly is Fno, half of a maximum field of view of the imaging system lens assembly is HFOV, a focal length of the imaging system lens assembly is f, a central thickness of the first lens element is CT1, and the following conditions are satisfied:

$2.5 < BL/TD < 10.0$;

$1.0 < Fno < 3.8$;

$4.0 \text{ degrees} < HFOV < 18.0 \text{ degrees}$;

$0.01 < f/BL < 1.25$; and $0.01 < CT1/BL < 0.12$.

2. The imaging system lens assembly of claim 1, wherein the object-side surface of the second lens element is convex in a paraxial region thereof, at least one of the object-side surface and the image-side surface of at least one of the five lens elements comprises at least one inflection point.

3. The imaging system lens assembly of claim 1, wherein a maximum image height of the imaging system lens assembly is ImgH, an axial distance between the object-side surface of the first lens element and the image surface is TL, and the following condition is satisfied:

0.01<Img$H$/$TL$<0.2.

4. The imaging system lens assembly of claim 1, wherein a sum of all central thicknesses of the five lens elements of the imaging system lens assembly is ΣCT, the axial distance between the object-side surface of the first lens element and the image-side surface of the fifth lens element is TD, and the following condition is satisfied:

0.60<ΣCT/$TD$<1.0.

5. The imaging system lens assembly of claim 1, wherein a curvature radius of the object-side surface of the first lens element is R1, a curvature radius of the image-side surface of the fourth lens element is R8, and the following condition is satisfied:

0<(|R1|+|R8|)/(|R1|−|R8|)<6.4.

6. The imaging system lens assembly of claim 1, wherein a central thickness of the second lens element is CT2, a central thickness of the third lens element is CT3, and the following condition is satisfied:

0.1<CT3/CT2<3.5.

7. The imaging system lens assembly of claim 1, wherein there is an air gap between each of adjacent lens elements of the five lens elements of the imaging system lens assembly, an axial distance between the first lens element and the second lens element is T12, an axial distance between the fourth lens element and the fifth lens element is T45, and the following condition is satisfied:

0.05<$T$12/$T$45<2.0.

8. The imaging system lens assembly of claim 1, wherein an Abbe number of the fourth lens element is V4, an Abbe number of the fifth lens element is V5, and the following condition is satisfied:

20.0<$V$4+$V$5<55.0.

9. The imaging system lens assembly of claim 1, wherein a distance in parallel with an optical axis from an axial vertex on the image-side surface of the fourth lens element to a maximum effective radius position on the image-side surface of the fourth lens element is SAG4R2, a central thickness of the fourth lens element is CT4, and the following condition is satisfied:

0.4<|$SAG4R2$|/CT4<5.0.

10. The imaging system lens assembly of claim 1, wherein a height of a maximum effective radius of the object-side surface of the first lens element is Y1 R1, a height of a maximum effective radius of the image-side surface of the fifth lens element is Y5R2, and the following condition is satisfied:

0.8<$Y$1$R$1/$Y$5$R$2<2.0.

11. The imaging system lens assembly of claim 1, wherein a height of a maximum effective radius of the image-side surface of the fifth lens element is Y5R2, a maximum image height of the imaging system lens assembly is ImgH, and the following condition is satisfied:

0.50<$Y5R2$/Img$H$<1.2.

12. The imaging system lens assembly of claim 1, further comprising:
a reflective element disposed between an imaged object and the image surface.

13. The imaging system lens assembly of claim 12, wherein the reflective element is disposed at an object side of the object-side surface of the first lens element or at an image side of the image-side surface of the fifth lens element.

14. An imaging apparatus, comprising:
the imaging system lens assembly of claim 1; and
an image sensor disposed on the image surface of the imaging system lens assembly.

15. An electronic device, comprising:
the imaging apparatus of claim 14.

16. An imaging system lens assembly comprising five lens elements, the five lens elements being, in order from an object side to an image side along an optical path:
a first lens element, a second lens element, a third lens element, a fourth lens element and a fifth lens element;
each of the five lens elements has an object-side surface towards the object side and an image-side surface towards the image side;
wherein the object-side surface of the first lens element is convex in a paraxial region thereof;
wherein an axial distance between the image-side surface of the fifth lens element and an image surface is BL, an axial distance between the object-side surface of the first lens element and the image-side surface of the fifth lens element is TD, an f-number of the imaging system lens assembly is Fno, a maximum image height of the imaging system lens assembly is ImgH, an axial distance between the object-side surface of the first lens element and the image surface is TL, a curvature radius of the image-side surface of the third lens element is R6, a curvature radius of the image-side surface of the fourth lens element is R8, and the following conditions are satisfied:

2.5<$BL$/$TD$<10.0;

1.0<$F$no<3.8;

0.01<Img$H$/$TL$<0.23; and 0.01<|$R$8/$R$6|<0.42.

17. The imaging system lens assembly of claim 16, further comprising:
an aperture stop disposed between an imaged object and the third lens element.

18. The imaging system lens assembly of claim 16, wherein the object-side surface of the second lens element is convex in a paraxial region thereof, at least one of the object-side surface and the image-side surface of at least one of the five lens elements comprises at least one inflection point.

19. The imaging system lens assembly of claim 16, wherein an axial distance between the first lens element and the second lens element is T12, a central thickness of the second lens element is CT2, and the following condition is satisfied:

0.01<$T$12/CT2<1.0.

20. The imaging system lens assembly of claim 16, wherein a curvature radius of the object-side surface of the first lens element is R1, the curvature radius of the image-side surface of the fourth lens element is R8, and the following condition is satisfied:

0<(|R1|+|R8|)/(|R1|−|R8|)<6.4.

21. The imaging system lens assembly of claim 16, wherein a focal length of the second lens element is f2, a focal length of the fifth lens element is f5, and the following condition is satisfied:

0.1<|f2/f5|<1.5.

22. The imaging system lens assembly of claim 16, wherein a focal length of the imaging system lens assembly is f, a focal length of the first lens element is f1, a focal length of the second lens element is f2, a focal length of the third lens element is f3, a focal length of the fourth lens element is f4, a focal length of the fifth lens element is f5, and the following condition is satisfied:

4.0<|f/f1|+|f/f2|+|f/f3|+|f/f4|+|f/f5|<12.0.

23. The imaging system lens assembly of claim 16, wherein a distance in parallel with an optical axis from an axial vertex on the image-side surface of the fourth lens element to a maximum effective radius position on the image-side surface of the fourth lens element is SAG4R2, a central thickness of the fourth lens element is CT4, and the following condition is satisfied:

0.4<|SAG4R2|/CT4<5.0.

24. The imaging system lens assembly of claim 16, wherein a height of a maximum effective radius of the object-side surface of the first lens element is Y1R1, a height of a maximum effective radius of the image-side surface of the fifth lens element is Y5R2, and the following condition is satisfied:

0.8<Y1R1/Y5R2<2.0.

25. The imaging system lens assembly of claim 16, wherein a height of a maximum effective radius of the image-side surface of the fifth lens element is Y5R2, the maximum image height of the imaging system lens assembly is ImgH, and the following condition is satisfied:

0.50<Y5R2/ImgH<1.2.

26. An imaging system lens assembly comprising five lens elements, the five lens elements being, in order from an object side to an image side along an optical path:
a first lens element, a second lens element, a third lens element, a fourth lens element and a fifth lens element;
each of the five lens elements has an object-side surface towards the object side and an image-side surface towards the image side;
wherein the first lens element has positive refractive power; the object-side surface of the second lens element is convex in a paraxial region thereof; the image-side surface of the fifth lens element is concave in a paraxial region thereof;
wherein at least one of the object-side surface and the image-side surface of each of at least two of the five lens elements is aspheric;
wherein at least two of the five lens elements are made of plastic material;
wherein the imaging system lens assembly further comprises an aperture stop, an axial distance between the aperture stop and the image-side surface of the fifth lens element is SD, an axial distance between the image-side surface of the fifth lens element and an image surface is BL, an axial distance between the object-side surface of the first lens element and the image-side surface of the fifth lens element is TD, a maximum among refractive indices of the five lens elements of the imaging system lens assembly is Nmax, and the following conditions are satisfied:

2.6<BL/TD<8.0;

1.58<Nmax<1.75; and 0.20<SD/TD<0.98.

27. The imaging system lens assembly of claim 26, wherein a height of a maximum effective radius of the image-side surface of the fifth lens element is Y5R2, a maximum image height of the imaging system lens assembly is ImgH, and the following condition is satisfied:

0.50<Y5R2/ImgH<1.2.

28. The imaging system lens assembly of claim 26, wherein the axial distance between the object-side surface of the first lens element and the image-side surface of the fifth lens element is TD, and the following condition is satisfied:

1.0 mm<TD<5.50 mm.

29. The imaging system lens assembly of claim 26, wherein a height of a maximum effective radius of the object-side surface of the first lens element is Y1R1, a height of a maximum effective radius of the image-side surface of the fifth lens element is Y5R2, and the following condition is satisfied:

1.0<Y1R1/Y5R2<2.0.

30. The imaging system lens assembly of claim 26, wherein an Abbe number of at least one of the five lens elements which has positive refractive power is smaller than 30.0.

31. The imaging system lens assembly of claim 26, further comprising:
a reflective element disposed between the fifth lens element and the image surface.

32. The imaging system lens assembly of claim 26, further comprising:
a reflective element disposed between an imaged object and the image surface, and the reflective element comprises at least two reflective surfaces.

* * * * *